United States Patent
Hashiba et al.

(10) Patent No.: US 9,373,992 B2
(45) Date of Patent: Jun. 21, 2016

(54) PERMANENT MAGNET ELECTRIC MOTOR

(71) Applicant: KABUSHIKI KAISHA TOSHIBA, Minato-ku (JP)

(72) Inventors: Yutaka Hashiba, Yokosuka (JP); Kazuto Sakai, Yokosuka (JP); Norio Takahashi, Izumi-ku (JP); Kazuaki Yuuki, Tokorozawa (JP); Masanori Arata, Totsuka-ku (JP); Yusuke Matsuoka, Mie-gun (JP); Motoyasu Mochizuki, Chuo-ku (JP); Tadashi Tokumasu, Setagaya-ku (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 251 days.

(21) Appl. No.: 14/296,116

(22) Filed: Jun. 4, 2014

(65) Prior Publication Data

US 2014/0283372 A1 Sep. 25, 2014

Related U.S. Application Data

(62) Division of application No. 13/139,889, filed as application No. PCT/JP2009/006899 on Dec. 15, 2009, now Pat. No. 8,796,898.

(30) Foreign Application Priority Data

Dec. 15, 2008 (JP) .................. 2008-317955
Dec. 16, 2008 (JP) .................. 2008-320138
Dec. 16, 2008 (JP) .................. 2008-320141
Nov. 11, 2009 (JP) .................. 2009-258430

(51) Int. Cl.
*H02K 15/03* (2006.01)
*H02K 1/02* (2006.01)
(Continued)

(52) U.S. Cl.
CPC .............. *H02K 15/03* (2013.01); *H02K 1/02* (2013.01); *H02K 1/223* (2013.01); *H02K 1/2766* (2013.01); *Y10T 29/49009* (2015.01); *Y10T 29/49012* (2015.01)

(58) Field of Classification Search
CPC ...... H02K 1/223; H02K 1/2766; H02K 15/03; H02K 1/02; Y10T 29/49009; Y10T 29/49012
USPC ...................... 310/156.76; 29/596
See application file for complete search history.

(56) References Cited

U.S. PATENT DOCUMENTS 3,898,491 A   8/1975   Long et al.
5,663,605 A   9/1997   Evans et al.
(Continued)

FOREIGN PATENT DOCUMENTS

JP   52 139905   11/1977
JP   8 182282    7/1996
(Continued)

OTHER PUBLICATIONS

Translation of foreign document JP 08182282.
(Continued)

*Primary Examiner* — Alex W Mok
(74) *Attorney, Agent, or Firm* — Oblon, McClelland, Maier & Neustadt, L.L.P

(57) ABSTRACT

According to one embodiment, a rotor is configured by a rotor core and magnetic poles. Two or more types of permanent magnets are used such that each product of coercivity and thickness in the magnetization direction becomes different. A stator is located outside the rotor with air gap therebetween and configured by an armature core winding. At least one permanent magnet is magnetized by a magnetic field by a current of the armature winding to change a magnetic flux content thereof irreversibly. A short circuited coil is provided to surround a magnetic path portion of the other permanent magnet excluding the magnet changed irreversibly and a portion adjacent to the other permanent magnet where the magnetic flux leaks. A short-circuit current is generated in the short circuited coil by the magnetic flux generated by conducting a magnetization current to the winding. A magnetic field is generated by the short-circuit current.

1 Claim, 53 Drawing Sheets

(51) Int. Cl.
*H02K 1/27* (2006.01)
*H02K 1/22* (2006.01)

(56) References Cited

U.S. PATENT DOCUMENTS

| | | | |
|---|---|---|---|
| 6,087,751 | A | 7/2000 | Sakai |
| 6,147,429 | A | 11/2000 | Akemakou et al. |
| 6,274,960 | B1 | 8/2001 | Sakai et al. |
| 6,800,977 | B1 | 10/2004 | Ostovic |
| 7,436,096 | B2 | 10/2008 | Guven et al. |
| 2007/0090713 | A1 | 4/2007 | Arita et al. |
| 2009/0184598 | A1 | 7/2009 | Nakano et al. |
| 2009/0236923 | A1 | 9/2009 | Sakai et al. |

FOREIGN PATENT DOCUMENTS

| | | |
|---|---|---|
| JP | 2000 175416 A | 6/2000 |
| JP | 2001 339919 A | 12/2001 |
| JP | 2006 60952 | 3/2006 |
| JP | 2006 121765 | 5/2006 |
| JP | 2006 280195 | 10/2006 |
| JP | 2008 048514 | 2/2008 |
| JP | 2008 245368 A | 10/2008 |
| WO | 2008 023413 | 2/2008 |

OTHER PUBLICATIONS

International Search Report issued Mar. 23, 2010 in PCT/JP09/06899 filed Dec. 15, 2009.

Interlinkage magnetic flux maximum state (start)

Gereration of a magnetic field by the coil
for decreasing the magnetic force of the
variable magnet Decrease of the magnetic force of the variable
magnet in the opposing magnetic field Interlinkage magnetic flux minimum state due
to the mlagnetization of the variable magnet
in the reverse direction in the opposing
magnetic field generated by the current
(inversion of polarity)

Generation of a magnetic field for decreasing
the magnetic force of the variable magnet
subject to polarity inversion by the current
of the coil Decrease of the magnetic force of the variable
magnet subject to polarity inversion by the
magnetic field generated by the current Interlinkage magnetic flux maximum state due to the magnetization of the variable magnet in the reverse direction in the opposing magnetic field generated by the current (re-inversion of polarity)

ion Ser. No. 13/139,889, filed Sep. 2, 2011, which is a National Stage
PERMANENT MAGNET ELECTRIC MOTOR

CROSS REFERENCE TO RELATED APPLICATIONS

This application is a Divisional of and claims the benefit of priority under 35 U.S.C. §120 from U.S. applicatEntry of PCT Application No. PCT/JP2009/006899, filed on Dec. 15, 2009, and is based upon and claims the benefit of priority from the prior Japanese Patent Application No. 2009-258430, filed on Nov. 11, 2009, prior Japanese Patent Application No. 2008-320138, filed on Dec. 16, 2008, prior Japanese Patent Application No. 2008-320141, filed on Dec. 16, 2008, and prior Japanese Patent Application No. 2008-317955, filed on Dec. 15, 2008, the entire contents of each of which are incorporated herein by reference.

FIELD

Embodiments described herein relate generally to a permanent magnet electric motor in which a short circuited coil that generates induced current by a magnetic field during magnetization and demagnetization of a permanent magnet is built into a rotor, and to a method of manufacturing the same.

BACKGROUND

With a permanent magnet electric motor in which a permanent magnet is built into a rotor, since the interlinkage magnetic flux of the permanent magnet is generated constantly at a given strength, the induced voltage generated by the permanent magnet will increase in proportion to the rotating speed. Thus, when performing variable speed operation from a low speed to a high speed, the induced voltage (counter electromotive voltage) generated by the permanent magnet will become extremely high in a high-speed rotation. When the induced voltage generated by the permanent magnet is applied to the electronic parts of an inverter and reaches their withstand voltage or higher, the electronic parts will break down. Thus, a design where the flux content of the permanent magnet is reduced so as to be the withstand voltage or less may be considered, but in this case, the output and efficiency of the permanent magnet electric motor will deteriorate in a low speed area.

Thus, proposed is technology of disposing, within the rotor, a permanent magnet of low coercive force of a level in which the magnetic flux density is irreversibly changed by the magnetic field created with a d-axis current of a stator winding (hereinafter referred to as the "variable magnetic force magnet") and a permanent magnet of high coercive force having coercive force that is twice or more than that of the variable magnetic force magnet (hereinafter referred to as the "fixed magnetic force magnet"), and adjusting the total amount of interlinkage magnetic flux so that the total interlinkage magnetic flux generated by the variable magnetic force magnet and the fixed magnetic force magnet will decrease in a high revolution area where the power-supply voltage becomes a maximum voltage or greater.

Note that, since the flux content of the permanent magnet is decided based on the product of the coercive force and the thickness in the magnetization direction, when actually mounting the variable magnetic force magnet and the fixed magnetic force magnet in the rotor core, a permanent magnet in which the product of the coercive force and the thickness in the magnetization direction is small is used as the variable magnetic force magnet, and a permanent magnet in which the product of the coercive force and the thickness in the magnetization direction is large is used as the fixed magnetic force magnet. Moreover, generally speaking, an alnico magnet, a samarium-cobalt magnet (Sm—Co magnet) or a ferrite magnet is used as the variable magnetic force magnet, and a neodymium magnet (NdFeB magnet) is used as the fixed magnetic force magnet.

Incidentally, in this type of permanent magnet electric motor, when magnetizing a variable magnetic force magnet that was once demagnetized in a high revolution area, a phenomenon occurs where the magnetic field of the fixed magnetic force magnet disposed in the vicinity of the variable magnetic force magnet obstructs the magnetization magnetic field that is created by a d-axis current, and the d-axis current (magnetization current) for the magnetization increases by that much.

SUMMARY

The invention was devised in order to resolve the problems of the foregoing conventional technology, and an object thereof is to provide a permanent magnet electric motor capable of inhibiting the increase of the d-axis current during magnetization by disposing a short circuited coil in the vicinity of a fixed magnetic force magnet, generating an induced current in the short circuited coil based on a magnetic field generated by the d-axis current penetrating the short circuited coil, and negating the magnetic field that is generated in the fixed magnetic force magnet by using the foregoing induced current.

In order to achieve the foregoing object, the invention provides a permanent magnet electric motor in which a rotor is configured by a rotor core and a plurality of magnetic poles formed inside the rotor core by using two or more types of permanent magnets selected such that a product of coercivity and thickness in a magnetization direction of each magnet is different from each other, in which a stator is located outside the rotor with an air gap intervening between them and configured by an armature core and an armature winding, in which at least one permanent magnet forming the magnetic poles of the rotor is magnetized by a magnetic field generated by a current of the armature winding to change a magnetic flux content thereof irreversibly, wherein a short circuited coil is provided so as to surround a magnetic path portion of the other permanent magnet excluding the permanent magnet of which magnetic flux content is changed irreversibly and a portion adjacent to the other permanent magnet where the magnetic flux leaks, and wherein a short-circuit current is generated in the short circuited coil by the magnetic flux which is generated by conducting a magnetization current to the armature winding, and a magnetic field, having a magnetic force in an opposite direction to the magnetic field generated by the magnetization current, is generated by the short-circuit current.

Moreover, technologies concerning the method of manufacturing a permanent magnet electric motor including the foregoing short circuited coil, configuration of the short circuited coil using a tabular conductive member, and arrangement locations of the short circuited coil and the tabular conductive member are also a mode of the invention.

According to the invention configured as described above, since it is possible to inhibit the increase of the d-axis current during magnetization by generating an induced current in the short circuited coil and negating the magnetic field that is generated in the fixed magnetic force magnet by using the foregoing induced current, the increase of the magnetization current during the demagnetization and magnetization of the magnetic pole of the rotor can be inhibited, thereby improving the efficiency of the motor.

DETAILED DESCRIPTION

[First Invention]

Embodiments of the permanent magnet electric motor according to the first invention of this application are now explained with reference to FIGS. 1 to 4. The electric motor of this embodiment is explained as a case of comprising 12 poles, but it can also be similarly applied in cases of other number of poles.

Embodiment 1

(1-1) Configuration

Figure 1:
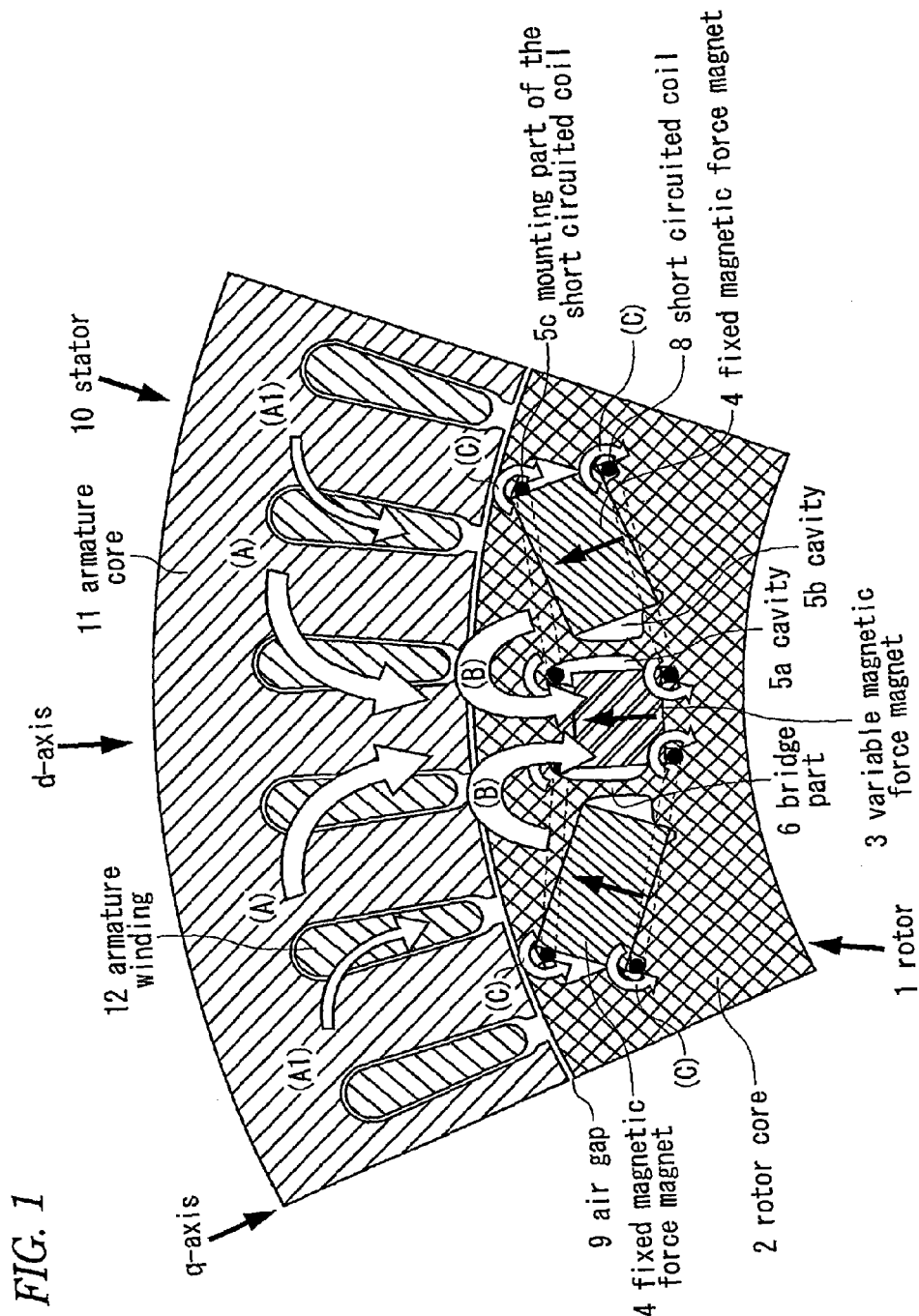
FIG. 1 is a partial cross section of the rotor and stator shown in Embodiment 1 according to the invention, and illustrates the direction of the magnetic flux during demagnetization.
Figure 2:
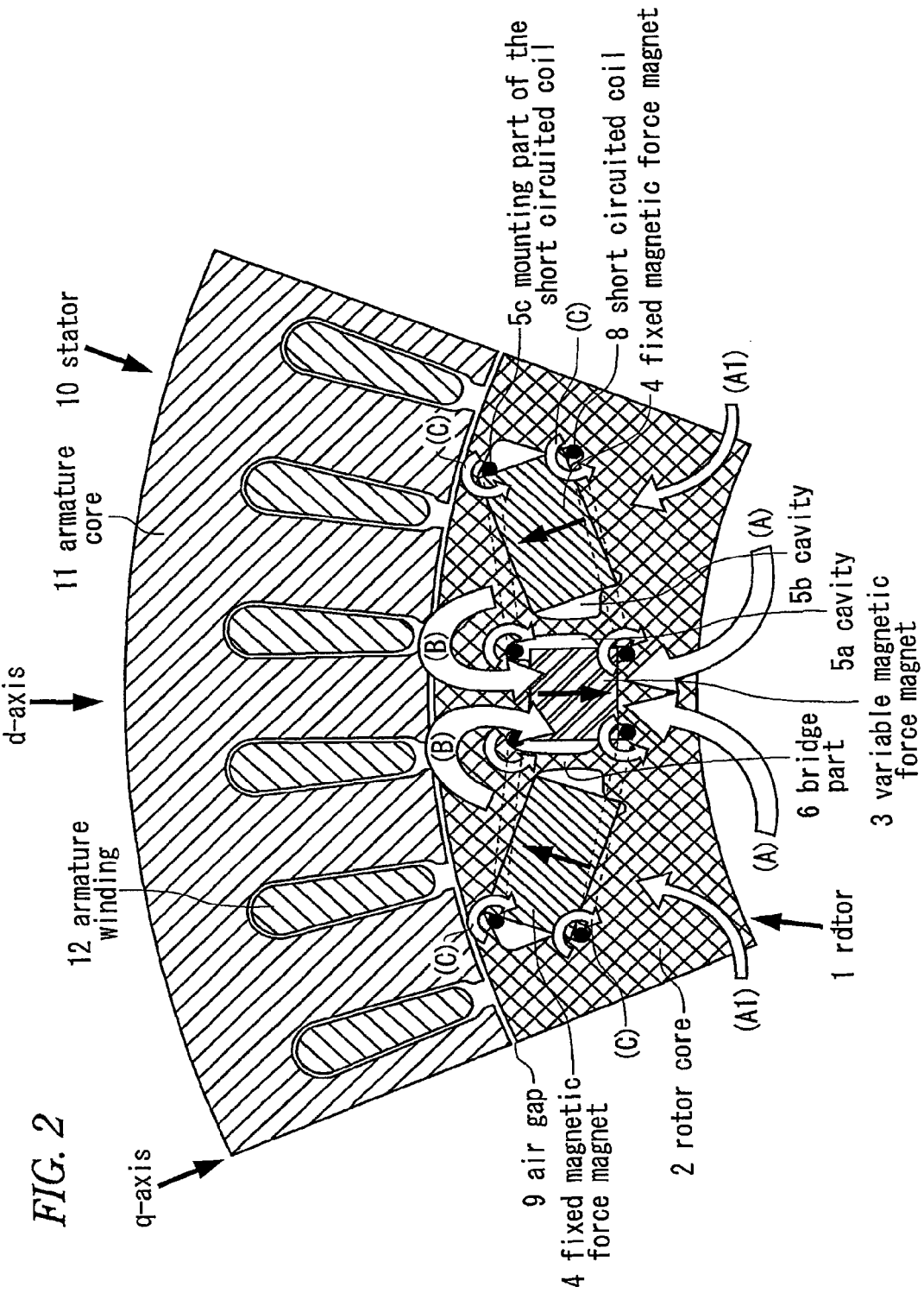
FIG. 2 is a partial cross section of the rotor and stator shown in Embodiment 1 according to the invention, and illustrates the direction of the magnetic flux during magnetization.

Embodiment 1 according to the first invention is now explained with reference to FIGS. 1 and 2. FIG. 1 is a cross section in a direction that is orthogonal to the rotation axis of the permanent magnet electric motor of this embodiment, and illustrates the direction of the magnetic flux during demagnetization. FIG. 2 is also a diagram illustrating the direction of the magnetic flux during magnetization.

The rotor 1 of Embodiment 1 according to the first invention is configured, as shown in FIG. 1, from a rotor core 2, a permanent magnet 3 in which the product of the coercive force and the thickness in the magnetization direction becomes small (hereinafter referred to as the "variable magnetic force magnet"), and permanent magnets 4, 4 in which the product of the coercive force and the thickness in the magnetization direction becomes large (hereinafter referred to as the "fixed magnetic force magnets"). The rotor core 2 is configured by laminating silicon steel plates, and the foregoing variable magnetic force magnet 3 and fixed magnetic force magnets 4, 4 are embedded in the rotor core 2.

Cavities 5a, b which become a magnetic barrier are provided at the ends of the variable magnetic force magnet 3 and the fixed magnetic force magnet 4 so that the magnetic flux that passes through the rotor core 2 will pass through the thickness direction of the variable magnetic force magnet 3 and the fixed magnetic force magnet 4. A mounting part 5c of the short circuited coil, which is a concave part provided to the cavity 5 for setting the short circuited coil 8, is provided to the cavities 5a, 5b, respectively.

In the embodiments, a ferrite magnet or an alnico magnet was used as the variable magnetic force magnet 3, and a ferrite magnet was used in this embodiment. A NdFeB magnet was used as the fixed magnetic force magnet 4. The coercive force of the variable magnetic force magnet was set to 280 kA/m, and the coercive force of the fixed magnetic force magnet was set to 1000 kA/m. The variable magnetic force magnet 3 is disposed in the rotor core 2 along the d-axis at the center of the magnetic pole, and its magnetization direction is substantially a circumferential direction. The fixed magnetic force magnet 4 is disposed in the rotor core 2 on either end of the variable magnetic force magnet 3 so that the magnetization direction will have a predetermined angle relative to the d-axis direction.

The short circuited coil 8 is provided so as to surround the fixed magnetic force magnet 4 embedded in the rotor core 2 in a direction that is parallel to the magnetization direction of the current of the d-axis of the fixed magnet. The short circuited coil 8 is configured from a ring-shaped conductive member, and mounted by being fitted into the mounting part 5c formed at the edge of the cavity 5 provided in the rotor core 2. The short circuited coil 8 can also be formed on the mounting part 5c of the short circuited coil, which was melted at a high temperature, by filling a conductive substance in a hole of the core of the rotor and performing casting thereto.

A short-circuit current is generated in the short circuited coil 8 based on the magnetic flux that is generated when a d-axis current is conducted to the armature winding. Thus, the short circuited coil 8 is provided to the magnetic path portion of the fixed magnetic force magnet 4 excluding the variable magnetic force magnet 3. In the foregoing case, the short circuited coil 8 is provided around the fixed magnetic force magnet 4 with the magnetization direction of the fixed magnetic force magnet 4 as the central axis.

In this embodiment, the short circuited coil 8 is provided above and below the fixed magnetic force magnet 4, respectively, but it may also be provided to one of above or below the fixed magnetic force magnet 4. Moreover, other than providing the short circuited coil 8 in close contact with the surface of the fixed magnetic force magnet, it may also be provided so as to surround the fixed magnetic force magnet and the bridge part 6 between the fixed magnetic force magnet and the variable magnetic force magnet as shown in the diagram.

The short circuited coil is a type in which a short-circuit current of a level that changes the magnetization of the variable magnetic force magnet 3 flows for 1 second or less, and which attenuates the short-circuit current by 50% or more within 1 second thereafter. Moreover, it would be efficient if the inductance value and the resistance value of the short circuited coil 8 are set to a value that causes the flow of a short-circuit current of a level that changes the magnetization of the variable magnetic force magnet 3.

A stator 10 is provided at the outer periphery of the rotor 2 via an air gap 9. The stator 10 includes an armature core 11 and an armature winding 12. An induced current is induced to the short circuited coil 8 based on the magnetization current flowing to the armature winding 12, and the magnetic flux that penetrates the short circuited coil 8 is formed by the induced current.

The magnetization direction of the variable magnetic force magnet 3 reversibly changes based on the magnetization current flowing to the armature winding 12; that is, the flux content of the variable magnetic force magnet 3 is irreversibly changed by magnetizing the permanent magnet 3 by the magnetic field generated by the d-axis current during the operation of the permanent magnet electric motor in relation to the variable magnetic force magnet and the fixed magnetic force magnet. In the foregoing case, the torque of the electric motor is controlled by the q-axis current simultaneously with causing the d-axis current for magnetizing the variable magnetic force magnet 3 to flow.

Moreover, based on the magnetic flux generated by the d-axis current, the current (total current upon synthesizing the q-axis current and the d-axis current) and the amount of interlinkage magnetic flux of the armature winding generated by the variable magnetic force magnet and the fixed magnetic force magnet (that is, the amount of interlinkage magnetic flux of the overall armature winding configured from the magnetic flux generated in the armature winding based on the total current of the electric motor and the magnetic flux generated by the rotor-side variable magnetic force magnet and fixed magnetic force magnet) are changed substantially reversibly.

Particularly, in this embodiment, the variable magnetic force magnet 3 is irreversibly changed by the magnetic field generated based on a momentarily large d-axis current. Operation is performed by causing a d-axis current to continuously flow within a range where irreversible demagnetization is hardly generated or slight irreversible demagnetization is generated in the foregoing state. The d-axis current in this case works to promote the current phase and adjust the terminal voltage. In other words, an operation control method of inverting the polarity of the variable magnet 3 with a large d-axis current and promoting the current phase is performed. Since the polarity of the variable magnet 3 is inverted with the d-axis current as described above, even if a negative d-axis current that would lower the terminal voltage is caused to flow, it will be a magnetization field, and not a demagnetization field, for the variable magnet 3. In other words, the variable magnet 3 can adjust the size of the terminal voltage without being demagnetized by the negative d-axis current.

(1-2) Operation of Demagnetization and Magnetization

The operation during magnetization and during demagnetization in the permanent magnet electric motor of this embodiment having the foregoing configuration is now explained. Note that the direction of the magnetic force generated by the armature winding 12 and the short circuited coil 8 is shown with an arrow in the respective diagrams.

In this embodiment, a magnetic field is formed by causing a pulse-like current, in which the conducting period is an extremely-short time of approximately 0.1 ms to 100 ms, to flow to the armature winding 12 of the stator 10, and the magnetic field A is caused to work on the variable magnetic force magnet 3 (refer to FIG. 1). The pulse current which forms the magnetic field A for magnetizing the permanent magnet is the d-axis current component of the armature winding 12 of the stator 10.

If the thickness of the two types of permanent magnets is made to be substantially the same, the change in the magnetized state of the permanent magnet caused by the field of action generated by the d-axis current will change based on the size of the coercive force. A negative d-axis current, which generates a magnetic field in a direction that is opposite to the magnetization direction of the permanent magnet, is conducted to the armature winding 12 in a pulse-like manner. When the magnetic field A within the magnet that changed due to the negative d-axis current becomes −280 kA/m, the coercive force of the variable magnetic force magnet 3 will be 280 kA/m and, therefore, the magnetic force of the variable magnetic force magnet 3 will considerably decrease irreversibly.

Meanwhile, since the coercive force of the fixed magnetic force magnet 4 is 1000 kA/m, the magnetic force will not decrease irreversibly. Consequently, when the pulse-like d-axis current becomes 0, only the variable magnetic force magnet 3 becomes a demagnetized state, and the amount of interlinkage magnetic flux generated by the overall magnets can be decreased. In addition, when an opposing magnetic field that is greater than −280 kA/m is applied, the variable magnetic force magnet 3 is magnetized in the reverse direction and the polarity is inverted. In the foregoing case, since the magnetic flux of the variable magnetic force magnet 3 and the magnetic flux of the fixed magnetic force magnet 4 negate each other, the total interlinkage magnetic flux of the permanent magnets will become minimum.

In the foregoing case, since the direction of the magnetic force of the fixed magnetic force magnet 4 will become the direction from the fixed magnetic force magnet 4 to the variable magnetic force magnet 3 as shown in B of FIG. 1, it will coincide with the direction of the magnetic force of the magnetic field generated by the armature winding 12, and, therefore, strong magnetic force will work in the direction of demagnetizing the variable magnetic force magnet 3. Simultaneously, an induced current that will negate the magnetic field A of the armature winding 12 is generated in the short circuited coil 8, and a magnetic field having a magnetic force direction as shown with arrow C in FIG. 1 is generated by the foregoing induced current. The magnetic force C generated by the short circuited coil 8 will also work so that the magnetization direction of the variable magnetic force magnet 3 is directed in the reverse direction. As a result of the above, the demagnetization and polarity inversion of the variable magnetic force magnet 3 are performed efficiently.

The process (magnetization process) of increasing the total interlinkage magnetic flux of the permanent magnets and restoring it to become maximum is now explained. In a state where the demagnetization is complete, as shown in FIG. 2, the polarity of the variable magnetic force magnet 3 is inverted, and a positive d-axis current, which generates a magnetic field of a reverse direction (initial magnetization direction shown in FIG. 1) relative to the inverted magnetization, is conducted to the armature winding 12. The magnetic force of the variable magnetic force magnet 3 of the inverted reverse polarity decreases as the magnetic field increases, and eventually becomes 0. When the magnetic field generated by the positive d-axis current is additionally increased, the polarity is inverted and magnetized in the direction of the initial polarity. When 350 kA/m as the magnetic field that is required for a substantially complete magnetization is applied, the variable magnetic force magnet 3 is magnetized and generates a substantially maximum magnetic force.

In the foregoing case, as with the case during demagnetization, the d-axis current does not need to be increased with continuous conduction, and a current that realizes the target magnetic force can be caused to flow as a momentary pulse current. Meanwhile, since the coercive force of the fixed magnetic force magnet 4 is 1000 kA/m, the magnetic force of the fixed magnetic force magnet 4 will not change irreversibly even when the magnetic field generated by the d-axis current works thereon. Consequently, when the pulse-like positive d-axis current becomes 0, only the variable magnetic force magnet 3 becomes a magnetized state, and the amount of interlinkage magnetic flux generated by the overall magnets can be increased. It is thereby possible to return the amount of interlinkage magnetic flux to the original maximum amount of interlinkage magnetic flux.

As described above, by causing the momentary magnetic field generated by the d-axis current to work on the variable magnetic force magnet 3 and the fixed magnetic force magnet 4, it is possible to irreversibly change the magnetic force of the variable magnetic force magnet 3 and arbitrarily change the total amount of interlinkage magnetic flux of the permanent magnets.

(1-3) Operation of Short Circuited Coil 8

The operation of the short circuited coil 8 is now explained. Since the variable magnetic force magnet 3 and the fixed magnetic force magnet 4 are embedded in the rotor core 2 and thereby configure the magnetic circuit, the magnetic field generated by the d-axis current not only works on the variable magnetic force magnet 3, it also works on the fixed magnetic force magnet 4. Originally, the magnetic field caused by the d-axis current is used for changing the magnetization of the variable magnetic force magnet 3. Thus, the magnetic field generated by the d-axis current is caused not to work on the fixed magnetic force magnet 4, and caused to be concentrated on the variable magnetic force magnet 3.

In this embodiment, the short circuited coil 8 is disposed in the fixed magnetic force magnet 4 and its peripheral bridge part 6. In the foregoing case, the short circuited coil 8 is disposed with the magnetization direction of the fixed magnetic force magnet 4 as the central axis. As shown in FIG. 2, when performing magnetization in the magnetization direction of the variable magnetic force magnet 3, an induced current of negating the magnetic field A will flow to the short circuited coil 8 if the magnetic field A1 generated by the d-axis current works on the fixed magnetic force magnet 4. Accordingly, since the magnetic field A1 generated by the d-axis current and the magnetic field C generated by the short-circuit current work and negate each other in the fixed magnetic force magnet 4, there will hardly be any increase or decrease of the magnetic field. That is, since the magnetic field A1≅0, the variable magnetic force magnet 3 can be effectively magnetized with a smaller magnetization current.

Here, since the fixed magnetic force magnet 4 will not be affected by the d-axis current generated by the short circuited coil 8 and hardly any increase or decrease of the magnetic flux will occur, the magnetic saturation of the armature core 11 caused by the d-axis current can also be alleviated. In other words, when the magnetic field A generated by the d-axis current passes through the magnetic path formed between the armature windings 12, there is a possibility that the armature core 11 will be subject to magnetic saturation at such portion. However, in this embodiment, the portion within the magnetic field C of the short circuited coil 8 which passes through the magnetic path of the armature core 11 works in a direction that is opposite to the magnetic field A generated by the d-axis current to realize A1≅0, and the magnetic path of the armature core 11 is alleviated from becoming subject to magnetic saturation.

Moreover, in this embodiment, since the short circuited coil 8 is provided so as to surround the bridge part 6, a short-circuit current will flow to the short circuited coil 8 even by the magnetic field A2 that works on the bridge part 6. In the foregoing case, since the short circuited coil 8 is disposed in the vicinity of the variable magnetic force magnet 3, the magnetic field that works on components other than the variable magnetic force magnet can be efficiently negated.

In addition, since fixed magnetic force magnet 4 will not be affected by the d-axis current generated by the short circuited coil 8 and hardly any increase or decrease of the magnetic flux will occur, the magnetic saturation of the armature core 11 caused by the d-axis current can also be alleviated. In other words, when the magnetic field A generated by the d-axis current passes through the magnetic path formed between the armature windings 12, there is a possibility that the armature core 11 will be subject to magnetic saturation at such portion. However, in this embodiment, since the portion within the magnetic field C of the short circuited coil 8 negates the magnetic field A1+magnetic field A2 and the magnetic field A1+magnetic field A2≈0, the components generated by the magnetic field A1 and the magnetic field A2 in the magnetic flux that passes through the magnetic path of the armature core 11 will decrease, and the magnetic path of the armature core 11 is alleviated from becoming subject to magnetic saturation.

According to Embodiment 1 according to the first invention configured as described above, since it is possible to inhibit the increase of the d-axis current during magnetization by generating an induced current in the short circuited coil and negating the magnetic field that is generated in the fixed magnetic force magnet by using the foregoing induced current, the increase of the magnetization current during the demagnetization and magnetization of the magnetic pole of the rotor can be inhibited, thereby improving the efficiency of the motor. Moreover, since the bridge part 6 is also surrounding one short circuited coil 8, it is possible to prevent the magnetic field generated by the magnetization current from entering the bridge part 6. Consequently, the magnetic field A can be caused to effectively work on the variable magnetic force magnet 3.

Embodiment 2

Figure 3:
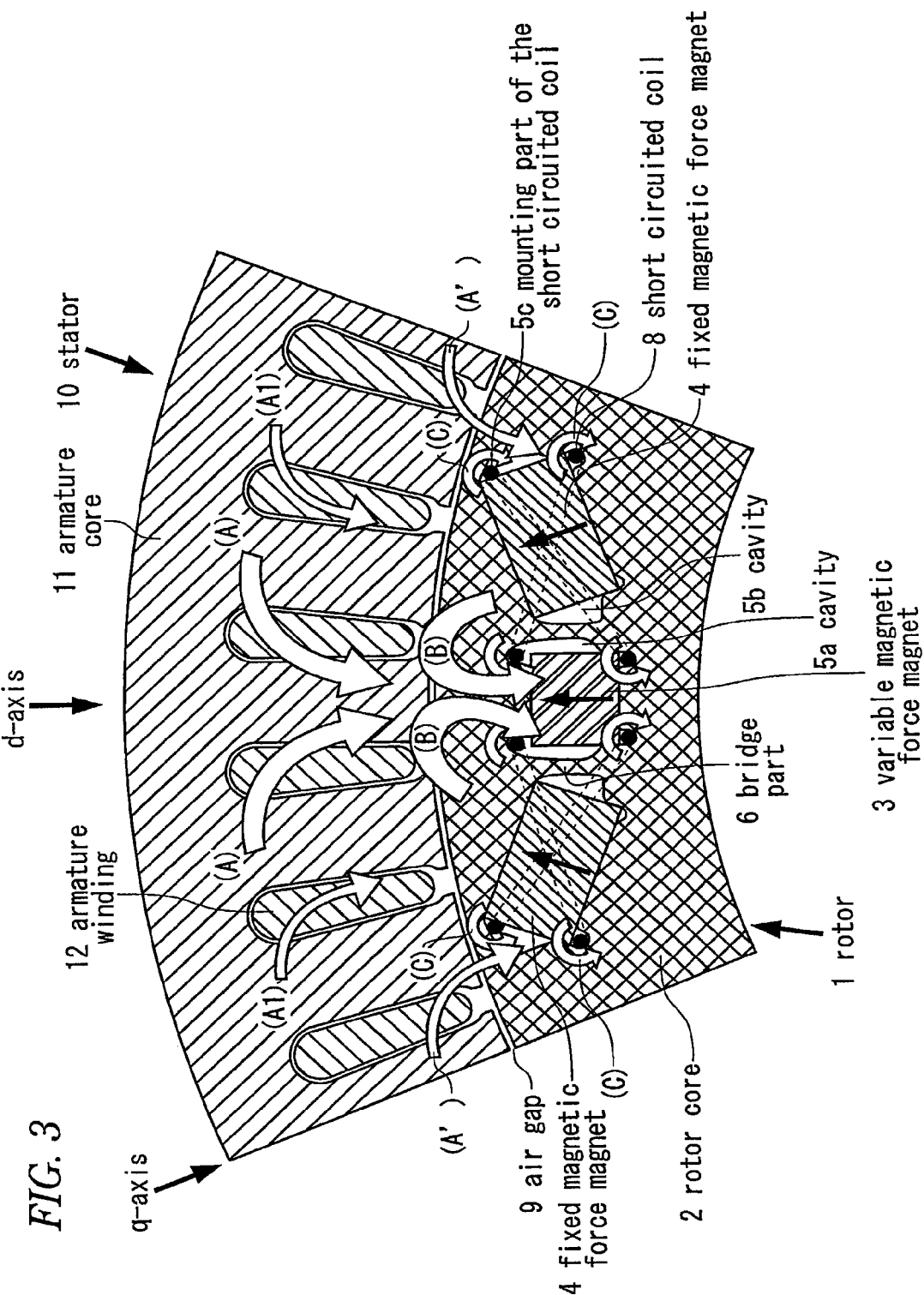
FIG. 3 is a partial cross section of the rotor and stator shown in Embodiment 2 according to the invention, and illustrates the direction of the magnetic flux during demagnetization.
Figure 4:
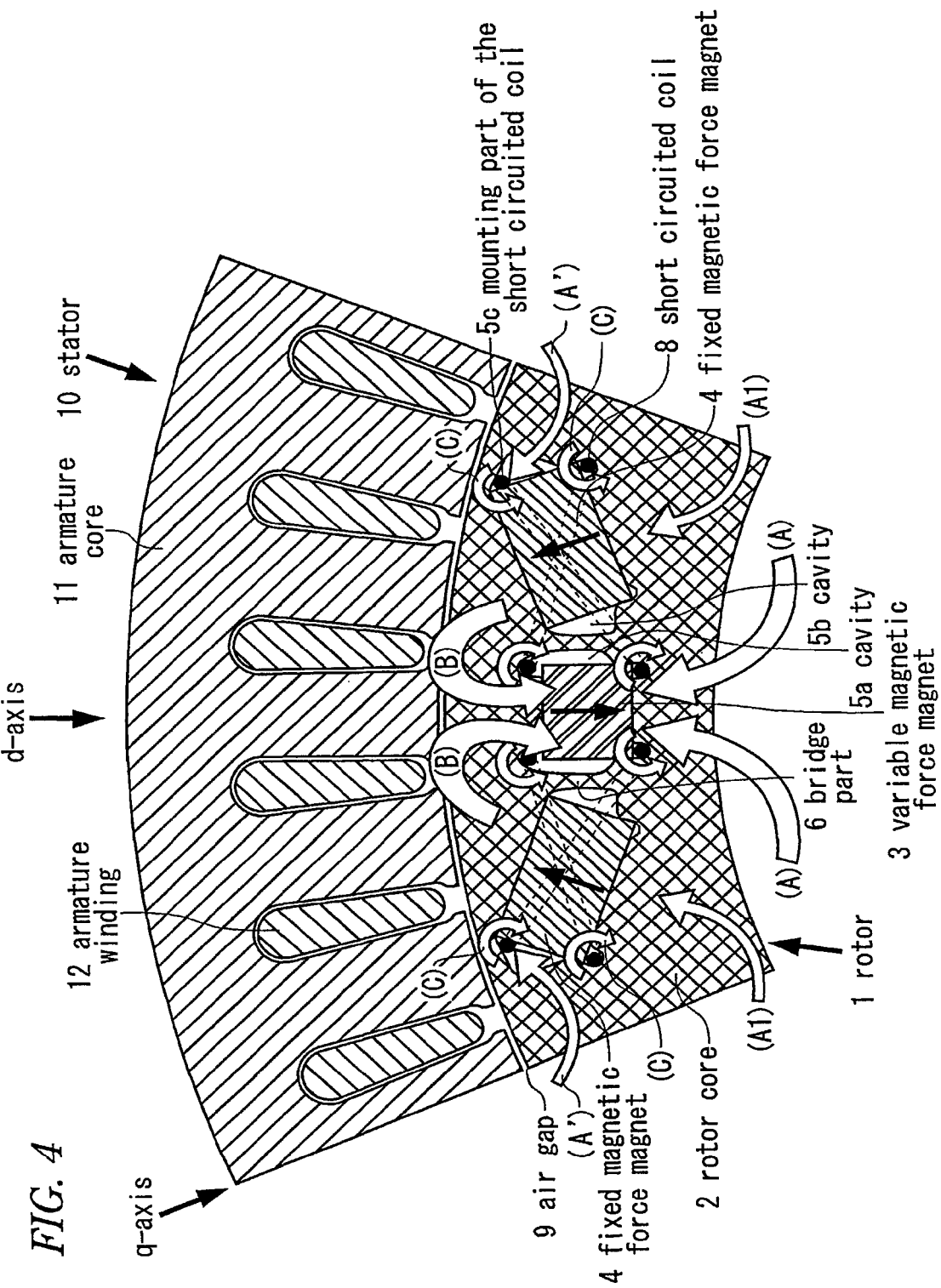
FIG. 4 is a partial cross section of the rotor and stator shown in Embodiment 2 according to the invention, and illustrates the direction of the magnetic flux during magnetization.

In Embodiment 2, the short circuited coil 8 is provided in parallel to the upper face and lower face (direction that is orthogonal to the magnetization direction) of the fixed magnetic force magnet, but as shown in FIGS. 3 and 4, it is also possible to provide one or two in an X-shape in the diagonal direction of the short circuited coil. In other words, the short circuited coil 8 is disposed diagonal to the cross section in a direction that is orthogonal to the axial direction of the rotor of the fixed magnetic force magnet 4 in a direction which maintains a given angle relative to the magnetization direction of the fixed magnetic force magnet 4. Here, the short circuited coil 8 may also be disposed in close contact with the fixed magnetic force magnet 4. It is also possible to extend one end of the short circuited coil 8 to the periphery of the variable magnetic force magnet 3 and contain the fixed magnetic force magnet 4 and the bridge part 6 on the inside of the short circuited coil 8. Moreover, in this embodiment, although the short circuited coil 8 is provided respectively above and below the fixed magnetic force magnet 4, it is also possible to provide only one above or below the fixed magnetic force magnet 4.

The operation during magnetization and during demagnetization in the permanent magnet electric motor of this embodiment having the foregoing configuration is now explained. When performing magnetization in the demagnetization direction of the variable magnetic force magnet 3 as shown in FIG. 3 and the magnetic fields A, A' generated by the d-axis current work on the fixed magnetic force magnet 4, as with Embodiment 1, a short-circuit current that negates the magnetic field A flowing from the upper side to the lower side of the fixed magnetic force magnet 4 will flow to the short circuited coil 8. Moreover, the short-circuit current generated by the magnetic field A' that works from the lateral side to the lower side of the fixed magnetic force magnet 4 will also flow to the short circuited coil 8 that is disposed inside the fixed magnetic force magnet 4.

When performing magnetization that is opposite to the above, as shown in FIG. 4, a short-circuit current that negates the magnetic field A flowing from the lower side to the upper side of the fixed magnetic force magnet 4 will flow to the short circuited coil 8 inside the fixed magnetic force magnet 4. Moreover, a short-circuit current generated by the magnetic field A' flowing from the lower side to the lateral side of the fixed magnetic force magnet 4 will also flow to the short circuited coil 8.

Thus, in Embodiment 2, in addition to the effects of each of the foregoing embodiments, a short-circuit current generated by the magnetic field A' that works on the lateral side of the fixed magnetic force magnet 4 will also flow to the short circuited coil 8. Since no difference will arise in the short-circuit current that is generated at the upper side and the lower side of the fixed magnetic force magnet 4, the strength of the magnetic field can be easily adjusted.

Embodiment 3

The first invention is not limited to each of the foregoing embodiments, and also includes Embodiment 3 described below.

(1) Although each of the foregoing embodiments illustrated a electric motor with four poles, it goes without saying that the first invention can also be applied to a multipolar electric motor of eight poles or the like. The arrangement position and shape of the permanent magnets will obviously change slightly according to the number of poles, but the operation and effect can be similarly obtained. Particularly, each of the foregoing embodiments disposes the variable magnetic force magnet at the center and disposes the fixed magnetic force magnet at either end, but the variable magnetic force magnet and the fixed magnetic force magnet can also be applied to other arrangements.

(2) The shape and position of the cavity that is provided for configuring the magnetic barrier to the peripheral side of the fixed magnetic force magnet in the rotor core 2 and the position of the cavity that is provided for deciding the product of the magnetic path cross section to the inner side of the fixed magnetic force magnet can be changed as needed according to the strength and the like of the magnetic field that is generated by the coercive force and magnetization current of the permanent magnets that are used.

[Second Invention]

Meanwhile, since the short circuited coil shown in relation to the first invention needs to be provided around the permanent magnets disposed in the rotor core, studies are being conducted on how to embed the short circuited coil in the core with a simple method. For example, when the short circuited coil and the permanent magnet are to be disposed in close contact, after wrapping the short circuited coil around the permanent magnet, the permanent magnet and the coil can be fitted into the mounting space of the permanent magnet that is opened within the core. However, when the permanent magnet and the short circuited coil become separated and a core portion exists between the two, a short circuited coil must be inserted one by one into a narrow coil insertion hole, and the assembly thereof becomes extremely difficult.

Specifically, with this type of permanent magnet electric motor, particularly a permanent magnet electric motor for use in hybrid vehicles that is demanded of downsizing and higher output, high torque and high output are demanded within a limited space, and the reduction of torque ripples, vibrations and noise is demanded pursuant thereto. Thus, a skew structure of forming the rotor laminated core in a block shape and shifting the cores in a circumferential direction is adopted. In a permanent magnet electric motor having this kind of skew structure, it is extremely troublesome to additionally provide the foregoing short circuited coil around the permanent magnet that is embedded in the rotor core.

The object according to the second invention of this application is to provide a permanent magnet electric motor having a rotor core of a skew structure which allows the short circuited coil to be mounted around the permanent magnet with a simple method, and the method of manufacturing the same.

In order to achieve the foregoing object, with the permanent magnet electric motor according to the second invention, the core of the rotor is divided into two or more in the axial direction, the magnetic pole position of the divided core parts is skewed in a circumferential direction, a conductive short circuited coil, which will cause a short-circuit current to flow based on the magnetic flux that is generated during magnetization upon magnetizing the permanent magnets, is provided to the respective core parts, the short circuited coil of the respective core parts is disposed at an angle that is displaced in the circumferential direction of the rotor according to the skew angle of the respective core parts, and the short circuited coil of the respective core parts is connected with a stepped part at the boundary part of the core.

With the permanent magnet electric motor according to the second invention having the foregoing configuration, it is possible to mount a short circuited coil of a structure, which is displaced in the amount of the skew angle, on the core part of the rotor core of the skew structure. Consequently, the mounting operation of the short circuited coil on the skewed core part can be simplified, and a permanent magnet electric motor having a short circuited coil can be easily obtained.

Embodiment 4

Figure 5:
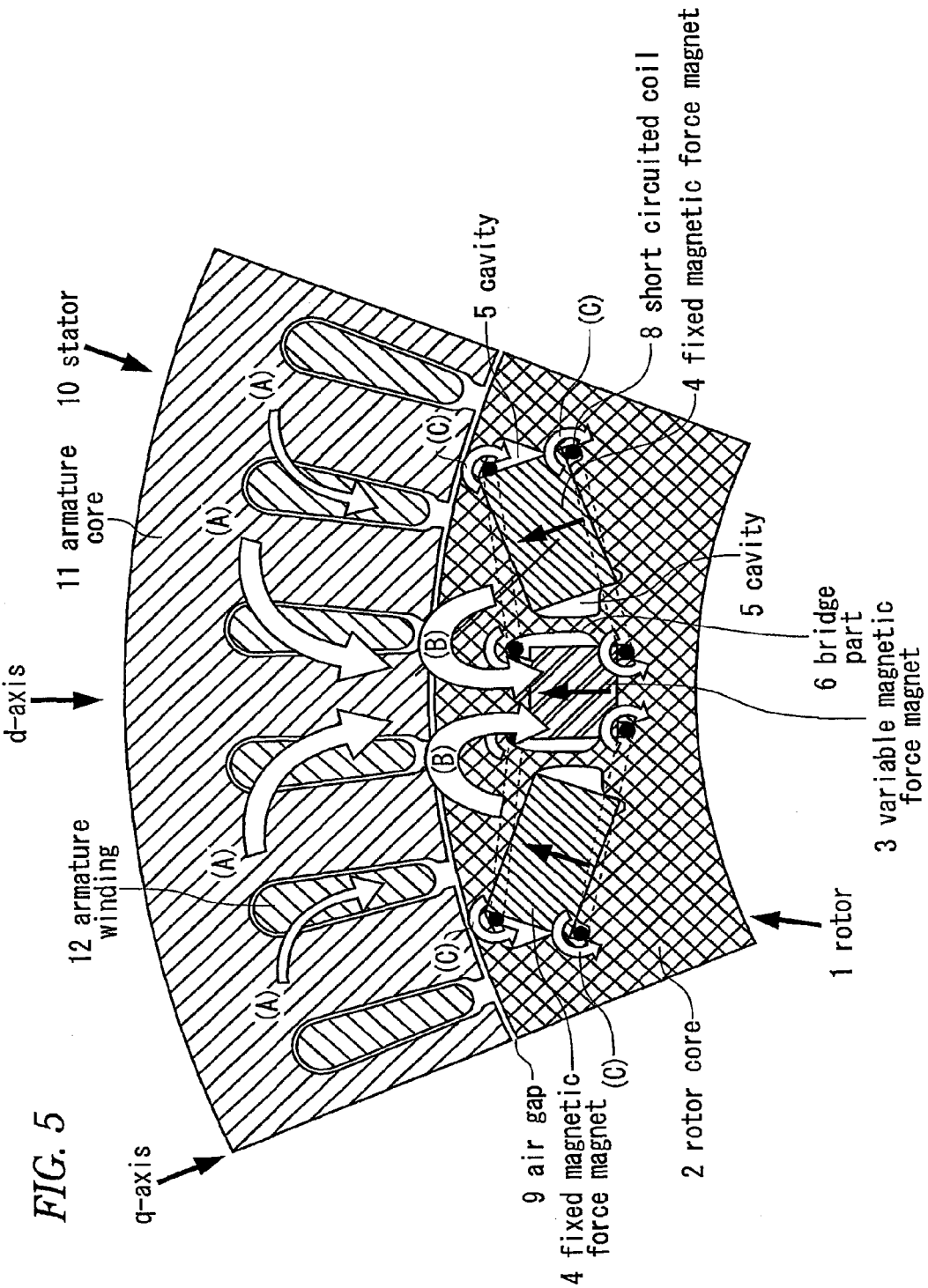
FIG. 5 is a partial cross section of the rotor and stator shown in Embodiment 4 according to the invention, and illustrates the variable magnetic force magnet during demagnetization.
Figure 6:
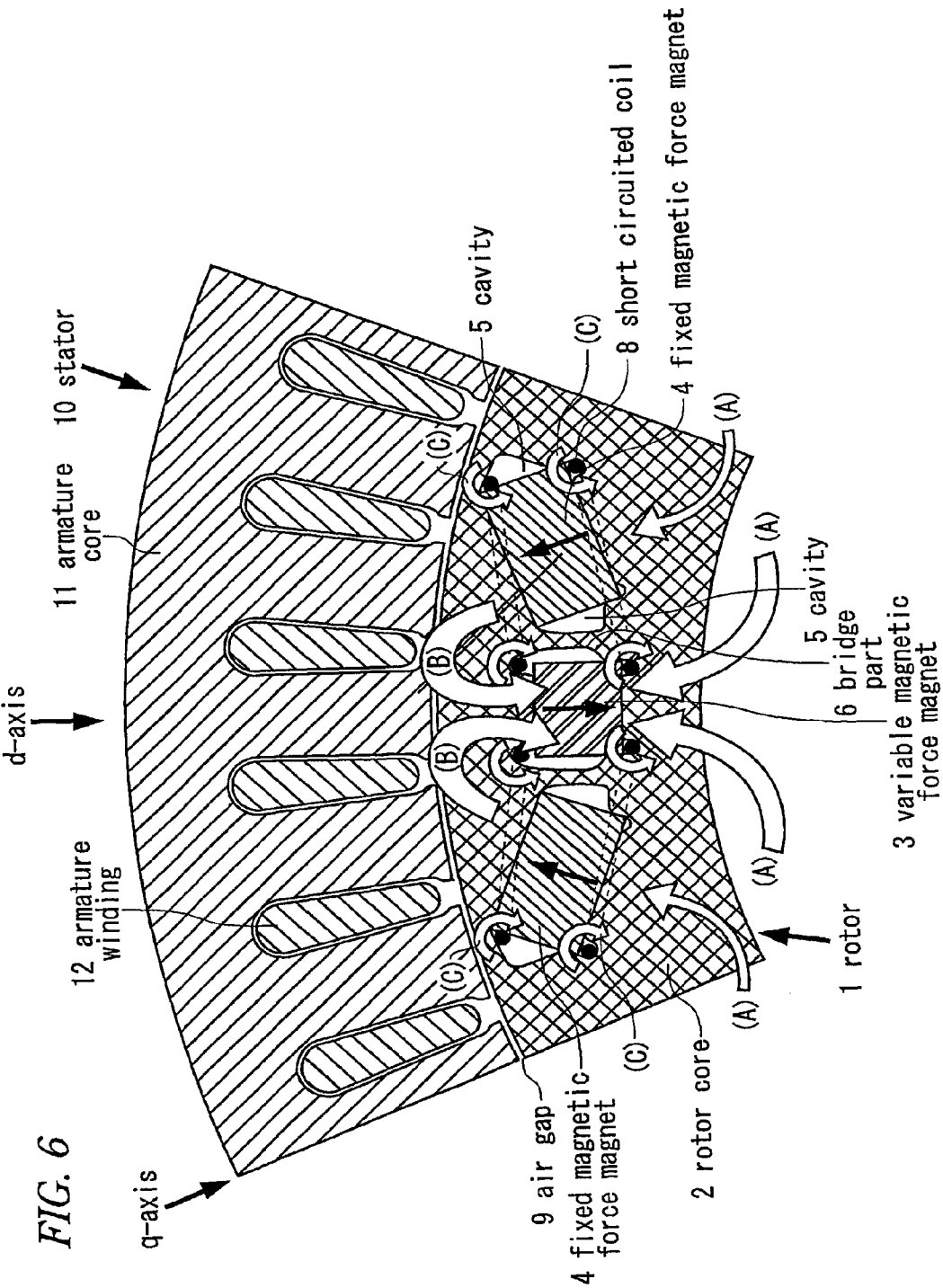
FIG. 6 is a partial cross section of the rotor and stator shown in Embodiment 4 according to the invention, and illustrates the variable magnetic force magnet during magnetization.
Figure 7:
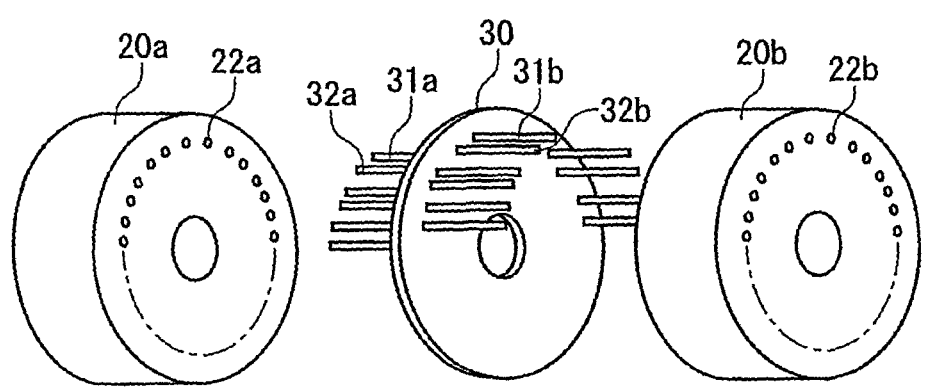
FIG. 7 is an exploded perspective view showing a state in the middle of assembling the rotor of Embodiment 4 according to the invention.
Figure 8:
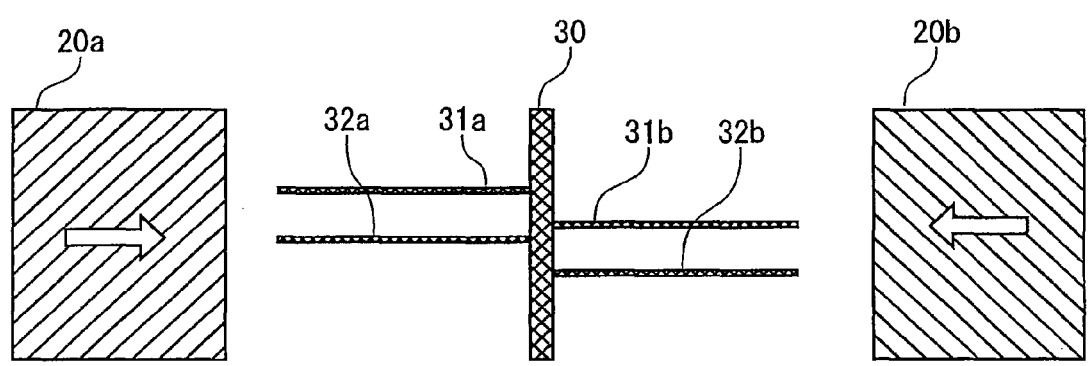
FIG. 8 is a cross section in a direction that is parallel to the rotation axis shown in Embodiment 4 according to the invention, and illustrates a state in the middle of assembling the core.
Figure 9:
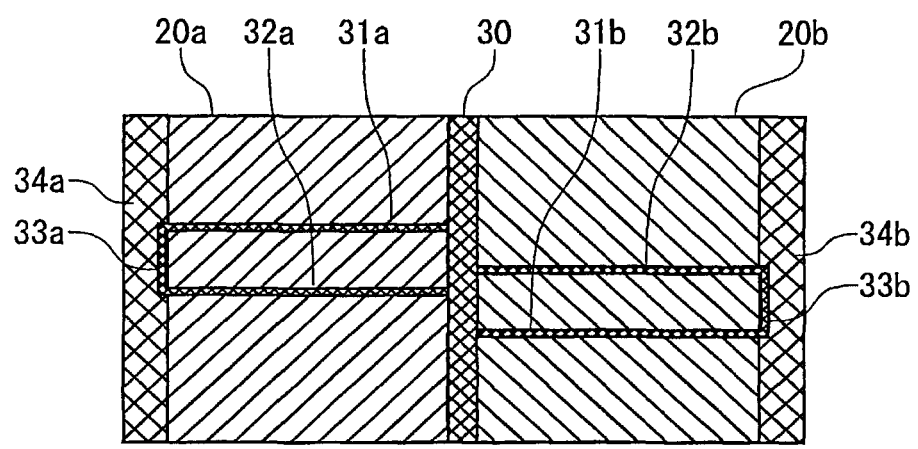
FIG. 9 is a cross section in a direction that is parallel to the rotation axis shown in Embodiment 4 according to the invention, and illustrates a completed state of the core.

Embodiment 4 according to the second invention is now specifically explained with reference to FIG. 5 to FIG. 9. FIG. 5 is a cross section in a direction that is orthogonal to the rotation axis of the permanent magnet electric motor of this embodiment, and illustrates the direction of the magnetic flux during demagnetization, and FIG. 6 similarly illustrates the direction of the magnetic flux during magnetization. FIG. 7 is an exploded perspective view showing a state in the middle of assembling the permanent magnet electric motor of this embodiment, FIG. 8 is similarly a cross section in a direction that is parallel to the rotation axis, and FIG. 9 is similarly a cross section of the completed state.

(1-1) Configuration of Permanent Magnet Electric Motor

The rotor 1 of Embodiment 4 according to the second invention is configured, as shown in FIG. 5, from a rotor core 2, a variable magnetic force magnet 3, and a fixed magnetic force magnet 4. The rotor core 2 is configured by laminating silicon steel plates, and the foregoing permanent magnet is embedded in the rotor core 2. A cavity 5 to becomes a magnetic barrier is provided at the end of the variable magnetic force magnet 3 and the fixed magnetic force magnet 4 so that the magnetic flux that passes through the rotor core 2 will pass through the thickness direction of the variable magnetic force magnet 3 and the fixed magnetic force magnet 4.

In the embodiments, a ferrite magnet or an alnico magnet was used as the variable magnetic force magnet 3, and a ferrite magnet was used in this embodiment. A NdFeB magnet was used as the fixed magnetic force magnet 4. The coercive force of the variable magnetic force magnet was set to 280 kA/m, and the coercive force of the fixed magnetic force magnet was set to 1000 kA/m. The variable magnetic force magnet 3 is disposed in the rotor core 2 along the d-axis at the center of the magnetic pole, and its magnetization direction is substantially a circumferential direction. The fixed magnetic force magnet 4 is disposed in the rotor core 2 on either end of the variable magnetic force magnet 3 so that the magnetization direction will have a predetermined angle relative to the d-axis direction.

The short circuited coil 8 is provided so as to surround the fixed magnetic force magnet 4 embedded in the rotor core 2. The short circuited coil 8 is configured from a ring-shaped conductive member, and is mounted by being fitted into the portion of the edge of the cavity 5 provided in the rotor core 2. Note that the short circuited coil 8 can also be formed by filling a conductive substance, which was melted at a high temperature, in a hole of the core of the rotor and performing casting thereto as described Embodiment 6 described later.

A short-circuit current is generated in the short circuited coil 8 based on the magnetic flux that is generated when a d-axis current is conducted to the armature winding. Thus, the short circuited coil 8 is provided to the magnetic path portion of the fixed magnetic force magnet 4 excluding the variable magnetic force magnet 3. In the foregoing case, the short circuited coil 8 is provided around the fixed magnetic force magnet 4 with the magnetization direction of the fixed magnetic force magnet 4 as the central axis.

In this embodiment, the short circuited coil 8 is provided above and below the fixed magnetic force magnet 4, respectively, but it may also be provided to one of above or below the fixed magnetic force magnet 4. Moreover, the short circuited coil 8 is provided in parallel to the upper face and lower face (direction that is orthogonal to the magnetization direction) of the fixed magnetic force magnet, but it is also possible to provide one or two in an X-shape in the diagonal direction of the short circuited coil. In addition, other than providing the short circuited coil 8 in close contact with the surface of the fixed magnetic force magnet, it may also be provided so as to surround the fixed magnetic force magnet and the bridge part 6 between the fixed magnetic force magnet and the variable magnetic force magnet as shown in the diagram.

The short circuited coil 8 is a type in which a short-circuit current of a level that changes the magnetization of the variable magnetic force magnet 3 flows for 1 second or less, and which attenuates the short-circuit current by 50% or more within 1 second thereafter. Moreover, it would be efficient if the inductance value and the resistance value of the short circuited coil 8 are set to a value that causes the flow of a short-circuit current of a level that changes the magnetization of the variable magnetic force magnet 3.

A stator 10 is provided at the outer periphery of the rotor 2 via an air gap 9. The stator 10 includes an armature core 11 and an armature winding 12. An induced current is induced to the short circuited coil 8 based on the magnetization current flowing to the armature winding 12, and the magnetic flux that penetrates the short circuited coil 8 is formed by the induced current.

Moreover, the magnetization direction of the variable magnetic force magnet 3 reversibly changes based on the magnetization current flowing to the armature winding 12; that is, the flux content of the variable magnetic force magnet 3 is irreversibly changed by magnetizing the permanent magnet 3 by the magnetic field generated by the d-axis current during the operation of the permanent magnet electric motor in relation to the variable magnetic force magnet and the fixed magnetic force magnet. In the foregoing case, the torque of the electric motor is controlled by the q-axis current simultaneously with causing the d-axis current for magnetizing the variable magnetic force magnet 3 to flow.

Moreover, based on the magnetic flux generated by the d-axis current, the current (total current upon synthesizing the q-axis current and the d-axis current) and the amount of interlinkage magnetic flux of the armature winding generated by the variable magnetic force magnet and the fixed magnetic force magnet (the amount of interlinkage magnetic flux of the overall armature winding configured from the magnetic flux generated in the armature winding based on the total current of the electric motor and the magnetic flux generated by the rotor-side variable magnetic force magnet and fixed magnetic force magnet) are changed substantially reversibly.

Particularly, in this embodiment, the variable magnetic force magnet 3 is irreversibly changed by the magnetic field generated based on a momentarily large d-axis current. Operation is performed by causing a d-axis current to continuously flow within a range where irreversible demagnetization is hardly generated or slight irreversible demagnetization is generated in the foregoing state. The d-axis current in this case works to promote the current phase and adjust the terminal voltage. In other words, an operation control method of inverting the polarity of the variable magnet 3 with a large d-axis current and promoting the current phase is performed. Since the polarity of the variable magnet 3 is inverted with the d-axis current as described above, even if a negative d-axis current that would lower the terminal voltage is caused to flow, it will be a magnetization field, and not a demagnetization field, for the variable magnet 3. In other words, the variable magnet 3 can adjust the size of the terminal voltage without being demagnetized by the negative d-axis current.

(1-2) Operation of Demagnetization and Magnetization

The operation during magnetization and during demagnetization in the permanent magnet electric motor of this embodiment having the foregoing configuration is now explained. Note that the direction of the magnetic force generated by the armature winding 12 and the short circuited coil 8 is shown with an arrow in the respective diagrams.

In this embodiment, a magnetic field is formed by causing a pulse-like current, in which the conducting period is an extremely-short time of approximately 0.1 ms to 100 ms, to flow to the armature winding 12 of the stator 10, and the magnetic field A is caused to work on the variable magnetic force magnet 3 (refer to FIG. 5). The pulse current which forms the magnetic field A for magnetizing the permanent magnet is the d-axis current component of the armature winding 12 of the stator 10.

If the thickness of the two types of permanent magnets is made to be substantially the same, the change in the magnetized state of the permanent magnet caused by the field of action generated by the d-axis current will change based on the size of the coercive force. A negative d-axis current, which generates a magnetic field in a direction that is opposite to the magnetization direction of the permanent magnet, is conducted to the armature winding 12 in a pulse-like manner. When the magnetic field A within the magnet that changed due to the negative d-axis current becomes −280 kA/m, the coercive force of the variable magnetic force magnet 3 will be 280 kA/m and, therefore, the magnetic force of the variable magnetic force magnet 3 will considerably decrease irreversibly.

Meanwhile, since the coercive force of the fixed magnetic force magnet 4 is 1000 kA/m, the magnetic force will not decrease irreversibly. Consequently, when the pulse-like d-axis current becomes 0, only the variable magnetic force magnet 3 becomes a demagnetized state, and the amount of interlinkage magnetic flux generated by the overall magnets can be decreased. In addition, when an opposing magnetic field that is greater than −280 kA/m is applied, the variable magnetic force magnet 3 is magnetized in the reverse direction and the polarity is inverted. In the foregoing case, since the magnetic flux of the variable magnetic force magnet 3 and the magnetic flux of the fixed magnetic force magnet 4 negate each other, the total interlinkage magnetic flux of the permanent magnets will become minimum.

In the foregoing case, since the direction of the magnetic force of the magnetic field generated by the fixed magnetic force magnet 4 will become the direction from the fixed magnetic force magnet 4 to the variable magnetic force magnet 3 as shown in B of FIG. 5, it will coincide with the direction of the magnetic force of the magnetic field generated by the armature winding 12, and, therefore, strong magnetic force will work in the direction of demagnetizing the variable magnetic force magnet 3. Simultaneously, an induced current that will negate the magnetic field A of the armature winding 12 is generated in the short circuited coil 8, and a magnetic field having a magnetic force direction as shown with arrow C in FIG. 5 is generated by the foregoing induced current. The magnetic force C generated by the short circuited coil 8 will also work so that the magnetization direction of the variable magnetic force magnet 3 is directed in the reverse direction. As a result of the above, the demagnetization and polarity inversion of the variable magnetic force magnet 3 are performed efficiently. In other words, since the direction of the magnetic force of the magnetic field C generated by the induced current that was induced by the short circuited coil 8 will coincide with the direction of the magnetic field A generated by the magnetization current at the portion that penetrates the variable magnetic force magnet 3, magnetization in the demagnetization direction can be also be performed effectively.

The process (magnetization process) of increasing the total interlinkage magnetic flux of the permanent magnets and restoring it to become maximum is now explained. In a state where the demagnetization is complete, as shown in FIG. 6, the polarity of the variable magnetic force magnet 3 is inverted, and a positive d-axis current, which generates a magnetic field of a reverse direction (initial magnetization direction shown in FIG. 5) relative to the inverted magnetization, is conducted to the armature winding 12. The magnetic force of the variable magnetic force magnet 3 of the inverted reverse polarity decreases as the magnetic field increases, and eventually becomes 0. When the magnetic field generated by the positive d-axis current is additionally increased, the polarity is inverted and magnetized in the direction of the initial polarity. When 350 kA/m as the magnetic field that is required for a substantially complete magnetization is applied, the variable magnetic force magnet 3 is magnetized and generates a substantially maximum magnetic force.

In the foregoing case, as with the case during demagnetization, the d-axis current does not need to be increased with continuous conduction, and a current that realizes the target magnetic force can be caused to flow as a momentary pulse current. Meanwhile, since the coercive force of the fixed magnetic force magnet 4 is 1000 kA/m, the magnetic force of the fixed magnetic force magnet 4 will not change irreversibly even when the magnetic field generated by the d-axis current works thereon. Consequently, when the pulse-like positive d-axis current becomes 0, only the variable magnetic force magnet 3 becomes a magnetized state, and the amount of interlinkage magnetic flux generated by the overall magnets can be increased. It is thereby possible to return the amount of interlinkage magnetic flux to the original maximum amount of interlinkage magnetic flux.

As described above, by causing the momentary magnetic field generated by the d-axis current to work on the variable magnetic force magnet 3 and the fixed magnetic force magnet 4, it is possible to irreversibly change the magnetic force of the variable magnetic force magnet 3 and arbitrarily change the total amount of interlinkage magnetic flux of the permanent magnets.

(1-3) Operation of Short Circuited Coil 8

The operation of the short circuited coil 8 is now explained. Since the variable magnetic force magnet 3 and the fixed magnetic force magnet 4 are embedded in the rotor core 2 and thereby configure the magnetic circuit, the magnetic field generated by the d-axis current not only works on the variable magnetic force magnet 3, it also works on the fixed magnetic force magnet 4. Originally, the magnetic field caused by the d-axis current is used for changing the magnetization of the variable magnetic force magnet 3. Thus, the magnetic field generated by the d-axis current is caused not to work on the fixed magnetic force magnet 4, and caused to be concentrated on the variable magnetic force magnet 3.

In this embodiment, the short circuited coil 8 is disposed around the fixed magnetic force magnet 4. In the foregoing case, the short circuited coil 8 is disposed with the magnetization direction of the fixed magnetic force magnet 4 as the central axis. As shown in FIG. 6, when performing magnetization in the magnetization direction of the variable magnetic force magnet 3, an induced current of negating the magnetic field A will flow to the short circuited coil 8 if the magnetic field A generated by the d-axis current works on the fixed magnetic force magnet 4. Accordingly, since the magnetic field A generated by the d-axis current and the magnetic field C generated by the short-circuit current work and negate each other in the fixed magnetic force magnet 4, there will hardly be any increase or decrease of the magnetic field.

In addition, the magnetic field C generated by the short-circuit current will also work on the variable magnetic force magnet 3 and become the same direction as the magnetic field A generated by the d-axis current. Accordingly, the magnetic field A for magnetizing the variable magnetic force magnet 3 will become stronger, and the variable magnetic force magnet 3 can be magnetized with a lower d-axis current. Moreover, since the direction of the magnetic force of the magnetic field C generated by the short circuited coil 8 is the opposite to the direction of the magnetic force of the magnetic field B generated by the fixed magnetic force magnet 4, it will also work on the direction that negates the magnetic force of the magnetic field B. Thus, the variable magnetic force magnet 3 can be effectively magnetized with a smaller magnetization current.

Here, since the fixed magnetic force magnet 4 will not be affected by the d-axis current generated by the short circuited coil 8 and hardly any increase or decrease of the magnetic flux will occur, the magnetic saturation of the armature core 11 caused by the d-axis current can also be alleviated. In other words, when the magnetic field A generated by the d-axis current passes through the magnetic path formed between the armature windings 12, there is a possibility that the armature core 11 will be subject to magnetic saturation at such portion. However, in this embodiment, the portion within the magnetic field C of the short circuited coil 8 which passes through the magnetic path of the armature core 11 works in a direction that is opposite to the magnetic field A generated by the d-axis current, and the magnetic path of the armature core 11 is alleviated from becoming subject to magnetic saturation.

(1-4) Manufacturing Method of Permanent Magnet Electric Motor

The permanent magnet electric motor of this embodiment having the foregoing configuration is manufactured as follows. In FIG. 7 to FIG. 9, reference numeral 20 shows the rotor of the permanent magnet electric motor of this embodiment, and the rotor 20 is divided into two from its central part in the axial direction, and is configured from a first core part 20a and a second core part 20b. As explained with reference to FIG. 5 and FIG. 6, each of the core parts 20a, 20b is formed with a mounting hole of the fixed magnetic force magnet and the variable magnetic force magnet, a cavity part to become the magnetic barrier, and insertion holes 22a, 22b of the short circuited coil so that they penetrate the core part in parallel to the axis of the rotor.

A conductive plate 30 having the same outer diameter as the core part is disposed between the core parts 20a, 20b. The conductive plate 30 is configured from a similar conductive material, such as copper or aluminum, as with the short circuited coil. A pair of conductive bars 31a, 32a that configure a part of the short circuited coil in one core part 20a is fixed to the front face of the conductive plate 30 and a pair of conductive bars 31b, 32b that configure a part of the short circuited coil in the other core part 20b is fixed to the rear face of the conductive plate 30 via means such as soldering. The conductive bars 31a to 32b have a length that is longer by ½ of the length of the circumferential direction of the rotor of the short circuited coil than the measurement of the respective core parts 20a, 20b in the rotation axis direction, and, when the conductive bars 31a to 32b are inserted into the short circuited coil mounting hole 22 from the inner side of the respective core parts (center side of the rotor), the tip thereof will protrude to the outside of the respective core parts (outer side of the rotor).

Although the conductive bars 31a, 30b are provided to both faces of the conductive plate 30, their arrangement position on the front face and rear face of the conductive plate 30 is different. In other words, with the permanent magnet electric motor of this embodiment, since the core parts 20a, 20b of the rotor is adopting a skew structure, the position of the variable magnetic force magnet and the fixed magnetic force magnet or the short circuited coil disposed therearound in the left and right core parts 20a, 20b of the rotor is displaced in the circumferential direction of the circumferential direction. Accordingly, the conductive bars 31a, 32a and 31b, 32b provided to both faces of the conductive plate 30 are also provided to positions that are displaced in the circumferential direction of the rotor on the front face and rear face of the conductive plate 30 in order to match the skew angle. Similarly, the short circuited coil insertion holes 22a, 22b to which the conductive bars 31a to 32b are to be inserted are also provided at positions that are displaced in the amount of the skew angle.

Note that FIG. 7 only shows a part of the short circuited coil insertion holes 22a, 22b and the conductive bars 31a to 32b, the number of insertion holes and conductive bars is set according to the number of magnetic poles, number of permanent magnets provided to the respective magnetic poles, and the number of short circuited coils provided to the respective permanent magnets.

As a result of sandwiching the conductive plate 30 configured as described above between the left and right core parts 20a, 20b in a state of the conductive bars 31a to 32b of both faces being inserted into the short circuited coil insertion holes 22a, 22b, the rotor 20 of this embodiment is configured. In the foregoing case, the left and right core parts 20a, 20b of the rotor are skewed, and, even when the position of the variable magnetic force magnet and the fixed magnetic force magnet configuring the magnetic pole is displaced in the circumferential direction, since the conductive bars 31a to 32b provided to the conductive plate 30 are also positioned by being displaced in the amount of the skew angle on the front face and rear face of the conductive plate, the conductive bar can be inserted into an appropriate position of the core (position of surrounding the fixed magnetic force magnet) by joining the left and right core parts 20a, 20b so as to sandwich the conductive plate 30.

When the conductive plate 30 is sandwiched by the left and right core parts 20a, 20b, the tip of the conductive bars 31a to 32b will protrude to the end face of the rotor 20 in the axial direction. Thus, the protruding tips of the conductive bars 31a and 32a and the tips of the conductive bars 31b and 32b are connected via short-circuit connection with means such as welding or soldering to form the short circuit connections 33a, 33b. Consequently, a short circuit coil made of a conductive plate 30→a conductive bar 31a→a short circuit connection 33a→a conductive bar 32a is formed in one core part 20a, and a short circuited coil made of a conductive plate 30→a conductive bar 31b→a short circuit connection 33b→a conductive bar 32b is formed in the other core part 20b. The outside of the short circuit connections 33a, 33b is covered by end plates 34a, 34b made from an insulating material or a member having greater electrical resistance than the conductive bar.

Note that, in substitute of forming the short circuit connections 33a, 33b by connecting the tips of the conductive bars 31a to 32b as described above, the tips of the conductive bars 31a to 32b can also be short-circuited with a conductive member that is prepared separately.

According to Embodiment 4 having the foregoing configuration, a short circuited coil can be disposed in the core of a skew structure with a simple process of forming the conductive bars 31a to 32b on both faces of the conductive plate 20 and fitting these into the left and right core parts 20a, 20b. Particularly, when providing the short circuited coil to surround the permanent magnet and its peripheral bridge part, the coils needed to inserted, one by one, into the short circuited coil insertion holes penetrating the core with the conventional method, and the process was complicated. However, in this embodiment, when sandwiching the conductive plate with the left and right core parts, all short circuited coils to be provided in the core can be mounted in the core at once by collectively inserting the conductive bars provided to the conductive plate into the insertion holes of the core part. Consequently, the mounting operation of the short circuited coil can be dramatically improved in comparison to conventional technology.

Moreover, at the central part of the rotor, the wire connection process and mounting process of the coil can be simplified by sharing a part of all short circuited coils with the conductive plate 30. Particularly, even in the case of a rotor of a skew structure, it is possible to flexibly deal with the skew angle or the position of the magnetic poles merely by changing the position of the conductive bars 31a to 32b that are fixed to the conductive plate 30.

Embodiment 5

Figure 10:
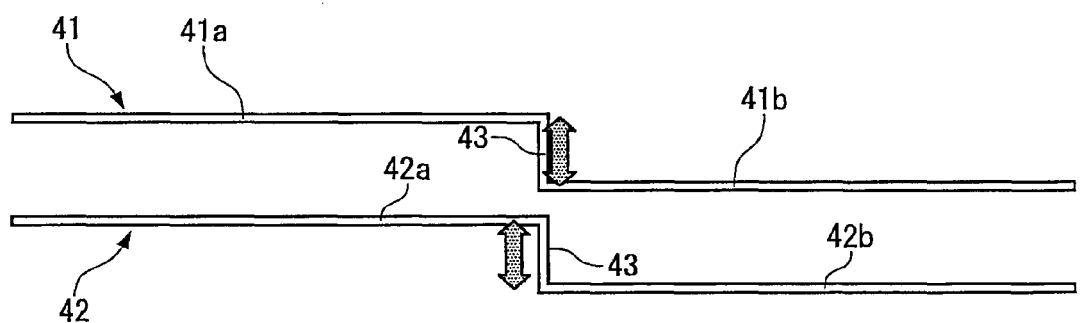
FIG. 10 is a plan view of the conductive bar in Embodiment 5 according to the invention.
Figure 11:
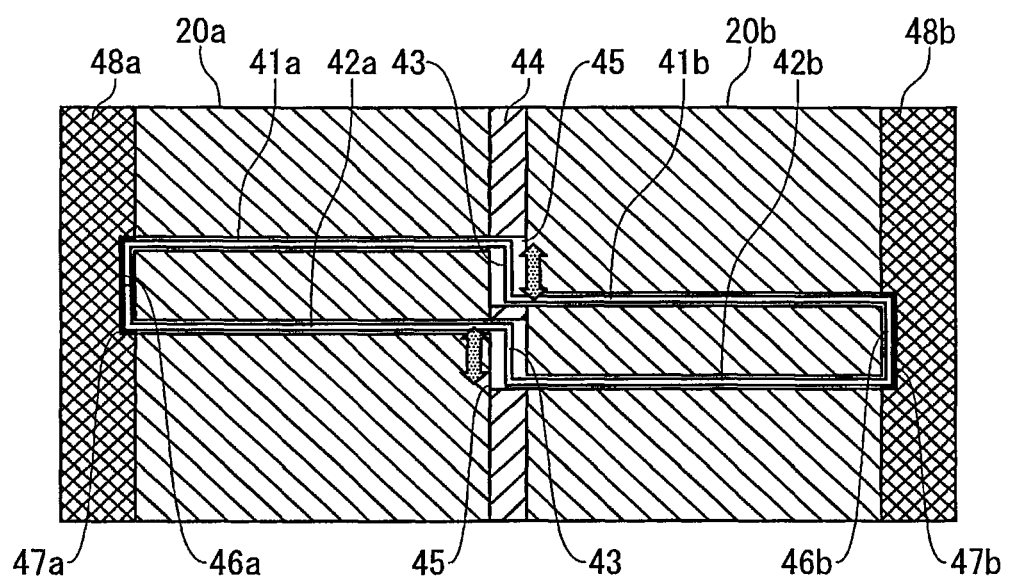
FIG. 11 is a cross section in a direction that is parallel to the rotation axis shown in Embodiment 5 according to the invention, and illustrates a completed state of the core.

Embodiment 5 obtains a short circuited coil that penetrates the left and right core parts 20a, 20b by providing a stepped part according to the skew angle for each of the individual conductive bars without using a conductive plate as in Embodiment 4. In other words, FIG. 10 is a plan view showing the pair of conductive bars 41, 42 that form the respective short circuited coils in Embodiment 5, and FIG. 11 is a cross section of the rotor having the short circuited coil that is formed by the conductive bars 41, 42.

The conductive bars 41, 42 comprise left and right core insertion parts 41a to 42b that are integrated by the stepped part 43 in the center. The core insertion parts 41a to 42b have a length that is longer by ½ of the length of the circumferential direction of the rotor of the short circuited coil than the measurement of the respective core parts 20a, 20b in the rotation axis direction, and, when the core insertion parts 41a to 42b are inserted into the short circuited coil mounting hole from the inner side of the respective core parts (center side of the rotor), the tip thereof will protrude to the outside of the respective core parts (outer side of the rotor).

In Embodiment 5, the rotor 20 is configured from the left and right core parts 20a, 20b having a given skew angle. Moreover, the point that the left and right core parts 20a, 20b are provided with a mounting hole of the variable magnetic force magnet and the fixed magnetic force magnet, a cavity part to become the magnetic barrier, and short circuited coil insertion holes at a position that is displaced in the amount of the skew angle is the same as Embodiment 4.

Meanwhile, the left and right core parts 20a, 20b are provided with a spacer disk 44 in substitute for the conductive plate of Embodiment 4. The spacer disk 44 is configured from a silicon steel plate as with the core parts 20a, 20b. In other words, since the spacer disk 44 does not configure a part of the short circuited coil, it does not have to possess conductive properties as in Embodiment 4; that is, it does not need to be configured from a material such as copper or aluminum. The spacer disk 44 is formed with a void part 45 where the stepped part 43 of the conductive bars 41, 42 is fitted.

Note that the pair of conductive bars 41, 42 and the void part 45 where the stepped part 43 is fitted are provided for each short circuited coil. Accordingly, when providing one or more short circuited coils for each magnetic pole, the pair of conductive bars 41, 42 and the void part 45 are prepared according to the number of short circuited coils.

With Embodiment 5 configured as described above, one end (for example, core insertion parts 41a, 42a) of the conductive bars 41, 42 is inserted into the short circuited coil insertion holes of the divided core part 20a of the rotor, and the spacer disk 44 is superimposed on the core part 20a so that the stepped part 43 of the conductive bars 41, 42 is positioned on the void part 45. In addition, the core part 20b on the other side is superimposed on the spacer disk 44 so that the core insertion parts 41b, 42b on the opposite side of the conductive bars 41, 42 protruding from the spacer disk 44 will enter the short circuited coil insertion holes. Thereafter, the tip part of the conductive bars 41, 42 protruding from the end of the core parts 20a, 20b in the axial direction is bent and connected to form the short circuit connections 46a, 46b, whereby the short circuited coil is configured.

Note that, in the foregoing case, the tip of the conductive bars 41, 42 can also be short-circuited with a member that is prepared separately. Moreover, as with Embodiment 4, it is also possible to set a plurality of conductive bars 41, 42 configuring the respective short circuited coils on the spacer disk 44 in the center, and mounting the left and right core parts 20a, 20b from either end thereof.

Thereafter, as with Embodiment 4, the outside of the short circuit connections 46a, 46b is covered by end plates 48a, 48b made from an insulating material or a member having greater electrical resistance than the conductive bar. Note that, when using a silicon steel plate as the end plate in substitute for the end plates 48a, 48b made from an insulating material, insulating members 47a, 47b are provided on the outside of the short circuit connection as shown in the diagram.

In Embodiment 5 described above, one short circuited coil that is bent in an amount of the skew is formed in the portion of the spacer disk 44 within the rotor core based on the conductive bars 41, 42 penetrating the left and right core parts 20a, 20b and the short circuit connections 46a, 46b formed at the end of the core parts 20a, 20b in the axial direction, and a short circuited coil can be disposed around the permanent magnet in the respective core parts 20a, 20b arranged at positions that are displaced in an amount of the skew angle within the rotor core.

Particularly, in Embodiment 5, since a conductive plate is not used at the center, the bonding operation of welding or soldering of the individual conductive bars and the conductive plates forming the short circuited coil is no longer required, and the manufacturing process can be simplified. Moreover, since a conductive plate will not exist in the center of the rotor and a silicon metal plate of the same quality as the core part can be used as the spacer disk, the magnetic property is also superior.

Embodiment 6

Figure 12:
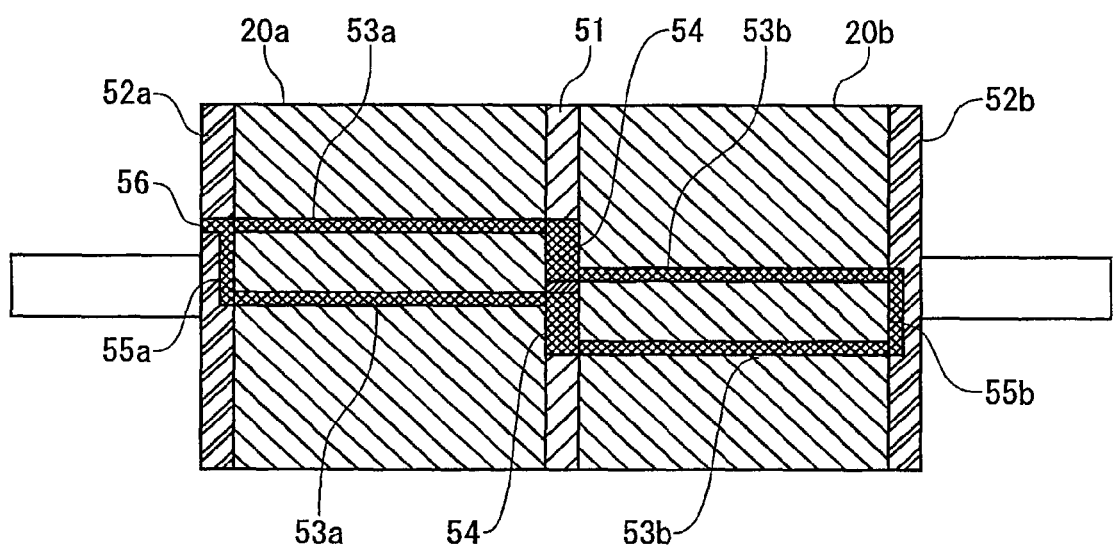
FIG. 12 is a cross section of the rotor shown in Embodiment 6 according to the invention, and illustrates a completed state of the core.

Embodiment 6 forms a short circuited coil by filling a melted conductive material in the conductive member injection hole of the rotor core and solidifying the conductive material. Embodiment 6 is now explained with reference to the cross section of FIG. 12.

In Embodiment 6, a spacer disk 51 is disposed between the left and right core parts 20a, 20b, and end plates 52a, 52b are disposed at the ends of the core parts 20a, 20b in the axial direction end. In each of the core parts 20a, 20b, the conductive material injection holes 53a, 53b are formed parallel to the axial direction of the rotor to match the position of the short circuited coil. In the foregoing case, the conductive member injection holes 53a, 53b of the left and right core parts 20a, 20b are formed at positions that are displaced in an amount of the skew angle of the core parts 20a, 20b.

The spacer disk 51 in the center is formed with a void part 54 that is in communication with an opening at the center of the core of the conductive member injection holes 53a, 53b formed on the left and right core parts. Moreover, the left and right end plates 52a, 52b are provided with circuit connections 55a, 55b that are in communication with an opening at the end side of the core of the conductive member injection holes 53a, 53b. One end plate (end plate 52a in the diagram) is provided with a filler hole 56, which is made from a conductive material, that is in communication with the short circuit connection 55a.

With Embodiment 6 configured as described above, a conductive metal such as melted copper or aluminum is filled from the filler hole 56 in a state where the left and right core parts 20a, 20b, the spacer disk 51 and the left and right end plates 52a, 52b are closely-attached and fixed integrally. Then, the conductive material flows into the conductive material injection holes 53a, 53b, the void part 54 and the short circuit connections 55a, 55b and becomes solidified, whereby a short circuited coil of a structure that is displaced in an amount of the skew angle is formed within the rotor core.

According to Embodiment 6, the trouble of inserting the individual conductive bars in the core can be eliminated, and a plurality of short circuited coils of a complex shape can be formed at once.

Embodiment 7

Figure 13:
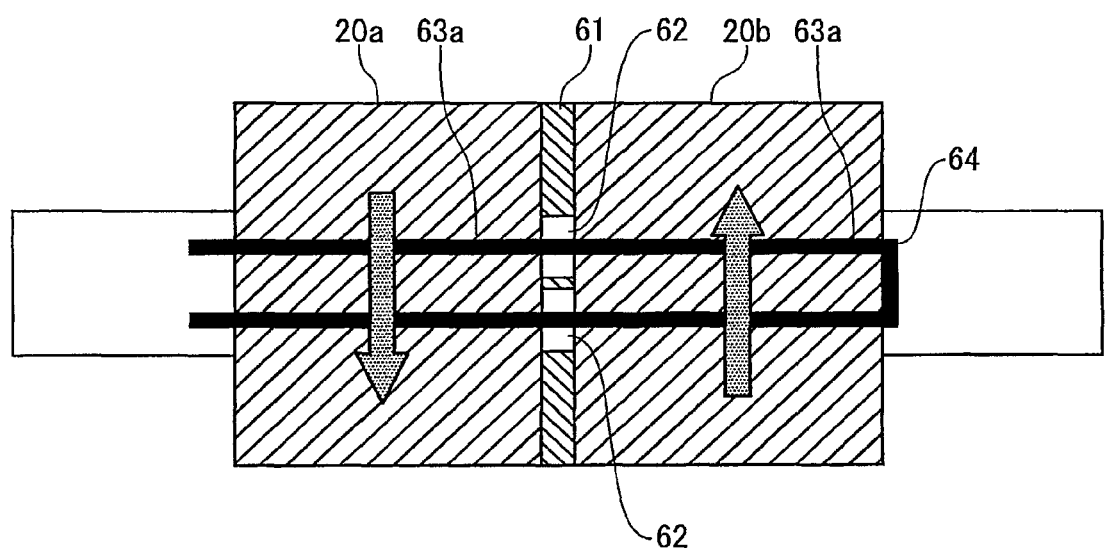
FIG. 13 is a cross section of the rotor shown in Embodiment 7 according to the invention, and illustrates a state in the middle of assembling the core.
Figure 14:
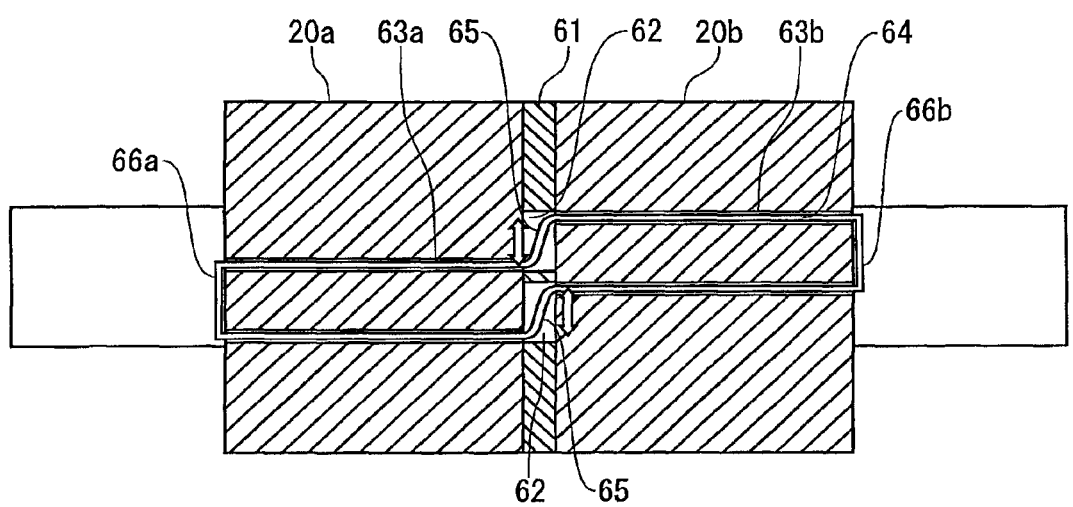
FIG. 14 is a cross section of the rotor shown in Embodiment 7 according to the invention, and illustrates a completed state of the core.

Embodiment 7 forms a short circuited coil of a shape that is displaced in an amount of the skew angle at the center part of the core by inserting a linear conductive bar in the left and right core parts, and respectively twisting the left and right core parts at an angle of being skewed in the reverse direction. FIG. 13 is a cross section before the twisting, and FIG. 14 is a cross section of the short circuited coil having a stepped portion in the amount of the skew angle that was obtained as a result of the twisting.

In Embodiment 7, the left and right core parts 20a, 20b are laminated via a space plate 61. The space plate 61 is provided with a void part 62 to which the stepped part according to the skew angle is fitted during the formation of the short circuited coil. Moreover, the left and right core parts 20a, 20b are respectively provided with a pair of short circuited coil insertion holes 63a, 63b in a direction that is parallel to the axial direction of the rotor. In the foregoing case, the respective insertion holes 63a, 63b are opened toward the void part 62 of the space plate 61. In the state before the respective cores are skewed, the insertion holes 63a, 63b are disposed in alignment. Two legs of the U-shaped conductive bar 64 are respectively inserted into the short circuited coil insertion holes 63a, 63b.

As shown in FIG. 13, in a state where the left and right core parts 20a, 20b and the space plate 61 are superimposed, the conductive bar 64 is inserted into the short circuited coil insertion holes 63a, 63b, and the left and right core parts are twisted in the amount of the skew angle. Then, as shown in FIG. 14, the conductive bar 64 is bent at the portion of the space plate 61 at the center of the core, and a stepped part 65 according to the skew angle is thereby formed. Thereafter, one short circuit connection 66a is formed by bonding the tips of the portion of the legs of the U-shaped conductive bar 64 that is exposed to one end face of the rotor core via welding or soldering. Note that the U-shaped connection becomes the other short circuit connection 66b.

According to Embodiment 7 configured as described above, a short circuited coil with a stepped portion within the core can be easily manufactured merely by inserting a U-shaped conductive bar 64 into linearly disposed insertion holes 63a, 63b and twisting the core parts. Particularly, since the conductive bar 64 only needs to be inserted from one direction of the core, the manufacturing process can be simplified in comparison to the technique of fitting the core parts on either side of the conductive bar. Moreover, since the conductive bar merely needs to be U-shape, the processing thereof is easy, and, since the skew angle is decided based on the amount of twisting of the core part, the conductive bar itself does not need to give consideration to the skew angle, and can be applied to a electric motor regardless of its skew angle.

[Third Invention]

The third invention of this application is characterized in that a conductive plate is provided to the magnetic path portion of the other permanent magnets excluding the permanent magnet to be changed irreversibly, the periphery of the other permanent magnets with the magnetization direction of the other permanent magnets as the central axis, or the magnetic path portion where the magnetic flux of magnets other than the magnet to be changed irreversibly will leak, a short-circuit current is generated in the conductive plate based on the magnetic flux generated by conducting the magnetization current to the armature winding, and using the foregoing short-circuit current to generate a magnetic field having a magnetic force in a direction that is opposite to the magnetic field generated by the magnetization current. Particularly, in the third invention, a block part can be provided above and below, around, on the entire surface of the fixed magnetic force magnet or the block part as the magnetic path portion where the magnetic flux will leak.

According to the third invention configured as described above, since it is possible to inhibit the increase of the d-axis current during magnetization by generating an induced current in the conductive plate and negating the magnetic field that is generated in the fixed magnetic force magnet by using the foregoing induced current, the increase of the magnetization current during the demagnetization and magnetization of the magnetic pole of the rotor can be inhibited, thereby improving the efficiency of the motor.

The respective embodiments of the permanent magnet electric motor according to the third invention are now explained with reference to FIG. 15 to FIG. 32. The electric motor of this embodiment is explained as a case of having twelve poles, but this embodiment can also be similarly applied to other number of poles.

Embodiment 8

(1-1) Configuration

Figure 15:
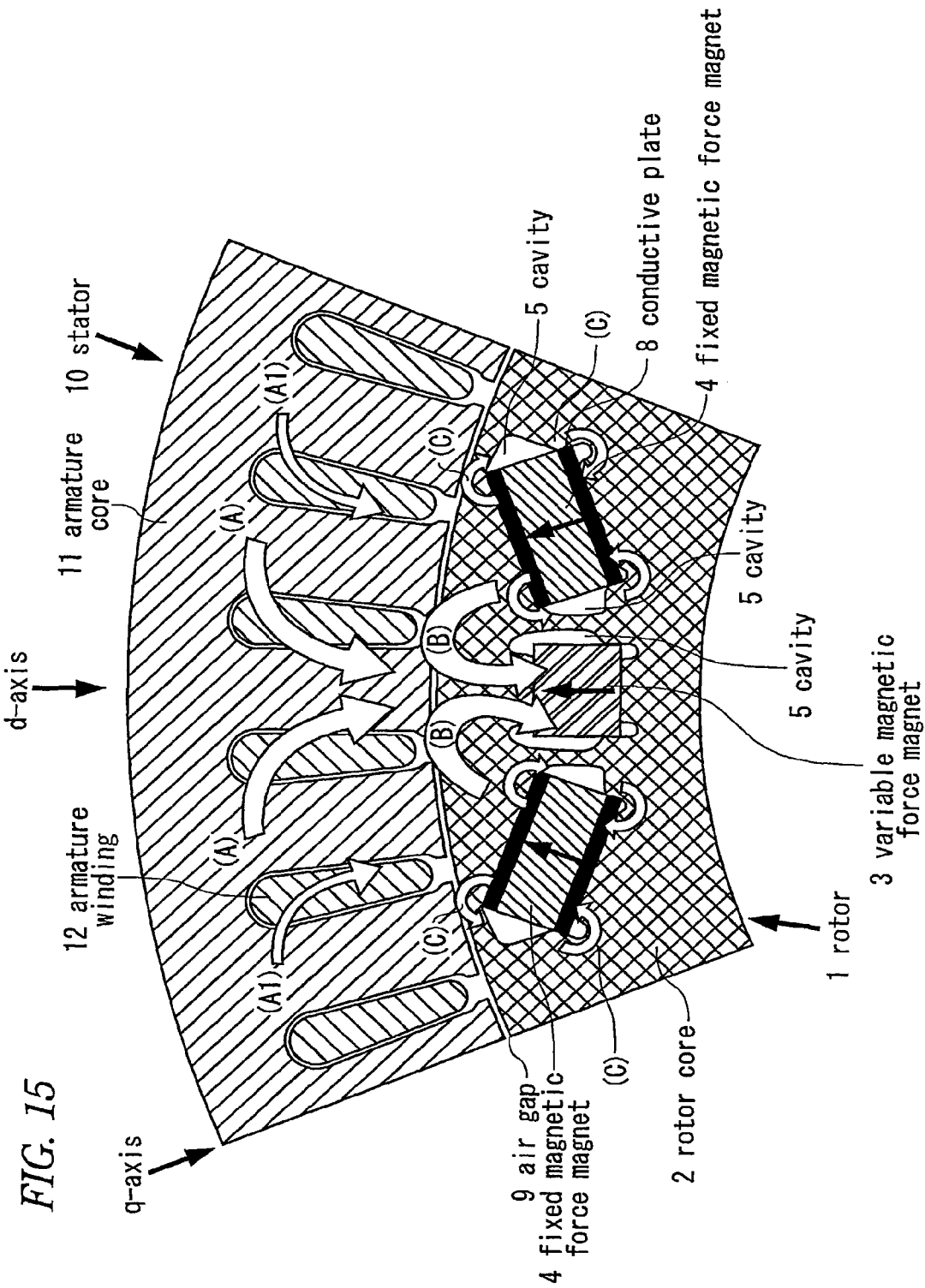
FIG. 15 is a partial cross section of the rotor and stator shown in Embodiment 8 according to the invention, and illustrates the direction of the magnetic flux during demagnetization.
Figure 16:
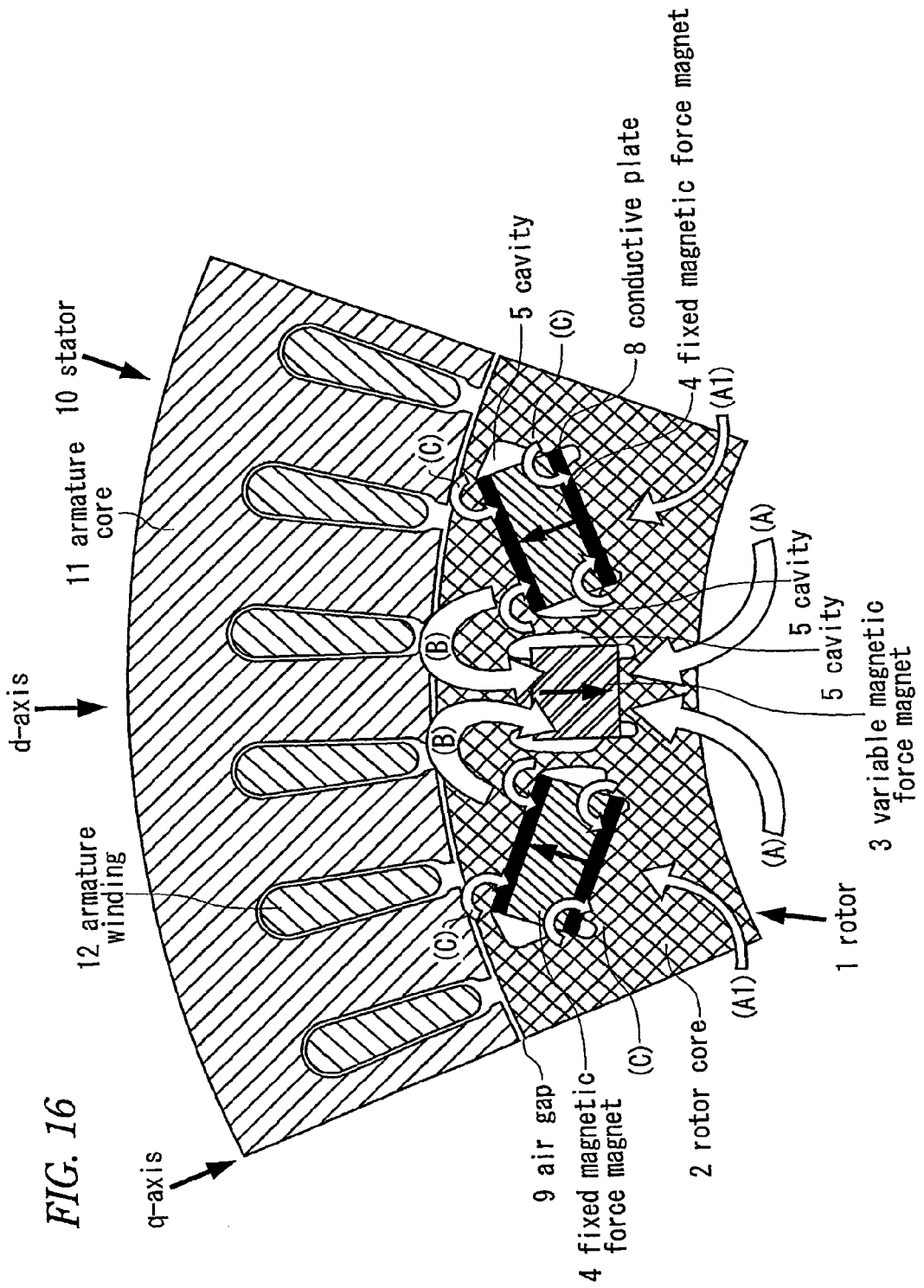
FIG. 16 is a partial cross section of the rotor and stator shown in Embodiment 8 according to the invention, and illustrates the direction of the magnetic flux during magnetization.
Figure 17:
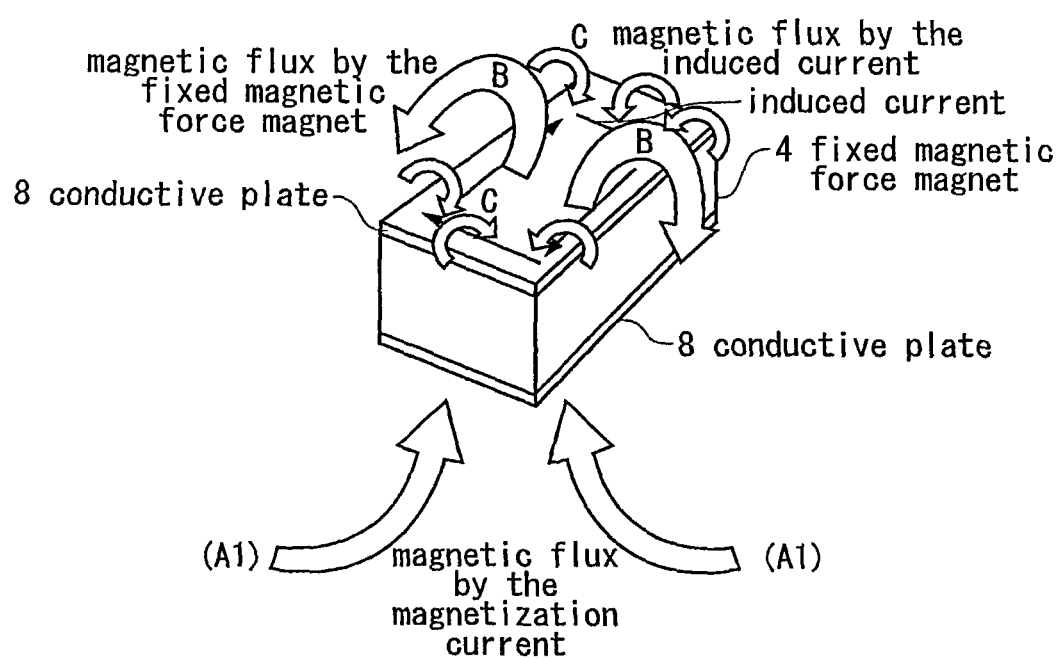
FIG. 17 is a perspective view of the fixed magnetic force magnet 4 and the conductive plate 8 showing the direction of the magnetic flux during magnetization in Embodiment 8 according to the invention.

Embodiment 8 according to the third invention is now explained with reference to FIG. 15 to FIG. 17. FIG. 15 is a cross section in a direction that is orthogonal to the rotation axis of the permanent magnet electric motor of this embodiment, and illustrates the direction of the magnetic flux during demagnetization, and FIG. 16 similarly illustrates a direction of the magnetic flux during magnetization. FIG. 17 is a perspective view of the fixed magnetic force magnet 4 and the conductive plate 8 showing the direction of the magnetic flux during magnetization.

The rotor 1 of Embodiment 8 according to the third invention is configured, as shown in FIG. 15, from a rotor core 2, a permanent magnet 3 in which the product of the coercive force and the thickness in the magnetization direction becomes small (hereinafter referred to as the "variable magnetic force magnet"), and permanent magnets 4, 4 in which the product of the coercive force and the thickness in the magnetization direction becomes large (hereinafter referred to as the "fixed magnetic force magnets"). The rotor core 2 is configured by laminating silicon steel plates, and the foregoing variable magnetic force magnet 3 and fixed magnetic force magnets 4, 4 are embedded in the rotor core 2. A cavity 5 to becomes a magnetic barrier is provided at the end of the variable magnetic force magnet 3 and the fixed magnetic force magnet 4 so that the magnetic flux that passes through the rotor core 2 will pass through the thickness direction of the variable magnetic force magnet 3 and the fixed magnetic force magnet 4.

In the embodiments, a ferrite magnet or an alnico magnet was used as the variable magnetic force magnet 3, and a ferrite magnet was used in this embodiment. A NdFeB magnet was used as the fixed magnetic force magnet 4. The coercive force of the variable magnetic force magnet was set to 280 kA/m, and the coercive force of the fixed magnetic force magnet was set to 1000 kA/m. The variable magnetic force magnet 3 is disposed in the rotor core 2 along the d-axis at the center of the magnetic pole, and its magnetization direction is substantially a circumferential direction. The fixed magnetic force magnet 4 is disposed in the rotor core 2 on either end of the variable magnetic force magnet 3 so that the magnetization direction will have a predetermined angle relative to the d-axis direction.

A thin tabular conductive plate 8 is disposed so as to cover the entire surface of the upper side and lower side of the fixed magnetic force magnet 4 embedded in the rotor core 2. The conductive plate 8 is penetrated by the magnetic flux that is generated when the d-axis current is conducted to the fixed magnetic force magnet 4 together with the armature winding, and a short-circuit current that circulates spirally is generated on the surface of the tabular conductive plate 8 at such time.

In other words, the conductive plate 8 is a type in which a short-circuit current of a level that changes the magnetization of the variable magnetic force magnet 3 flows for 1 second or less, and which attenuates the short-circuit current by 50% or more within 1 second thereafter. Moreover, it would be efficient if the inductance value and the resistance value of the conductive plate 8 are set to a value that causes the flow of a short-circuit current of a level that changes the magnetization of the variable magnetic force magnet 3.

A stator 10 is provided at the outer periphery of the rotor 2 via an air gap 9. The stator 10 includes an armature core 11 and an armature winding 12. An induced current is induced to the conductive plate 8 based on the magnetization current flowing to the armature winding 12, and the magnetic flux that penetrates the conductive plate 8 is formed by the induced current.

The magnetization direction of the variable magnetic force magnet 3 reversibly changes based on the magnetization current flowing to the armature winding 12; that is, the flux content of the variable magnetic force magnet 3 is irreversibly changed by magnetizing the permanent magnet 3 by the magnetic field generated by the d-axis current during the operation of the permanent magnet electric motor in relation to the variable magnetic force magnet and the fixed magnetic force magnet. In the foregoing case, the torque of the electric motor is controlled by the q-axis current simultaneously with causing the d-axis current for magnetizing the variable magnetic force magnet 3 to flow.

Moreover, based on the magnetic flux generated by the d-axis current, the current (total current upon synthesizing the q-axis current and the d-axis current) and the amount of interlinkage magnetic flux of the armature winding generated by the variable magnetic force magnet and the fixed magnetic force magnet (the amount of interlinkage magnetic flux of the overall armature winding configured from the magnetic flux generated in the armature winding based on the total current of the electric motor and the magnetic flux generated by the rotor-side variable magnetic force magnet and fixed magnetic force magnet) are changed substantially reversibly.

Particularly, in this embodiment, the variable magnetic force magnet 3 is irreversibly changed by the magnetic field generated based on a momentarily large d-axis current. Operation is performed by causing a d-axis current to continuously flow within a range where irreversible demagnetization is hardly generated or slight irreversible demagnetization is generated in the foregoing state. The d-axis current in this case works to promote the current phase and adjust the terminal voltage. In other words, an operation control method of inverting the polarity of the variable magnet 3 with a large d-axis current and promoting the current phase is performed. Since the polarity of the variable magnet 3 is inverted with the d-axis current as described above, even if a negative d-axis current that would lower the terminal voltage is caused to flow, it will be a magnetization field, and not a demagnetization field, for the variable magnet 3. In other words, the variable magnet 3 can adjust the size of the terminal voltage without being demagnetized by the negative d-axis current.

(1-2) Fundamental Operation

The operation during magnetization and during demagnetization in the permanent magnet electric motor of this embodiment having the foregoing configuration is now explained. Note that the direction of the magnetic force generated by the armature winding 12 and the conductive plate 8 is shown with an arrow in the respective diagrams.

In this embodiment, a magnetic field is formed by causing a pulse-like current, in which the conducting period is an extremely-short time of approximately 0.1 ms to 100 ms, to flow to the armature winding 12 of the stator 10, and the magnetic field A is caused to work on the variable magnetic force magnet 3 (refer to FIG. 15). The pulse current which forms the magnetic field A for magnetizing the permanent magnet is the d-axis current component of the armature winding 12 of the stator 10. Here, the magnetic field A1 that works on magnets other than the variable magnetic force magnet 3 is also created from the pulse current.

If the thickness of the two types of permanent magnets is made to be substantially the same, the change in the magnetized state of the permanent magnet caused by the field of action generated by the d-axis current will change based on the size of the coercive force. A negative d-axis current, which generates a magnetic field in a direction that is opposite to the magnetization direction of the permanent magnet, is conducted to the armature winding 12 in a pulse-like manner. When the magnetic field A within the magnet that changed due to the negative d-axis current becomes −280 kA/m, the coercive force of the variable magnetic force magnet 3 will be 280 kA/m and, therefore, the magnetic force of the variable magnetic force magnet 3 will considerably decrease irreversibly.

Meanwhile, since the coercive force of the fixed magnetic force magnet 4 is 1000 kA/m, the magnetic force will not decrease irreversibly. Consequently, when the pulse-like d-axis current becomes 0, only the variable magnetic force magnet 3 becomes a demagnetized state, and the amount of interlinkage magnetic flux generated by the overall magnets can be decreased. In addition, when an opposing magnetic field that is greater than −280 kA/m is applied, the variable magnetic force magnet 3 is magnetized in the reverse direction and the polarity is inverted. In the foregoing case, since the magnetic flux of the variable magnetic force magnet 3 and the magnetic flux of the fixed magnetic force magnet 4 negate each other, the total interlinkage magnetic flux of the permanent magnets will become minimum.

In the foregoing case, since the direction of the magnetic force of the magnetic field generated by the fixed magnetic force magnet 4 will become the direction from the fixed magnetic force magnet 4 to the variable magnetic force magnet 3 as shown in B of FIG. 15, it will coincide with the direction of the magnetic force of the magnetic field generated by the armature winding 12, and, therefore, strong magnetic force will work in the direction of demagnetizing the variable magnetic force magnet 3. Simultaneously, an induced current that will negate the magnetic field A of the armature winding 12 is generated in the conductive plate 8, and a magnetic field having a magnetic force direction as shown with arrow C in FIG. 5 is generated by the foregoing induced current. The magnetic force C generated by the conductive plate 8 will also work so that the magnetization direction of the variable magnetic force magnet 3 is directed in the reverse direction. As a result of the above, the demagnetization and polarity inversion of the variable magnetic force magnet 3 are performed efficiently. In other words, since the direction of the magnetic force of the magnetic field C generated by the induced current that was induced by the conductive plate 8 will coincide with the direction of the magnetic field A generated by the magnetization current at the portion that penetrates the variable magnetic force magnet 3, magnetization in the demagnetization direction can be also be performed effectively.

The process (magnetization process) of increasing the total interlinkage magnetic flux of the permanent magnets and restoring it to become maximum is now explained. In a state where the demagnetization is complete, as shown in FIG. 16 and FIG. 17, the polarity of the variable magnetic force magnet 3 is inverted, and a positive d-axis current, which generates a magnetic field of a reverse direction (initial magnetization direction shown in FIG. 15) relative to the inverted magnetization, is conducted to the armature winding 12. The magnetic force of the variable magnetic force magnet 3 of the inverted reverse polarity decreases as the magnetic field increases, and eventually becomes 0. When the magnetic field generated by the positive d-axis current is additionally increased, the polarity is inverted and magnetized in the direction of the initial polarity. When 350 kA/m as the magnetic field that is required for a substantially complete magnetization is applied, the variable magnetic force magnet 3 is magnetized and generates a substantially maximum magnetic force.

In the foregoing case, as with the case during demagnetization, the d-axis current does not need to be increased with continuous conduction, and a current that realizes the target magnetic force can be caused to flow as a momentary pulse current. Meanwhile, since the coercive force of the fixed magnetic force magnet 4 is 1000 kA/m, the magnetic force of the fixed magnetic force magnet 4 will not change irreversibly even when the magnetic field generated by the d-axis current works thereon. Consequently, when the pulse-like positive d-axis current becomes 0, only the variable magnetic force magnet 3 becomes a magnetized state, and the amount of interlinkage magnetic flux generated by the overall magnets can be increased. It is thereby possible to return the amount of interlinkage magnetic flux to the original maximum amount of interlinkage magnetic flux.

As described above, by causing the momentary magnetic field generated by the d-axis current to work on the variable magnetic force magnet 3 and the fixed magnetic force magnet 4, it is possible to irreversibly change the magnetic force of the variable magnetic force magnet 3 and arbitrarily change the total amount of interlinkage magnetic flux of the permanent magnets.

In the foregoing case, the variable magnetic force magnet 3 is magnetized so that the magnetic flux of the permanent magnets of the magnetic poles will be added during the maximum torque of the permanent magnet electric motor, and the variable magnetic force magnet 3 is magnetized in the magnetic field generated by the current during a light load with a small torque or in a mid revolution area or a high revolution area so as to decrease the magnetic flux. Moreover, when the magnets of the magnetic poles are changed irreversibly to minimize the interlinkage magnetic flux and the rotor reaches the highest rotating speed in the foregoing state, the induced electromotive voltage generated by the permanent magnets is set to be not greater than the withstand voltage of the inverter electronic parts as the power source of the electric motor.

(1-3) Operation of Conductive Plate 8

The operation of the conductive plate 8 is now explained. Since the variable magnetic force magnet 3 and the fixed magnetic force magnet 4 are embedded in the rotor core 2 and thereby configure the magnetic circuit, the magnetic field generated by the d-axis current not only works on the variable magnetic force magnet 3, it also works on the fixed magnetic force magnet 4. Originally, the magnetic field caused by the d-axis current is used for changing the magnetization of the variable magnetic force magnet 3. Thus, the magnetic field generated by the d-axis current is caused not to work on the fixed magnetic force magnet 4, and caused to be concentrated on the variable magnetic force magnet 3.

In this embodiment, the conductive plate 8 is disposed on both the upper face and lower face of the fixed magnetic force magnet 4 with the magnetization direction of the fixed magnetic force magnet 4 as the central axis. As shown in FIG. 16 and FIG. 17, when performing magnetization in the magnetization direction of the variable magnetic force magnet 3, an induced current of negating the magnetic field A1 will flow to the conductive plate 8 if the magnetic field A1 generated by the d-axis current works on the fixed magnetic force magnet 4. Thus, since the magnetic field A1 generated by the d-axis current and the magnetic field C generated by the short-circuit current work and negate each other in the fixed magnetic force magnet 4, there will hardly be any increase or decrease of the magnetic field. Accordingly, the variable magnetic force magnet 3 can be magnetized with a smaller d-axis current. In other words, the variable magnetic force magnet 3 can be effectively magnetized with a smaller magnetization current.

Here, since the fixed magnetic force magnet 4 will not be affected by the d-axis current generated by the conductive plate 8 and hardly any increase or decrease of the magnetic flux will occur, the magnetic saturation of the armature core 11 caused by the d-axis current can also be alleviated. In other words, when the magnetic field A+magnetic field A1 generated by the d-axis current passes through the magnetic path formed between the armature windings 12, there is a possibility that the armature core 11 will be subject to magnetic saturation at such portion. However, in this embodiment, since the magnetic field C of the conductive plate 8 can negate the magnetic field A1 and achieve magnetic field A1≈0, the components generated by the magnetic field A1 in the magnetic flux that passes through the magnetic path of the armature core 11 will decrease, and the magnetic path of the armature core 11 is alleviated from becoming subject to magnetic saturation.

Embodiment 9

Figure 18:
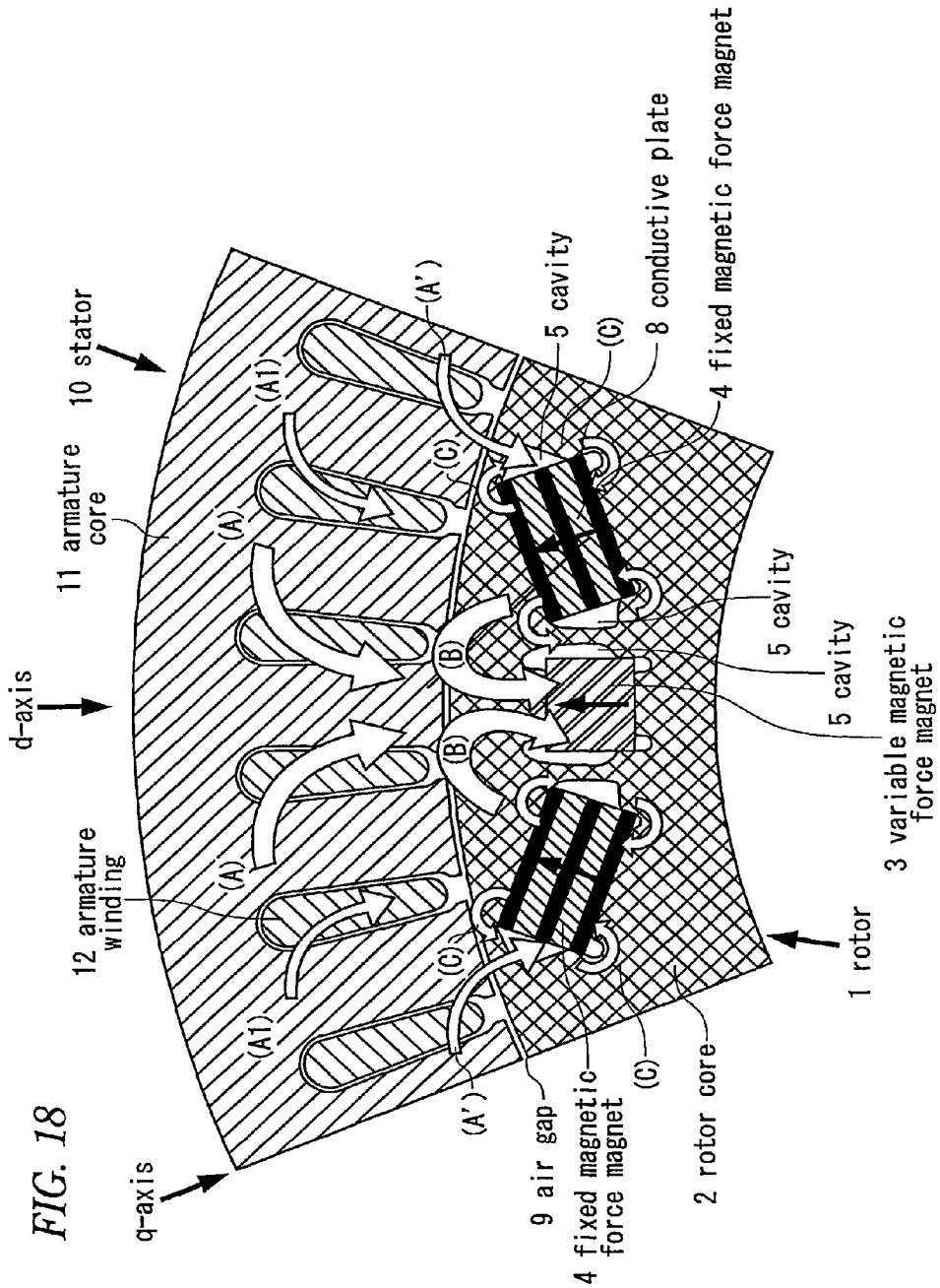
FIG. 18 is a partial cross section of the rotor and stator shown in Embodiment 9 according to the invention, and illustrates the direction of the magnetic flux during demagnetization.
Figure 19:
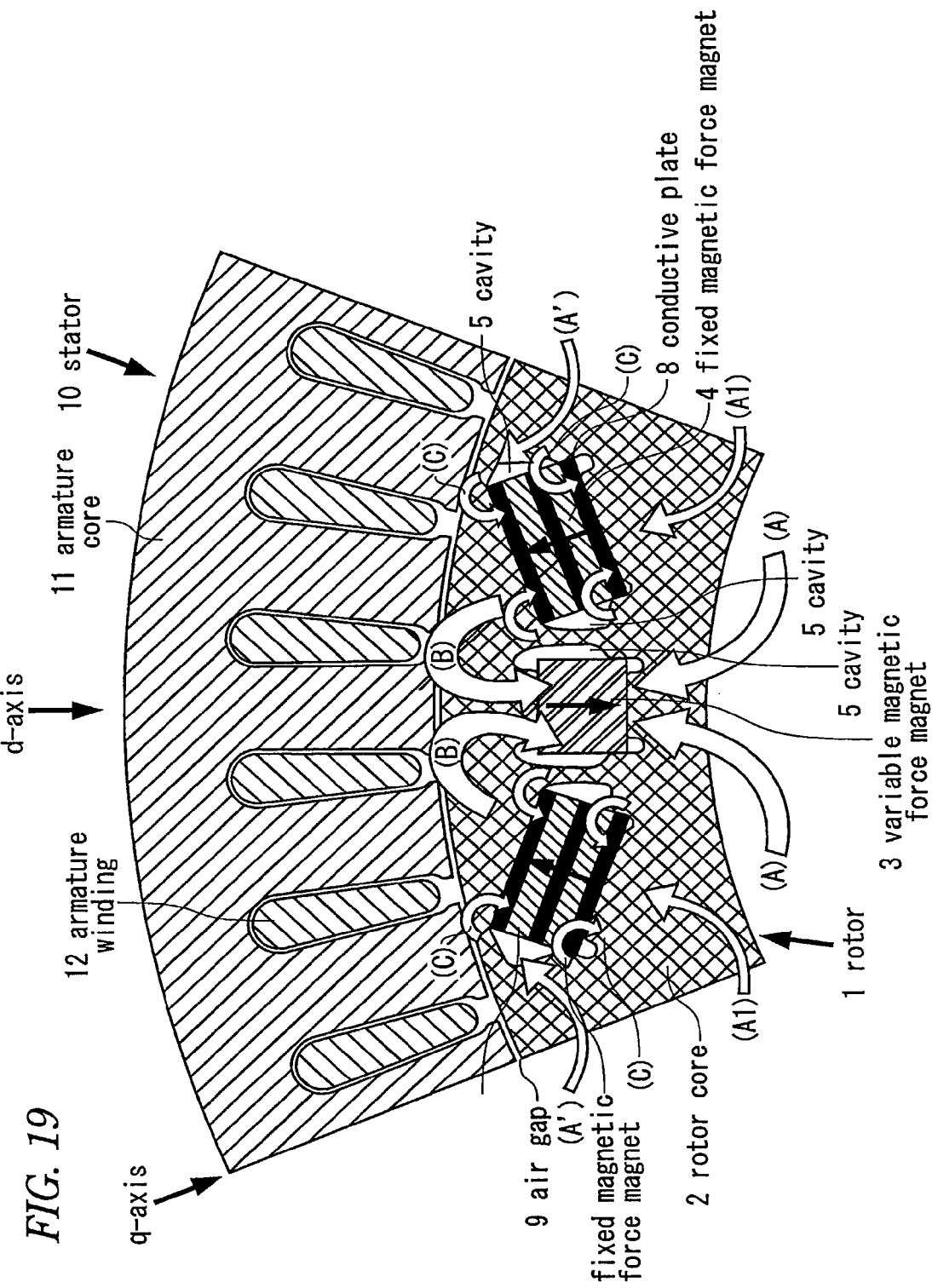
FIG. 19 is a partial cross section of the rotor and stator shown in Embodiment 9 according to the invention, and illustrates the direction of the magnetic flux during magnetization.
Figure 20:
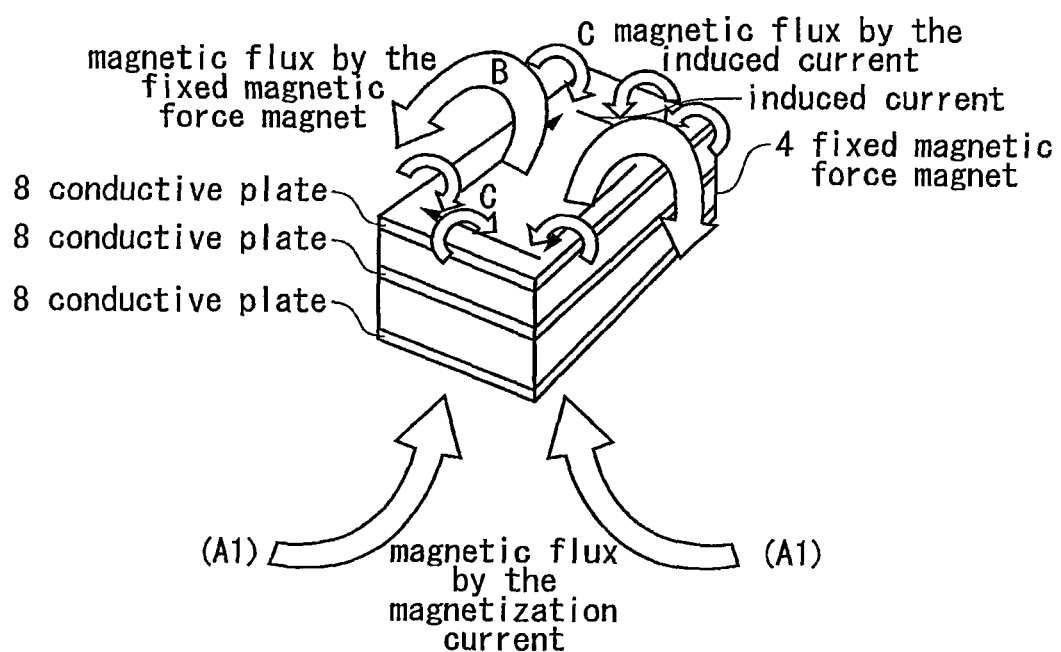
FIG. 20 is a perspective view of the fixed magnetic force magnet 4 and the conductive plate 8 showing the direction of the magnetic flux during magnetization in Embodiment 9 according to the invention.

Embodiment 9 according to the third invention is now explained with reference to FIG. 18 to FIG. 20. FIG. 18 is a cross section in a direction that is orthogonal to the rotation axis of the permanent magnet electric motor of this embodiment, and illustrates the direction of the magnetic flux during demagnetization, and FIG. 19 similarly illustrates the direction of the magnetic flux during magnetization. FIG. 20 is a perspective view of the fixed magnetic force magnet 4 and the conductive plate 8 showing the direction of the magnetic flux during magnetization.

In Embodiment 9, the conductive plate 8 is disposed, in addition to both the upper face and lower face of the fixed magnetic force magnet 4, inside the fixed magnetic force magnet 4 in parallel to the upper and lower conductive plates 8. In other words, the respective conductive plates 8 are provided so as to be orthogonal to the direction of the magnetic flux that is generated by the d-axis current (magnetization current).

In this embodiment configured as described above, in addition to the operation and effect of foregoing Embodiment 8, the following characteristics are yielded. In other words, when magnetizing the variable magnetic force magnet 3 in the demagnetization direction as shown in FIG. 18, the short-circuit current generated by the magnetic field A' flowing from the lateral side to the upper side of the fixed magnetic force magnet 4 will also flow to the conductive plate 8 disposed inside the fixed magnetic force magnet 4. When performing magnetization that is opposite to the above, as shown in FIG. 19, the short-circuit current generated by the magnetic field A' flowing from the upper side to the lateral side of the fixed magnetic force magnet 4 will also flow to the internal conductive plate 8. Consequently, the magnetic force of the magnetic field A' that enters the fixed magnetic force magnet 4 from the lateral side can be attenuated by changing it into a short-circuit current, and the magnetic field A' increases the magnetic force of the fixed magnetic force magnet 4 so as to inhibit it from obstructing the magnetization of the variable magnetic force magnet 3.

In addition, with Embodiment 8 and Embodiment 9 described above, since the conductive plate 8 can be formed as a tabular member, the mounting operation of the conductive plate 8 during the manufacture of the permanent magnet electric motor can be simplified. Particularly, if the fixed magnetic force magnet 4 and the conductive plate 8 are integrated in advance by being superimposed, the conductive plate 8 can be mounted with a similar process as mounting a standard permanent magnet on the core.

Embodiment 10

Figure 21:
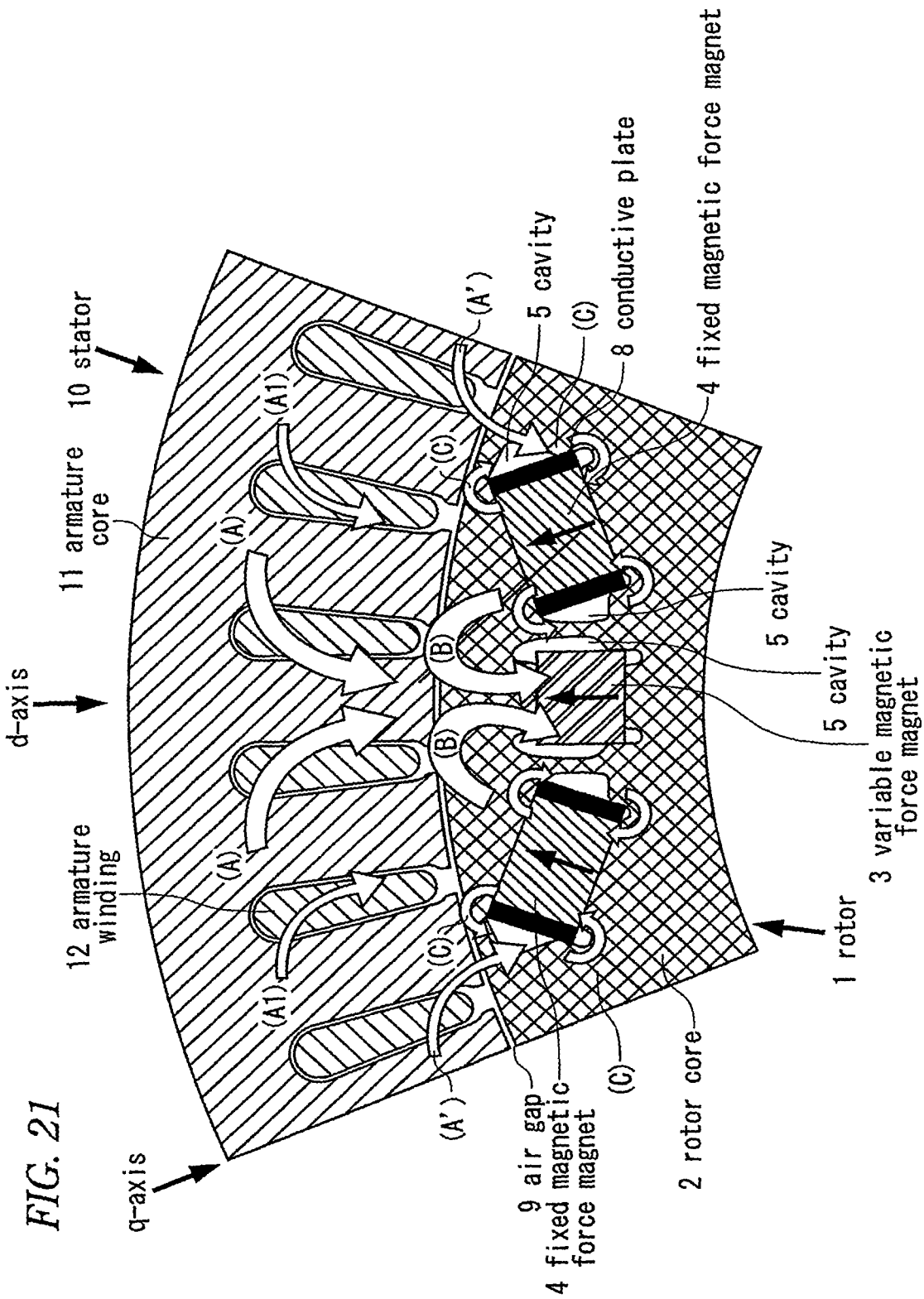
FIG. 21 is a partial cross section of the rotor and stator shown in Embodiment 10 according to the invention, and illustrates the direction of the magnetic flux during demagnetization.
Figure 22:
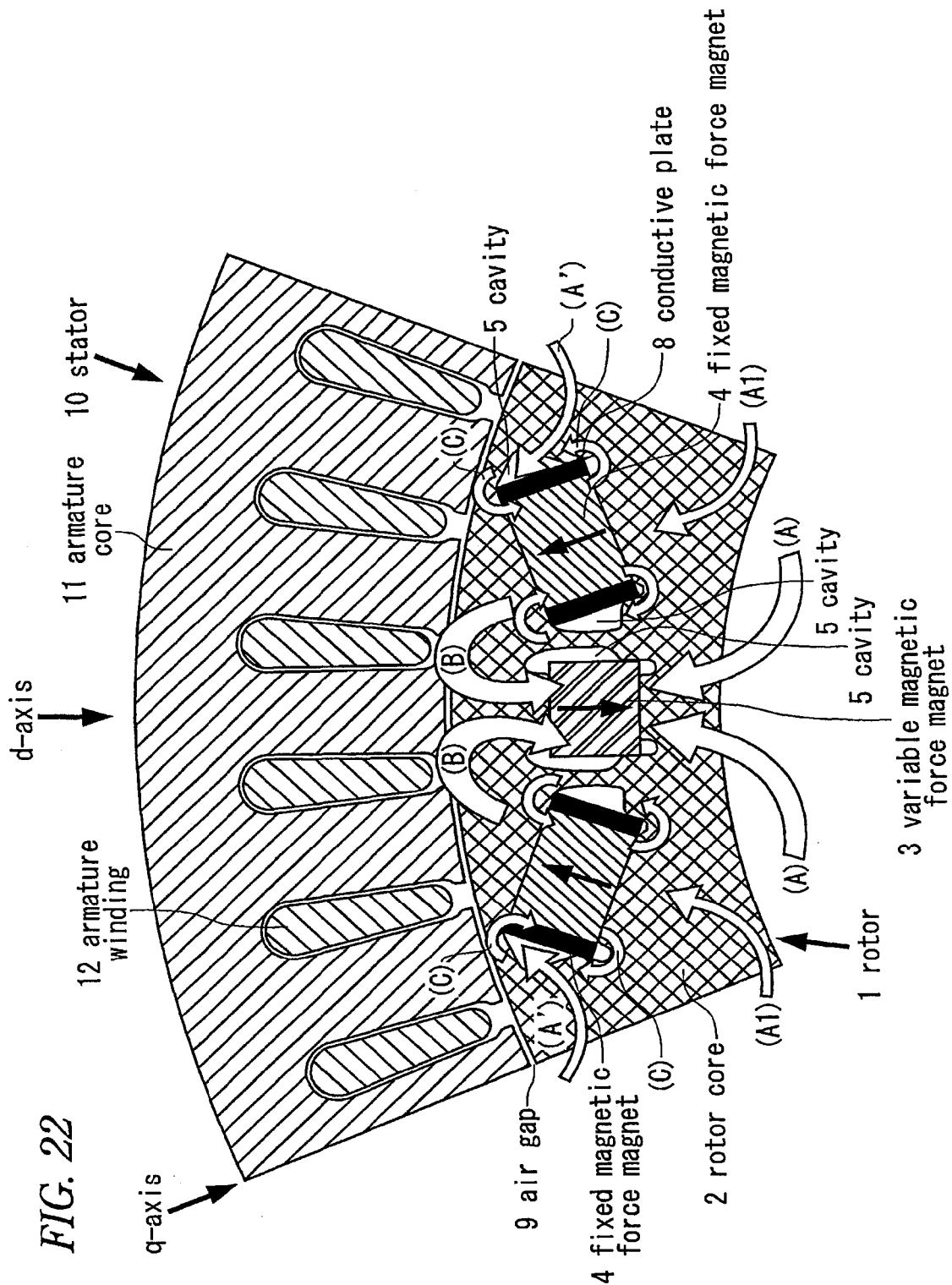
FIG. 22 is a partial cross section of the rotor and stator shown in Embodiment 10 according to the invention, and illustrates the direction of the magnetic flux during magnetization.
Figure 23:
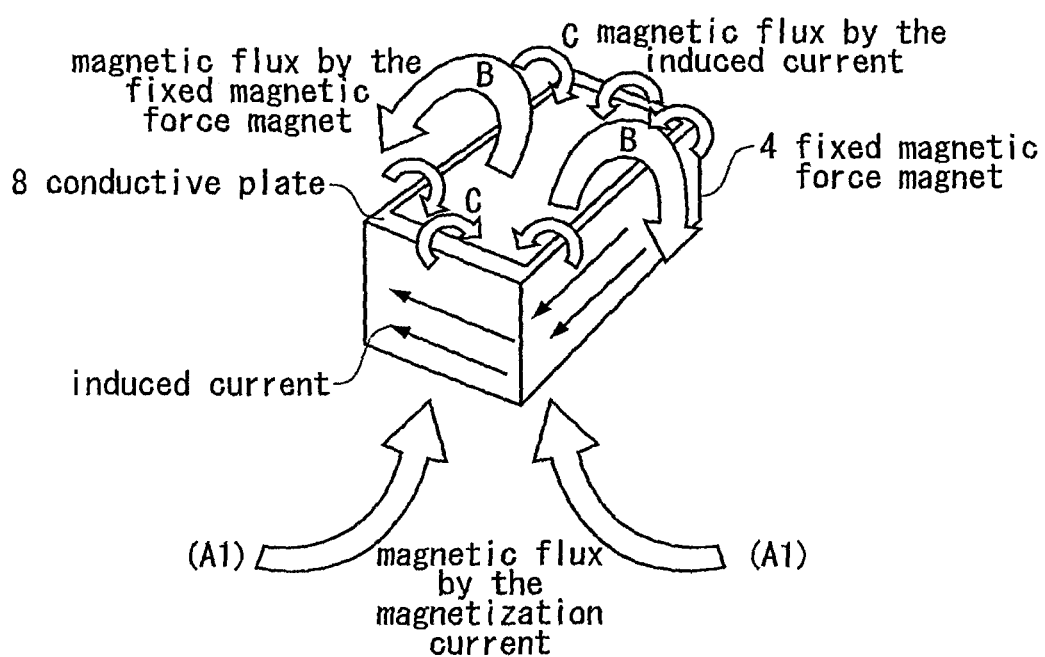
FIG. 23 is a perspective view of the fixed magnetic force magnet 4 and the conductive plate 8 showing the direction of the magnetic flux during magnetization in Embodiment 10 according to the invention.

Embodiment 10 according to the third invention is now explained with reference to FIG. 21 to FIG. 23. FIG. 21 is a cross section in a direction that is orthogonal to the rotation axis of the permanent magnet electric motor of this embodiment, and illustrates the direction of the magnetic flux during demagnetization, and FIG. 22 similarly illustrates the direction of the magnetic flux during magnetization. FIG. 23 is a perspective view of the fixed magnetic force magnet 4 and the conductive plate 8 showing the direction of the magnetic flux during magnetization.

In Embodiment 10, the conductive plate 8 is a tabular member that is closely attached to the lateral side of the fixed magnetic force magnet 4, and is disposed so as to cover the fixed magnetic force magnet 4 in a direction that is parallel to its magnetic path. That is, the conductive plate 8 is provided parallel to the magnetization direction of the d-axis current relative to the fixed magnetic force magnet 4 embedded in the rotor core 2.

With Embodiment 10 in which the conductive plate 8 is disposed so as to be wrapped around the fixed magnetic force magnet 4, when the magnetic field A1 generated by the d-axis current works on the fixed magnetic force magnet 4, an induced current which negates the magnetic field A1 will flow to the conductive plate 8 as shown in FIG. 21. Here, the magnetic field C generated by the short-circuit current works evenly within the fixed magnetic force magnet 4. This also applies to FIG. 22 as the case of performing magnetization that is opposite to the above. Thus, as the effect of Embodiment 10, in addition to the effect of each of the foregoing embodiments, it is possible to negate the magnetic force of the magnetic field that is generated by the magnetization current across the entire area of the fixed magnetic force magnet 4, and, therefore, increase of the magnetization current of the magnetic pole of the rotor during magnetization can be efficiently inhibited, and the efficiency of the motor can be improved. Moreover, since the conductive plate 8 is disposed on the lateral side of the fixed magnetic force magnet 4, there is also an advantage in that it is possible to prevent the entry of the magnetic field generated by the magnetization current into the fixed magnetic force magnet 4 from the lateral side.

Embodiment 11

Figure 24:
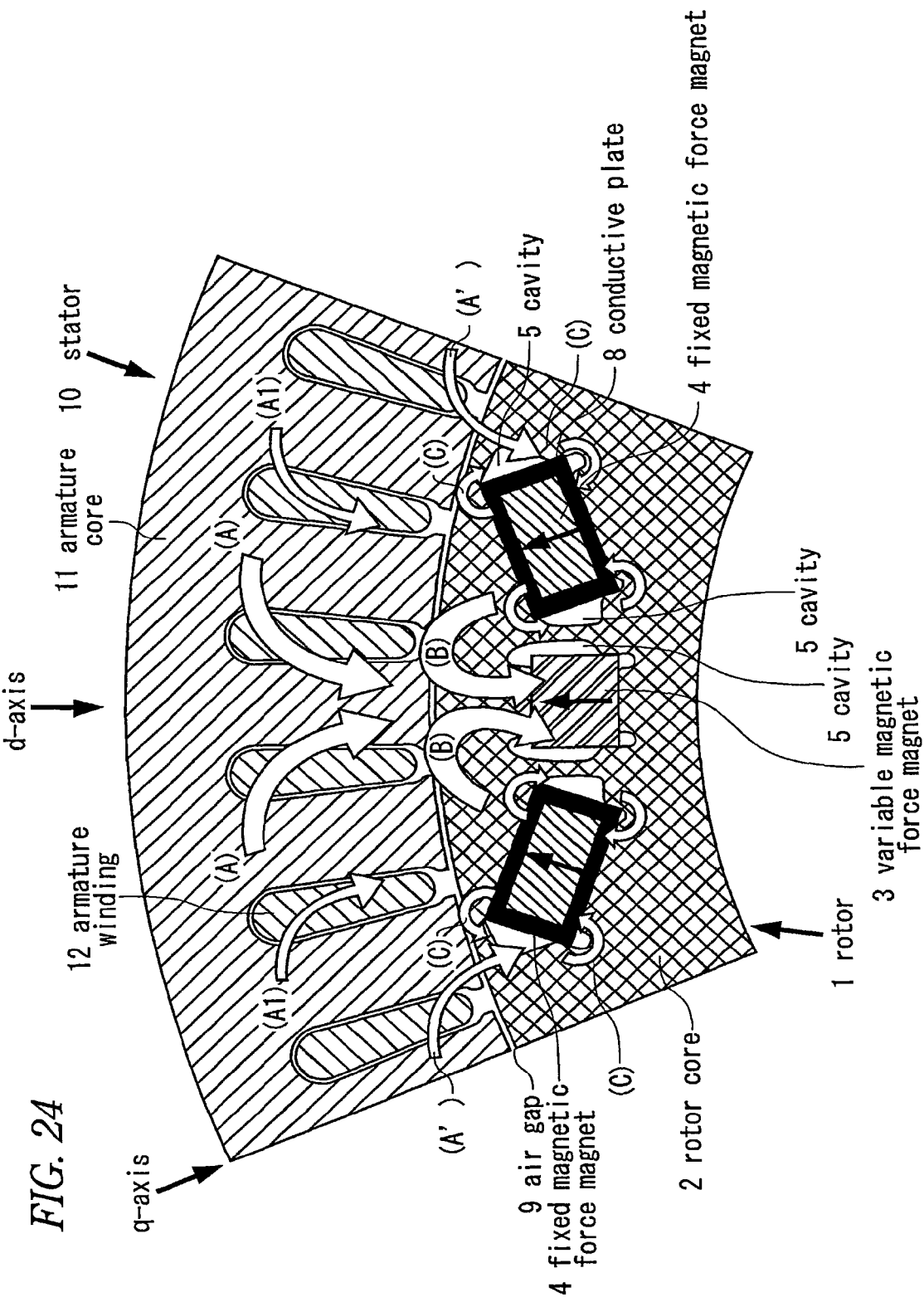
FIG. 24 is a partial cross section of the rotor and stator shown in Embodiment 11 according to the invention, and illustrates the direction of the magnetic flux during demagnetization.
Figure 25:
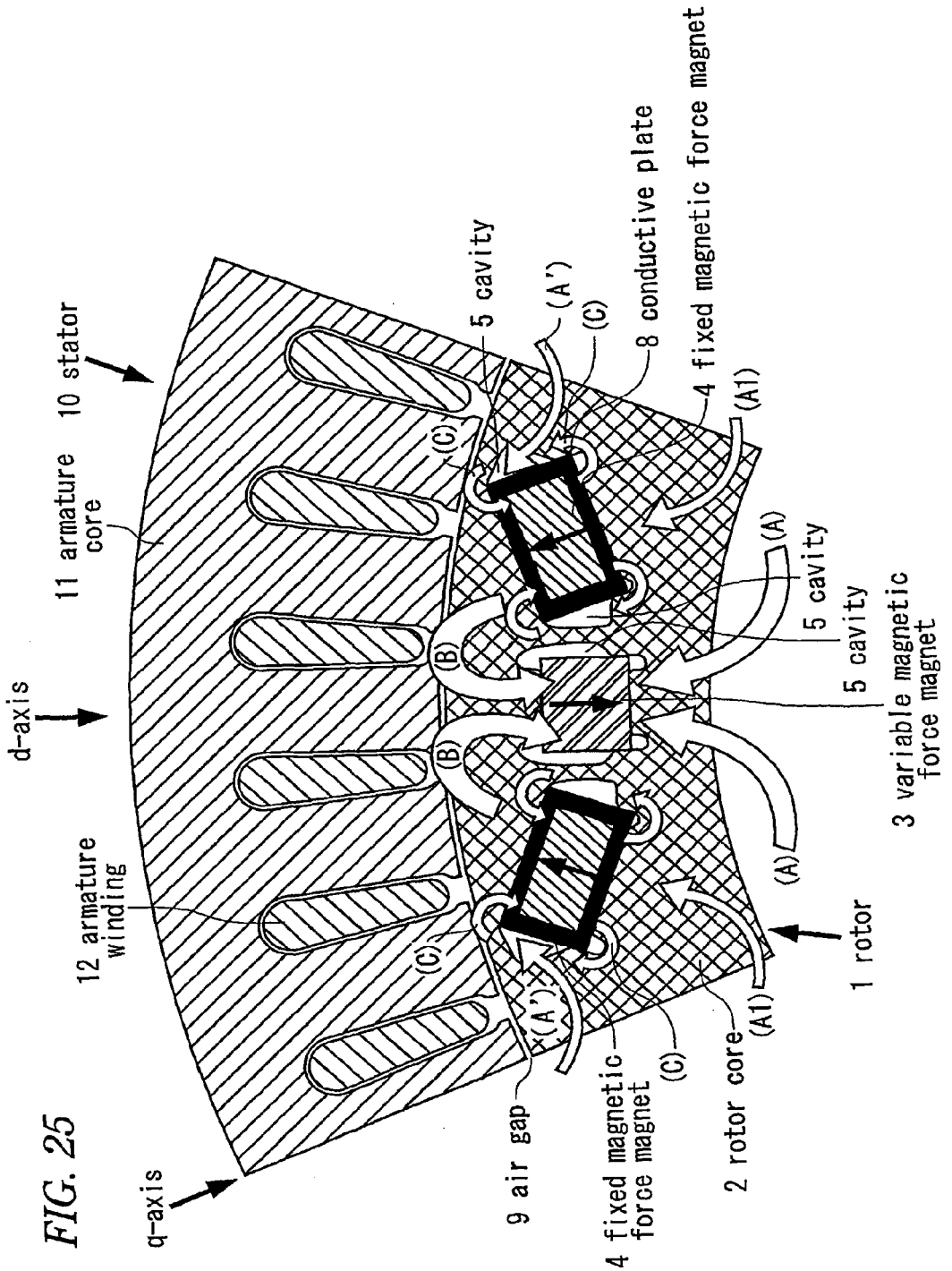
FIG. 25 is a partial cross section of the rotor and stator shown in Embodiment 11 according to the invention, and illustrates the direction of the magnetic flux during magnetization.
Figure 26:
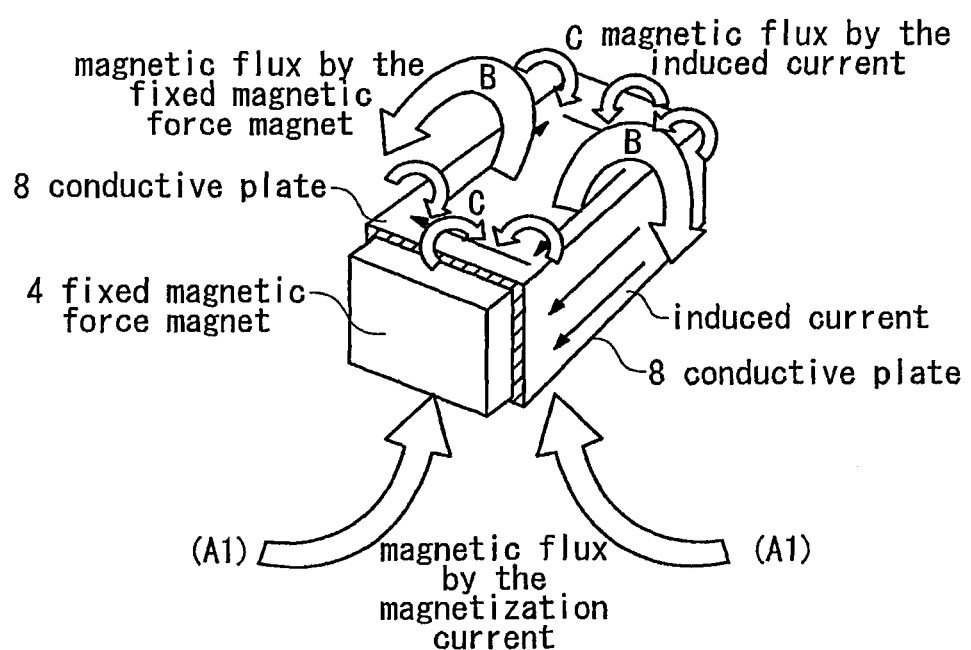
FIG. 26 is a perspective view of the fixed magnetic force magnet 4 and the conductive plate 8 showing the direction of the magnetic flux during magnetization in Embodiment 11 according to the invention.

Embodiment 11 according to the third invention is now explained with reference to FIG. 24 to FIG. 26. FIG. 24 is a cross section in a direction that is orthogonal to the rotation axis of the permanent magnet electric motor of this embodiment, and illustrates the direction of the magnetic flux during demagnetization, and FIG. 25 similarly illustrates the direction of the magnetic flux during magnetization. FIG. 26 is a perspective view of the fixed magnetic force magnet 4 and the conductive plate 8 showing the direction of the magnetic flux during magnetization.

In Embodiment 11, the conductive plate 8 is disposed above, below and on the lateral side of the fixed magnetic force magnet 4; that is, it is disposed around the entire periphery of the fixed magnetic force magnet 4, and Embodiment 11 is a combination of foregoing Embodiment 1 and Embodiment 10. In the foregoing case, the conductive plate 8 may be formed by bonding a tabular member to the surface of the fixed magnetic force magnet 4 via welding or soldering, or covering the entire surface of the variable magnetic force magnet 4 with a conductive material via plating or other methods.

In Embodiment 11, in addition to the effect of each of the foregoing embodiments, the energy of the magnetic field A generated by the magnetization current that is applied from any direction to the fixed magnetic force magnet 4 is also consumed as an induced current.

Embodiment 12

Figure 27:
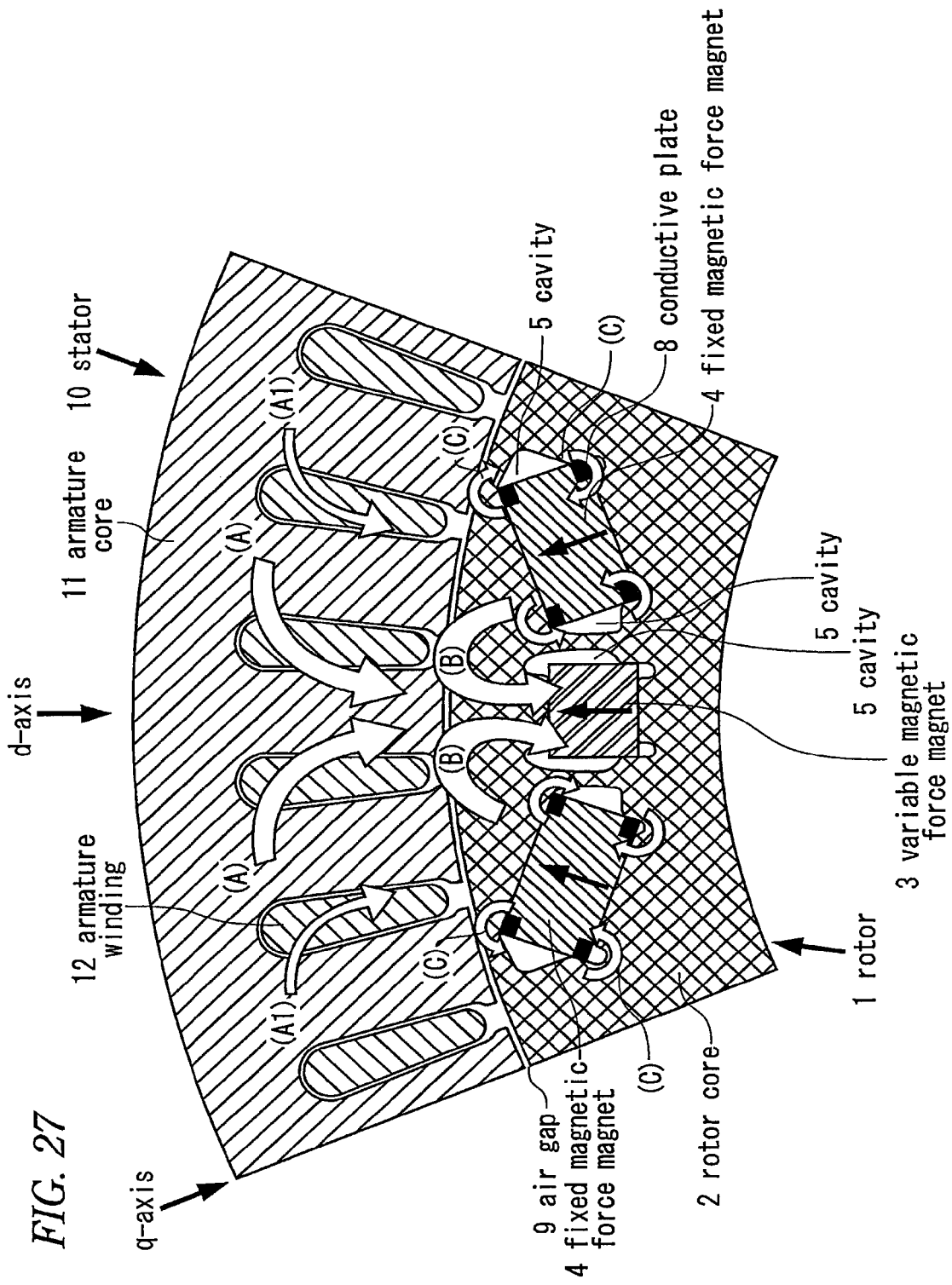
FIG. 27 is a partial cross section of the rotor and stator shown in Embodiment 12 according to the invention, and illustrates the direction of the magnetic flux during demagnetization.
Figure 28:
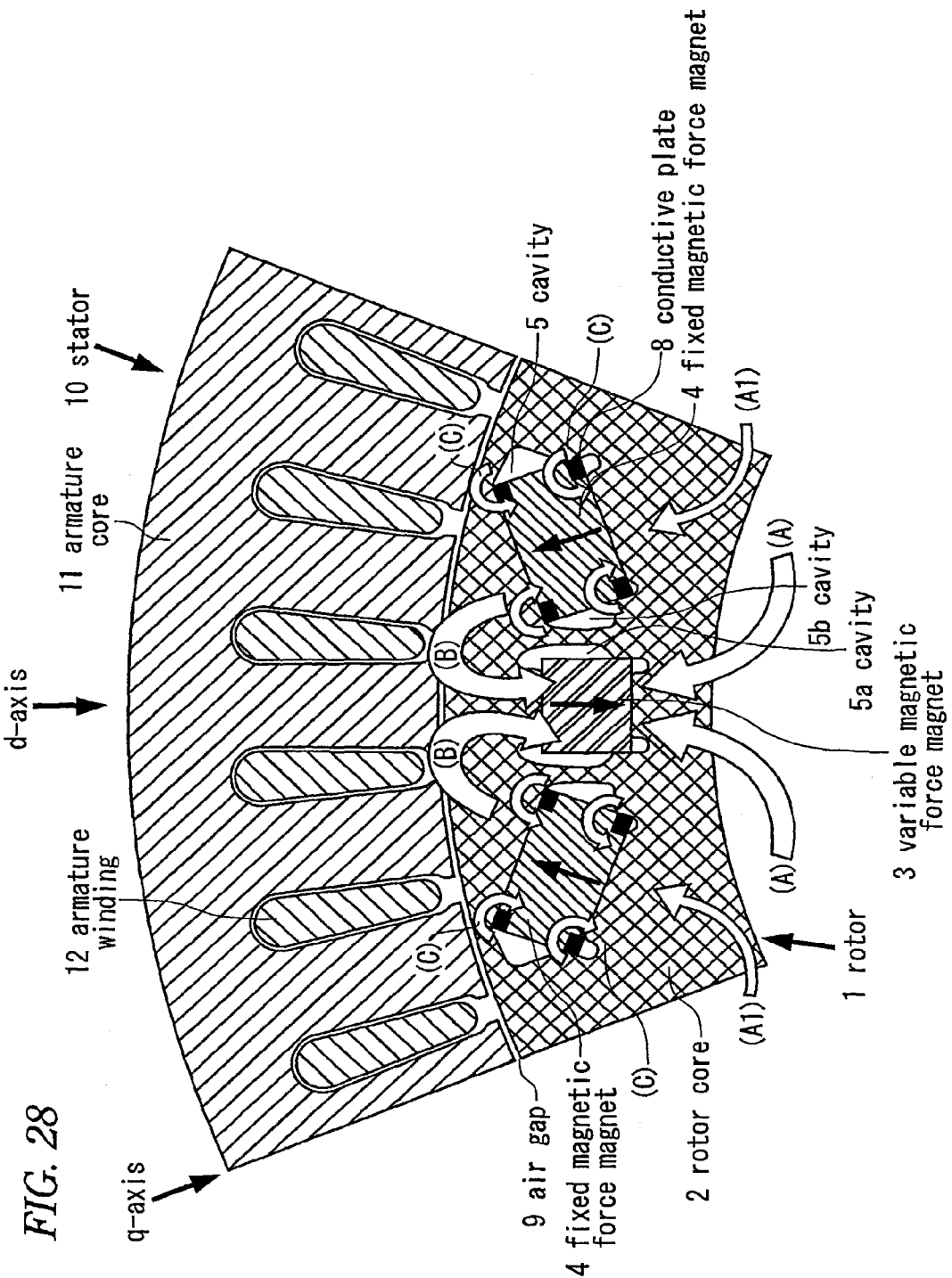
FIG. 28 is a partial cross section of the rotor and stator shown in Embodiment 12 according to the invention, and illustrates the direction of the magnetic flux during magnetization.
Figure 29:
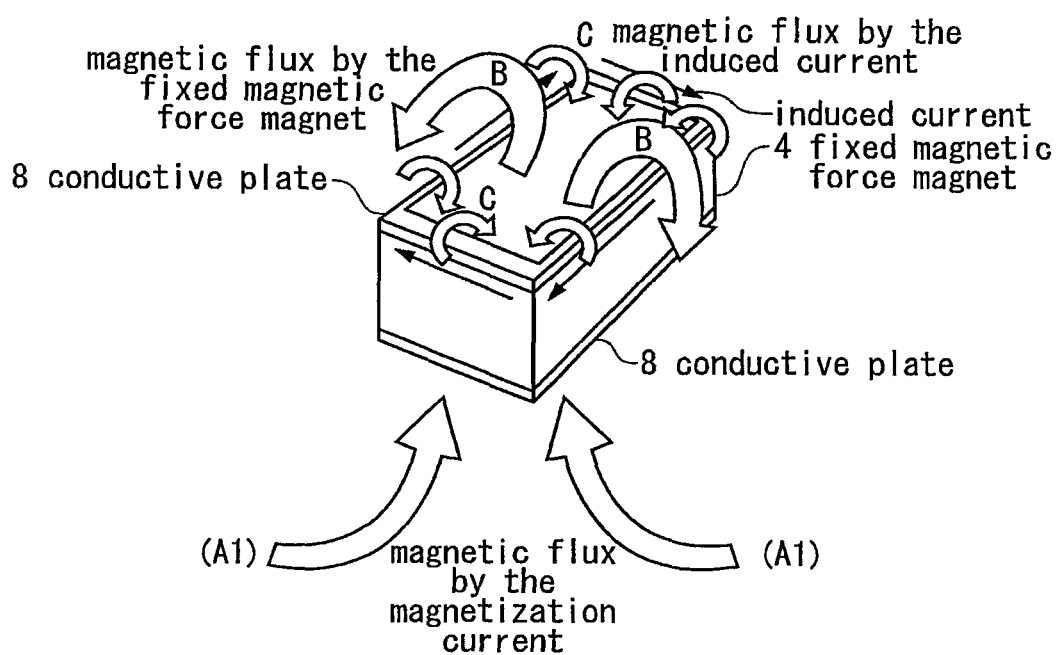
FIG. 29 is a perspective view of the fixed magnetic force magnet 4 and the conductive plate 8 showing the direction of the magnetic flux during magnetization in Embodiment 12 according to the invention.

Embodiment 12 according to the third invention is now explained with reference to FIG. 27 to FIG. 29. FIG. 27 is a cross section in a direction that is orthogonal to the rotation axis of the permanent magnet electric motor of this embodiment, and illustrates the direction of the magnetic flux during demagnetization, and FIG. 28 similarly illustrates the direction of the magnetic flux during magnetization. FIG. 29 is a perspective view of the fixed magnetic force magnet 4 and the conductive plate 8 showing the direction of the magnetic flux during magnetization.

In Embodiment 12, the conductive plate 8 is an endless member in which the magnetic flux generated by the d-axis current penetrates the center opening thereof, and generates a short-circuit current that circulates the endless conductive plate 8 based on the magnetic flux generated by conducting the d-axis current to the armature winding. The conductive plate 8 is provided to the magnetic path portion of the fixed magnetic force magnet 4 excluding the variable magnetic force magnet 3, and is disposed around the fixed magnetic force magnet 4 with the magnetization direction of the fixed magnetic force magnet 4 as the central axis.

In this embodiment configured as described above, when magnetizing the variable magnetic force magnet 3 in the demagnetization direction as shown in FIG. 27, the short-circuit current generated by the magnetic field A' flowing from the lateral side to the upper side of the fixed magnetic force magnet 4 will also flow to the conductive plate 8 disposed inside the fixed magnetic force magnet 4. When performing magnetization that is opposite to the above, as shown in FIG. 20, the short-circuit current generated by the magnetic field A' flowing from the upper side to the lateral side of the fixed magnetic force magnet 4 will also flow to the internal conductive plate 8. Thus, in addition to the effect of each of the foregoing embodiments, the portion covering the fixed magnetic force magnet 4 by using the conductive plate 8 can be minimized, the location of disposing the conductive member to become the magnetic barrier in the core can be minimized, and there is no possibility of impairing the magnetic property of the permanent magnet.

Embodiment 13

Figure 30:
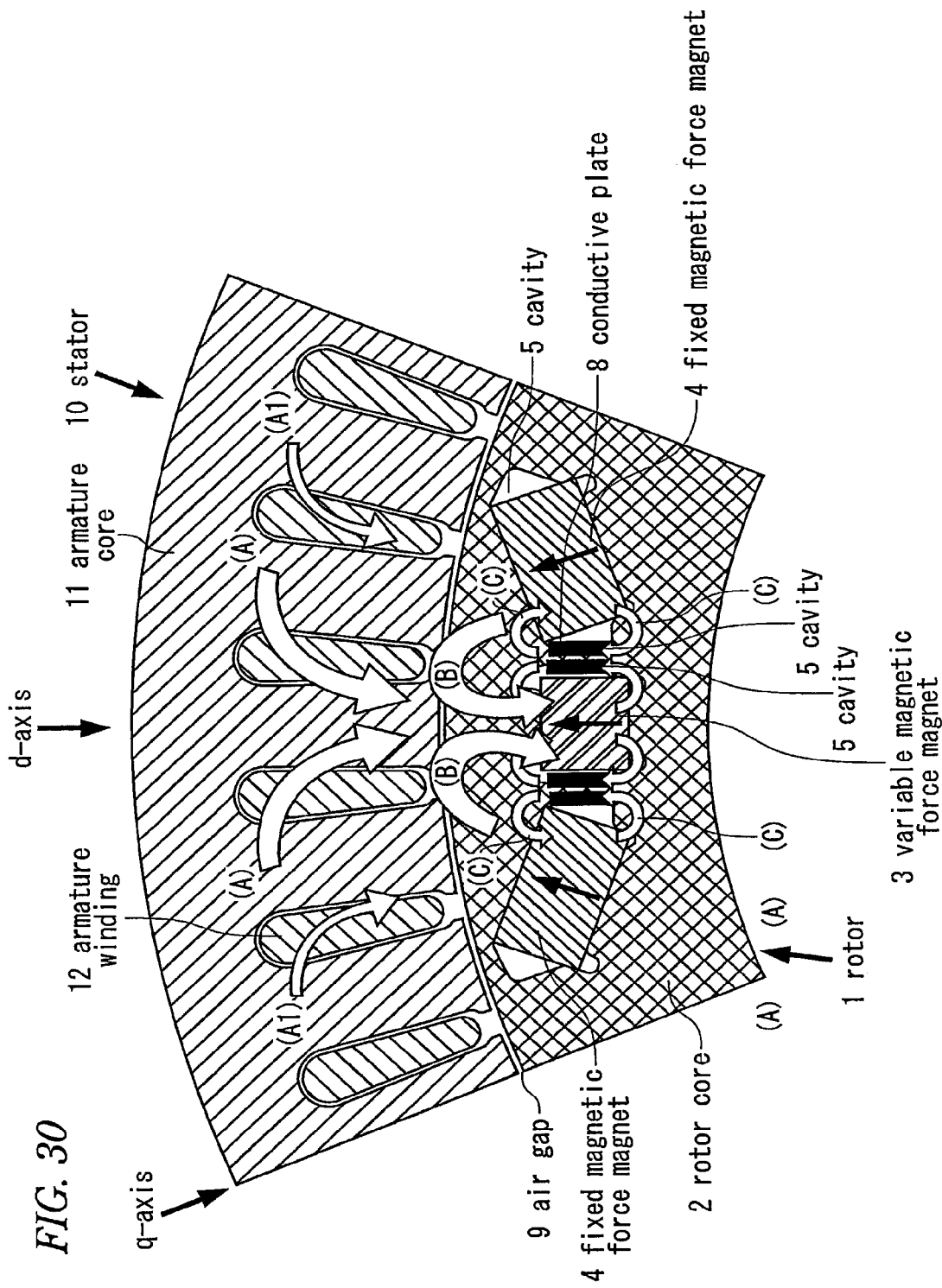
FIG. 30 is a partial cross section of the rotor and stator shown in Embodiment 13 according to the invention, and illustrates the direction of the magnetic flux during demagnetization.

Embodiment 13 according to the third invention is now explained with reference to FIG. 30 to FIG. 32. FIG. 30 is a cross section in a direction that is orthogonal to the rotation axis of the permanent magnet electric motor of this embodiment, and illustrates the direction of the magnetic flux during demagnetization, and FIG. 31 similarly illustrates the direction of the magnetic flux during magnetization. FIG. 32 is a perspective view of the bridge part of the core showing the direction of the magnetic flux during magnetization.

In Embodiment 13, the conductive plate 8 is a tabular member that covers the periphery of the bridge part 6 provided between the fixed magnetic force magnet 4 and the variable magnetic force magnet 3, the conductive plate 8 is provided at the boundary of the magnetic path of the d-axis current of the fixed magnetic force magnet 4 embedded in the rotor core 2.

Figure 31:
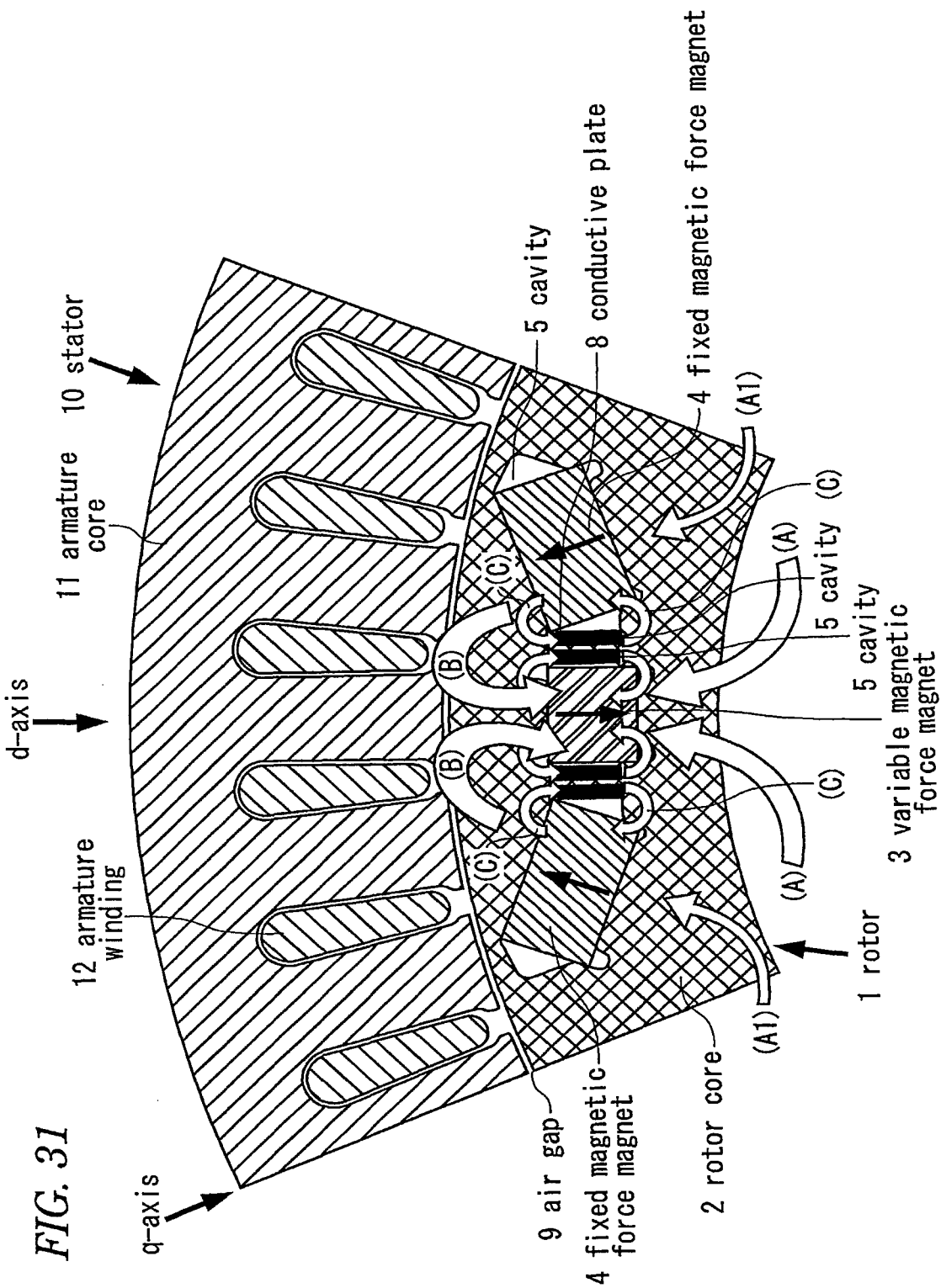
FIG. 31 is a partial cross section of the rotor and stator shown in Embodiment 13 according to the invention, and illustrates the direction of the magnetic flux during magnetization.
Figure 32:
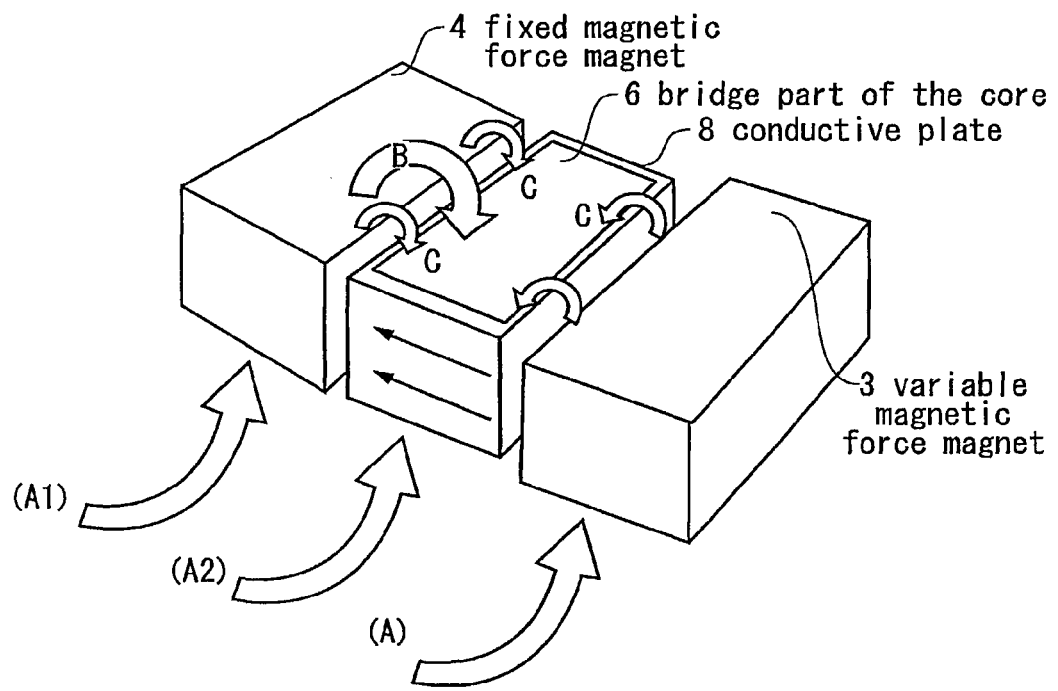
FIG. 32 is a perspective view of the bridge part 6 and the conductive plate 8 showing the direction of the magnetic flux during magnetization in Embodiment 13 according to the invention.

With Embodiment 13 configured as described above, when magnetizing the variable magnetic force magnet 3 in the demagnetization or magnetization direction as shown in FIG. 30 and FIG. 31 and the magnetic field A2 generated by the d-axis current works on the bridge part 6, an induced current that negates the magnetic field A2 will flow to the conductive plate 8. Consequently, since the magnetic field C generated by the induced current works so as to negate the magnetic field A2 generated by the d-axis current, a magnetic barrier can be formed on the portion of the bridge part 6. Particularly, although it is difficult to form a magnetic barrier on the bridge part 6 by providing a cavity or the like based on demands for a stronger core, according to this embodiment, the magnetic barrier can be formed while maintaining the mechanical strength of the bridge part 6. Thus, as with the other embodiments, an effect is yielded in that magnetization can be effectively performed with a smaller magnetization current.

Embodiment 14

The third invention is not limited to each of the foregoing embodiments, and also includes Embodiment 14 described below.

(1) Although each of the foregoing embodiments illustrated a electric motor with four poles, it goes without saying that the third invention can also be applied to a multipolar electric motor of eight poles or the like. The arrangement position and shape of the permanent magnets will obviously change slightly according to the number of poles, but the operation and effect can be similarly obtained. Particularly, each of the foregoing embodiments disposes the variable magnetic force magnet at the center and disposes the fixed magnetic force magnet at either end, but the variable magnetic force magnet and the fixed magnetic force magnet can also be applied to other arrangements.

(2) The shape and position of the cavity that is provided for configuring the magnetic barrier to the peripheral side of the fixed magnetic force magnet in the rotor core 2 and the position of the cavity that is provided for deciding the product of the magnetic path cross section to the inner side of the fixed magnetic force magnet can be changed as needed according to the strength and the like of the magnetic field that is generated by the coercive force and magnetization current of the permanent magnets that are used.

(3) Each of the foregoing embodiments can also be combined as needed. Particularly, by providing a conductive plate 8 to both the bridge part 6 and the fixed magnetic force magnet 4, the demagnetization or magnetization of the variable magnetic force magnet can be performed more effectively.

[Fourth Invention]

The object according to the fourth invention of this application is to considerably reduce the q-axis part leakage magnetic flux upon disposing the conductive plate in the vicinity of the fixed magnetic force magnet and magnetizing the variable magnetic force magnet with the d-axis current, inhibit the increase of the magnetization current by leveling the magnetization distribution of the variable magnetic force magnet, and thereby improve the efficiency of the motor.

In order to achieve the foregoing object, provided is a permanent magnet electric motor in which a rotor is configured by a rotor core and a plurality of magnetic poles formed inside the rotor core by using two or more types of permanent magnets selected such that a product of coercivity and thickness in a magnetization direction of each magnet is different from each other, in which a stator is located outside the rotor with an air gap intervening between them and configured by an armature core and an armature winding, in which at least one permanent magnet forming the magnetic poles of the rotor is magnetized by a magnetic field generated by a current of the armature winding to change a magnetic flux content thereof irreversibly, wherein a short circuited coil is configured by disposing a conductive member on a q-axis peripheral side and on a d-axis side within a rotor radial cross section in a vicinity of the permanent magnet of which magnetic flux content is changed irreversibly, a short-circuit current is generated in the conductive member by the magnetic flux which is generated by conducting a magnetization current to the armature winding, and a magnetic field having a magnetic force in an opposite direction to the magnetic field generated by the magnetization current is generated with the short-circuit current.

Note that, in order to level the magnetization distribution of the variable magnetic force magnet, the following permanent magnet electric motors are also a mode according to the fourth invention; namely, the short circuited coil disposed on the lateral side of the permanent magnet to be changed irreversibly in the vertical direction of magnetization (1) is configured from a coil made from a tabular conductive member, (2) is provided as a plurality of short circuited coils, (3) is disposed at the central part of the lateral side of the permanent magnet to be changed irreversibly in the vertical direction of magnetization, and (4) is disposed by providing a notch to the permanent magnet to be changed irreversibly.

According to the fourth invention configured as described above, when magnetizing the variable magnetic force magnet by the d-axis current, the q-axis part leakage magnetic flux can be reduced considerably, and the magnetization distribution of the variable magnetic force magnet can also be made even. Thus, it is possible to inhibit the increase of the magnetization current and the efficiency of the motor can be improved.

The embodiments of the permanent magnet electric motor according to the fourth invention are now explained with reference to the diagrams. The electric motor of this embodiment is explained as a case of having eight poles, but this embodiment can also be similarly applied to other number of poles.

Embodiment 15

(1-1) Configuration

Figure 33:
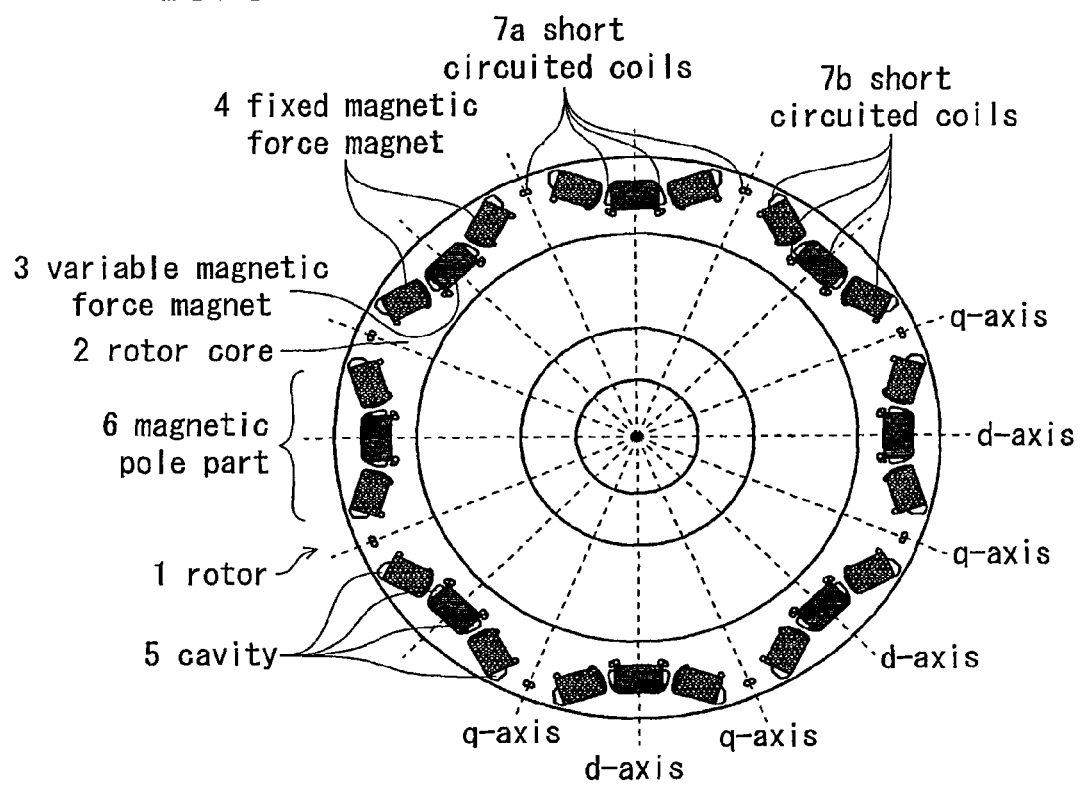
FIG. 33 is a cross section of the rotor in Embodiment 15 according to the invention.

Embodiment 15 according to the fourth invention is now explained with reference to FIG. 33. The rotor 1 of Embodiment 15 according to the fourth invention is configured from a rotor core 2, a permanent magnet 3 in which the product of the coercive force and the thickness in the magnetization direction becomes small (hereinafter referred to as the "variable magnetic force magnet"), permanent magnets 4, 4 in which the product of the coercive force and the thickness in the magnetization direction becomes large (hereinafter referred to as the "fixed magnetic force magnets"), and short circuited coils 7a, 7b disposed on the upper side and lower side of the variable magnetic force magnet 3 and the fixed magnetic force magnets 4, 4. In this embodiment, a ferrite magnet is used as the variable magnetic force magnet 3 and a NdFeB magnet is used as the fixed magnetic force magnet 4. Moreover, a magnet with weak coercivity among a SmCo-based magnet, a CeCO-based magnet, and a NdFeB-based magnet can also be used as the variable magnetic force magnet 3.

As an example, the coercive force of the variable magnetic force magnet 3 is set to 280 kA/m and the coercive force of the fixed magnetic force magnet 4 is set to 1500 kA/m, but the coercive force is not necessarily limited to the foregoing values. The variable magnetic force magnet 3 will suffice so as long as it is magnetized irreversibly by a negative d-axis current, and the fixed magnetic force magnet 4 will suffice so as long as it is not magnetized irreversibly by a negative d-axis current.

A cavity 5 is provided at the ends of the variable magnetic force magnet 3 and the fixed magnetic force magnets 4, 4 so that the magnetic flux that passes through the rotor core 2 will pass through the portion of the variable magnetic force magnet 3 and the fixed magnetic force magnets 4,4 in their thickness direction. The magnetic pole part 6 of the rotor core 2 is formed so as to be surrounded by one variable magnetic force magnet 3 and two fixed magnetic force magnets 4, 4. The central axis direction of the magnetic pole part 6 of the rotor core 2 becomes the d-axis, and the central axis direction between the magnetic poles becomes the q-axis.

Moreover, the variable magnetic force magnet 3 does not have to be configured only from one variable magnetic force magnet, and it may also be a variable magnetic force magnet that is prepared by combining a variable magnetic force magnet and a fixed magnetic force magnet. Specifically, the variable magnetic force magnet 3 and the fixed magnetic force magnet 4a are superimposed in the magnetization direction of the respective magnets to configure one magnet. In other words, the magnetization directions of the variable magnetic force magnet 3 and the fixed magnetic force magnet 4a are aligned and the magnets are disposed in series magnetically. The serially superimposed magnets are disposed within the rotor core 2 at a position where the magnetization direction becomes the d-axis direction (here, substantially the radial direction of the rotor). Meanwhile, the fixed magnetic force magnets 4, 4 are disposed on either end of the magnet obtained by serially superimposing the variable magnetic force magnet 3 and the fixed magnetic force magnet 4a at a position where the magnetization direction becomes the d-axis direction. The laterally disposed fixed magnetic force magnets 4, 4 configure a parallel circuit on the magnetic circuit in relation to the serially superimposed magnets. In other words, the fixed magnetic force magnet 4a is disposed in series and the fixed magnetic force magnets 4, 4 are disposed in parallel to the variable magnetic force magnet 3 on the magnetic circuit.

Accordingly, since the core has no magnets or holes to become a magnetic barrier at the portion to become the magnetic path of the q-axis direction within the rotor 1, there is a portion where the magnetic resistance will be extremely small. This portion becomes the iron magnetic pole part 6 during the generation of the reactance torque. Meanwhile, the portion to become the magnetic pole of the permanent magnet in the d-axis direction is provided with the foregoing variable magnetic force magnet 3 and the fixed magnetic force magnet 4, and thus the magnetic resistance is large. It is thereby possible to configure a rotor with a different magnetic resistance in the circumferential direction of the rotor.

The short circuited coils 7a, 7b are disposed in the vicinity of the fixed magnetic force magnets on the q-axis peripheral side and the d-axis side within the rotor radial cross section to surround the magnet obtained by laminating the variable magnetic force magnet 3 and the fixed magnetic force magnet 4a and the fixed magnetic force magnets 4, 4 on either end thereof embedded in the rotor core 2. Here, the short circuited coils 7a, 7b are disposed so that the magnetization direction of the fixed magnetic force magnets 4, 4 becomes the central axis. The short circuited coils 7a, 7b are configured from a ring-shaped conductive member, and mounted by being fitted into the portion of the edge of the cavity 5 provided in the rotor core 2. Note that the short circuited coils 7a, 7b can also be formed by filling a conductive substance, which was melted at a high temperature, in a hole of the rotor core 2 and performing casting thereto. The short circuited coils 7a, 7b are provided to the magnetic path portion of the other fixed magnetic force magnets 4, 4 excluding the variable magnetic force magnet 3.

(1-2) Operation of Short Circuited Coil During Demagnetization and Magnetization Based on d-Axis Current The operation during magnetization and during demagnetization in the permanent magnet electric motor of this embodiment having the foregoing configuration is now explained. Note that the direction of the magnetic force generated by the armature winding of the stator and the short circuited coil 7 is shown with an arrow in the respective diagrams.

Figure 34:
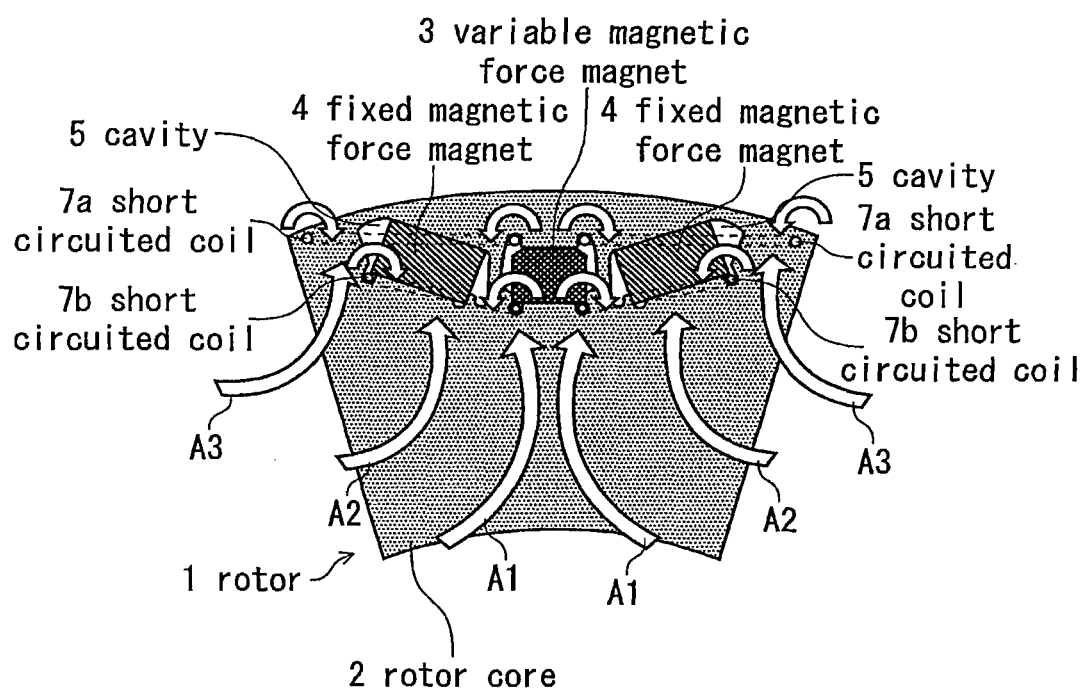
FIG. 34 is a cross section showing the state during magnetization generated by the d-axis current in Embodiment 15 according to the invention.

FIG. 34 is a diagram explaining the total interlinkage magnetic flux of the permanent magnets during magnetization. In this embodiment, a magnetic field is formed by causing a pulse-like current, in which the conducting period is an extremely-short time of approximately 10 ms, to flow to the armature winding of the stator, and the magnetic field A is caused to work on the variable magnetic force magnet 3. The pulse current which forms the magnetic field A for magnetizing the permanent magnet is the d-axis current component of the armature winding of the stator.

Under normal circumstances, since the magnetic field generated by the d-axis current is generated for changing the magnetization of the variable magnetic force magnet 3, preterably, it works on the portion where the variable magnetic force magnet 3 is disposed. Nevertheless, the magnetic field A generated by the d-axis current works not only on the variable magnetic force magnet 3, it also works on the fixed magnetic force magnet 4. In other words, when the d-axis component current is caused to flow to the armature winding of the stator, a magnetic field A1 that works on the variable magnetic force magnet 3, a magnetic field A2 that works on the fixed magnetic force magnets 4, 4, and a magnetic field (leakage magnetic field) A3 that works on the fixed magnetic force magnet and the q-axis peripheral side are formed.

Figure 35:
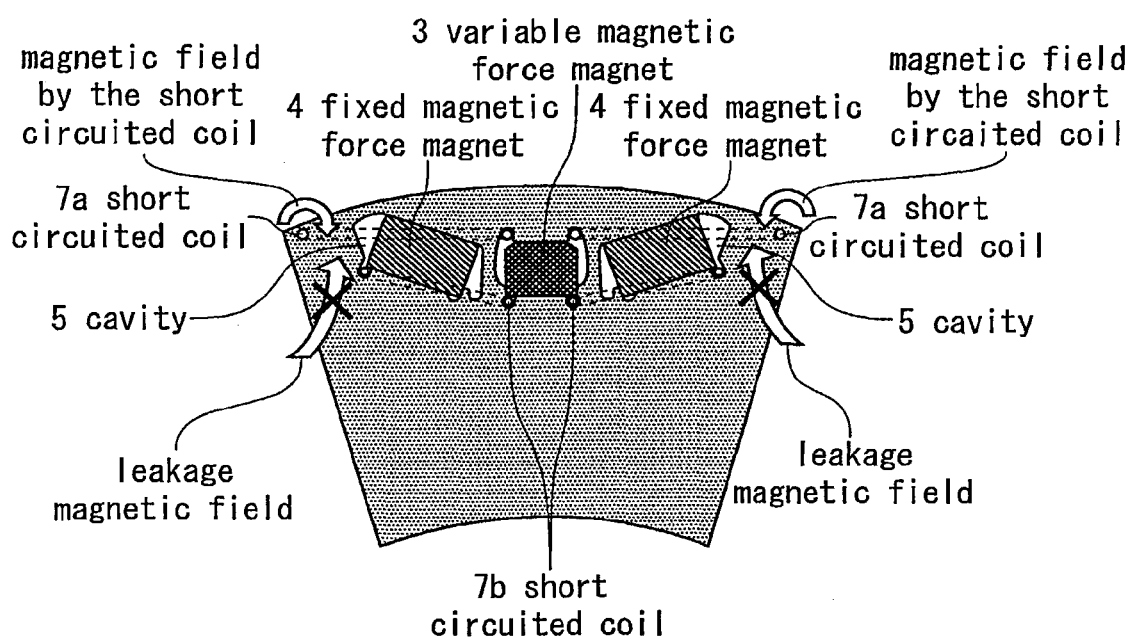
FIG. 35 is a cross section showing a state of the magnetic field and the leakage magnetic field generated by the short circuited coil 7a during magnetization in Embodiment 15 according to the invention.

Thus, it will suffice if the magnetic field A2 generated by the d-axis current and the leakage magnetic field A3 do not easily work on the fixed magnetic force magnets 4, 4. In this embodiment, the short circuited coil 7a provided to the upper side of the fixed magnetic force magnets 4, 4 is disposed to surround the fixed magnetic force magnet 4 and the q-axis periphery. As shown in FIG. 35, since the magnetic field generated by the induced current of the short circuited coil 7a works to negate the leakage magnetic field A3, the leakage magnetic field A3 does not easily work thereon. Meanwhile, the short circuited coil 7b provided to the lower side of the fixed magnetic force magnets 4, 4 is disposed to surround the fixed magnetic force magnet 4.

When the magnetic field A2 generated by the d-axis current works on the fixed magnetic force magnets 4, 4, an induced current that negates the magnetic field will flow to the short circuited coils 7a, 7b. Accordingly, since the magnetic field generated by the d-axis current and the magnetic field generated by the short-circuit current negate each other in the fixed magnetic force magnets 4, 4, there is hardly any increase or decrease of the magnetic field. Moreover, when the magnetic field A3 generated by the d-axis current works on the q-axis portion of the rotor, an induced current that negates the magnetic field will flow to the short circuited coil 7a. Accordingly, since the magnetic field generated by the d-axis current and the magnetic field generated by the short-circuit current will also negate each other in the q-axis portion of the rotor, there is hardly any increase or decrease of the magnetic field.

Meanwhile, even when the magnetic field A1 generated by the d-axis current works on the variable magnetic force magnet 3, a magnetic field that negates the magnetic field of the magnetic field A1 is not generated in the short circuited coils 7a, 7b. In addition, the magnetic field generated by the short-circuit current that was generated as a result of the magnetic field A2 and the magnetic field A3 working on the short circuited coils 7a, 7b will also work on the variable magnetic force magnet 3, and become the same direction as the magnetic field generated by the d-axis current and the magnetic field A1 that works on the variable magnetic force magnet 3.

Figure 36:
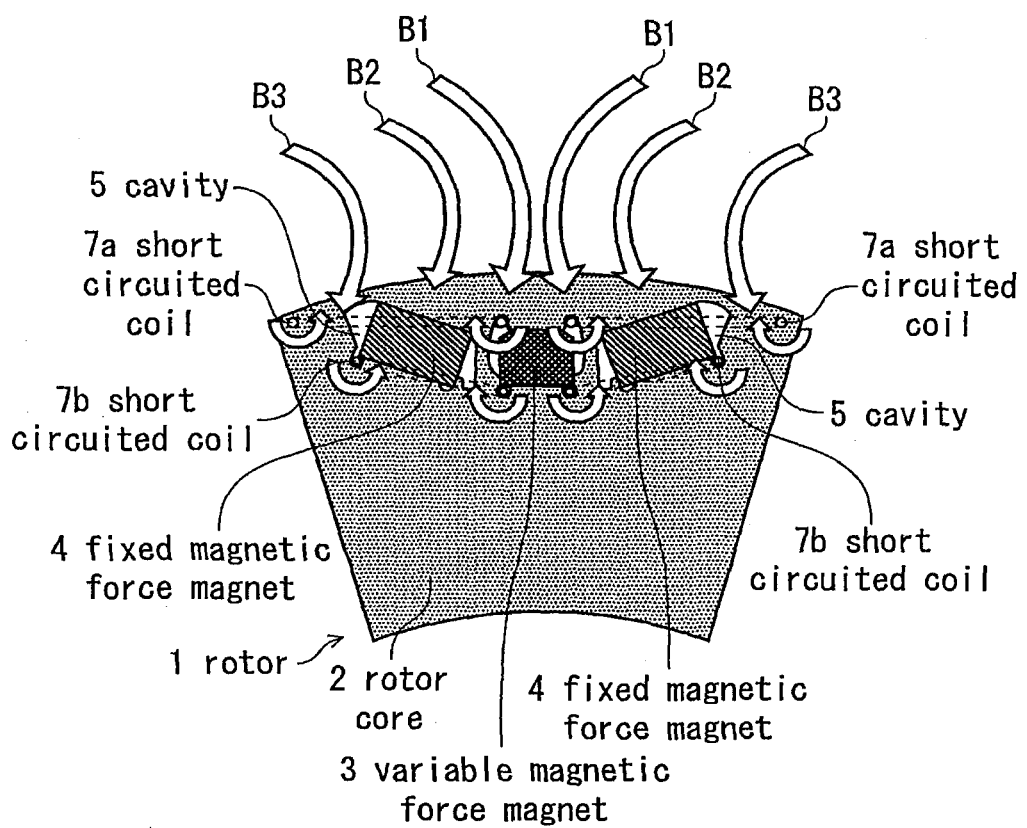
FIG. 36 is a cross section showing a state during demagnetization generated by the d-axis current in Embodiment 15 according to the invention.

FIG. 36 is a diagram explaining the total interlinkage magnetic flux of the permanent magnets during demagnetization. During the magnetization of the total interlinkage magnetic flux of the permanent magnet, a magnetic field that is opposite to the magnetic field during demagnetization is formed by causing a pulse-like current, in which the conducting period is an extremely-short time of approximately 10 ms, to flow to the armature winding of the stator, and the magnetic field B is caused to work on the variable magnetic force magnet 3. In other words, when the d-axis component current is caused to flow to the armature winding of the stator, a magnetic field B1 that works on the variable magnetic force magnet 3, a magnetic field B2 that works on the fixed magnetic force magnets 4, 4, and a magnetic field (leakage magnetic field) B3 that works on the fixed magnetic force magnet and the q-axis peripheral side are formed.

When the magnetic field B2 generated by the d-axis current works on the fixed magnetic force magnets 4, 4, an induced current that negates the magnetic field will flow to the short circuited coils 7a, 7b. Accordingly, since the magnetic field generated by the d-axis current and the magnetic field generated by the short-circuit current negate each other in the fixed magnetic force magnets 4, 4, there is hardly any increase or decrease of the magnetic field. Moreover, when the magnetic field B3 generated by the d-axis current works on the q-axis portion of the rotor, an induced current that negates the magnetic field will flow to the short circuited coil 7a. Accordingly, since the magnetic field generated by the d-axis current and the magnetic field generated by the short-circuit current will also negate each other in the q-axis portion of the rotor, there is hardly any increase or decrease of the magnetic field.

Meanwhile, even when the magnetic field B1 generated by the d-axis current works on the variable magnetic force magnet 3, a magnetic field that negates the magnetic field of the magnetic field B1 is not generated in the short circuited coils 7a, 7b. In addition, the magnetic field generated by the short-circuit current that was generated as a result of the magnetic field B2 and the magnetic field B3 working on the short circuited coils 7a, 7b will also work on the variable magnetic force magnet 3, and become the same direction as the magnetic field generated by the d-axis current and the magnetic field B1 that works on the variable magnetic force magnet 3.

(1-3) Operation of Series Configuration of Variable Magnetic Force Magnet and Fixed Magnetic Force Magnet In this embodiment, the two types of magnet can also be disposed in series magnetically. The operation during demagnetization and magnetization in the case of disposing two types of permanent magnets 3, 4a in series magnetically is now explained with reference to FIG. 37 to FIG. 43.

Figure 37:
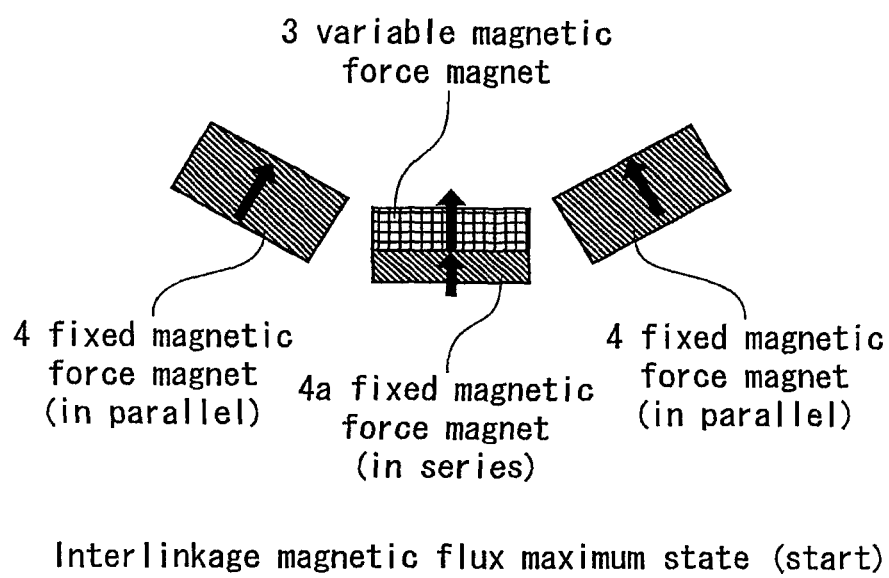
FIG. 37 is a cross section showing a maximum state of the interlinkage magnetic flux of the magnet.

FIG. 37 is a diagram showing a case where the maximum amount of interlinkage magnetic flux is being obtained prior to demagnetization. In the foregoing case, the two types of permanent magnet shall be the variable magnetic force magnet 3 and the fixed magnetic force magnet 4a. Moreover, the fixed magnetic force magnet that is not laminated in series with the variable magnetic force magnet 3 shall be the fixed magnetic force magnet 4. Since the magnetization directions of the variable magnetic force magnet 3 and the fixed magnetic force magnet 4a are the same, the magnetic fluxes of both permanent magnets 3, 4a are added and the maximum flux content is thereby obtained.

Figure 38:
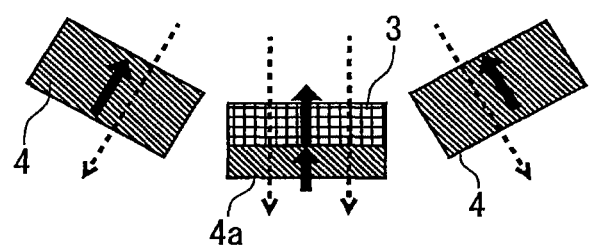
FIG. 38 is a cross section showing a state of generating a magnetic field of reducing the magnetic force of the variable magnetic force magnet by the current of the coil.

FIG. 38 shows the state during demagnetization, and a negative d-axis current, which generates a magnetic field in a direction that is opposite to the magnetization direction of both permanent magnets 3, 4a from the d-axis direction based on the armature winding, is conducted to the armature winding in a pulse-like manner. When the magnetic field within the magnet that changed due to the negative d-axis current becomes 175 kA/m, the coercive force of the variable magnetic force magnet 3 (ferrite magnet) will be 175 kA/m and, therefore, the magnetic force of the variable magnetic force magnet 3 will considerably decrease irreversibly. In the foregoing case, the variable magnetic force magnet 3 will be subject to the magnetic field from the fixed magnetic force magnet 4a that is laminated thereon and this will negate the magnetic field that is applied from the d-axis direction for demagnetization. Thus, although a magnetization current will be required by that much, the magnetization current for demagnetization is relatively small in comparison to the magnetization current during magnetization, and the magnetization current will not increase.

Figure 39:
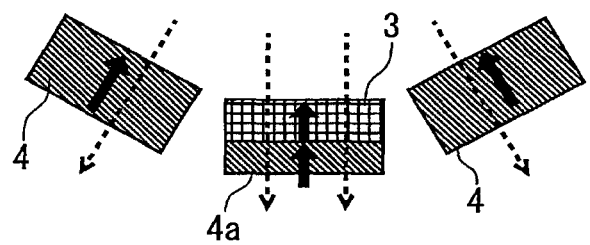
FIG. 39 is a cross section showing a state where the magnetic force of the variable magnetic force magnet has reduced due to the opposing magnetic field generated by the current.

FIG. 39 shows a state where the magnetic force of the variable magnetic force magnet has decreased in the opposing magnetic field generated by the negative d-axis current. Although the magnetic force of the variable magnetic force magnet 3 will irreversibly decrease considerably, since the coercive force of the fixed magnetic force magnet 4a (NdFeB magnet) is 1500 kA/m, the magnetic force will not decrease irreversibly. Consequently, when the pulse-like d-axis current becomes 0, only the variable magnetic force magnet 3 becomes a demagnetized state, and the amount of interlinkage magnetic flux generated by the overall magnets can be decreased.

Figure 40:
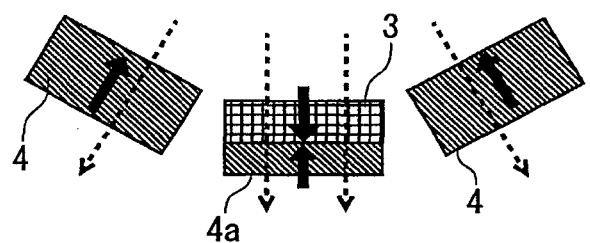
FIG. 40 is a cross section showing the minimum state of the interlinkage magnetic flux of the magnet as a result of the variable magnetic force magnet being magnetized in the reverse direction by the opposing magnetic field generated by the current.

FIG. 40 shows a state where the magnetic force of the variable magnetic force magnet 3 is magnetized in the reverse direction in the opposing magnetic field generated by the negative d-axis current, and the interlinkage magnetic flux generated by the overall magnets is minimum. If the size of the negative d-axis current is generating a magnetic field of 350 kA/m required for magnetization is being generated in the variable magnetic force magnet 3, the demagnetized variable magnetic force magnet 3 becomes magnetized and will generate a magnetic force. In the foregoing case, since the magnetization directions of the two types of permanent magnets 3, 4a are the opposite, the magnetic fluxes of both permanent magnets are subtracted and the magnetic flux becomes minimum.

Figure 41:
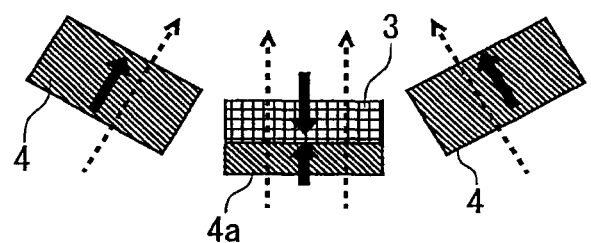
FIG. 41 is a cross section showing a state of generating a magnetic field of reducing the magnetic force of the variable magnetic force magnet that was subject to polarity inversion based on the current of the coil.

FIG. 41 shows a state of generating a magnetic field for decreasing the magnetic force of the variable magnetic force magnet 3 in which the polarity was inverted by the negative d-axis current. A positive d-axis current that generates a magnetic field in the magnetization direction of the fixed magnetic force magnet 4a is conducted to the armature winding in a pulse-like manner. The magnetic field within the magnet that was changed due to the positive d-axis current will irreversibly and considerably decrease the magnetic force of the variable magnetic force magnet 3 in which the polarity was inverted. In the foregoing case, since the magnetic field from the fixed magnetic force magnet 4a that is laminated on the variable magnetic force magnet 3 will be added to the magnetic field generated by the magnetization current (since the bias-like magnetic field from the fixed magnetic force magnet 4a will work on the variable magnetic force magnet 3), the variable magnetic force magnet 3 can be demagnetized easily.

Figure 42:
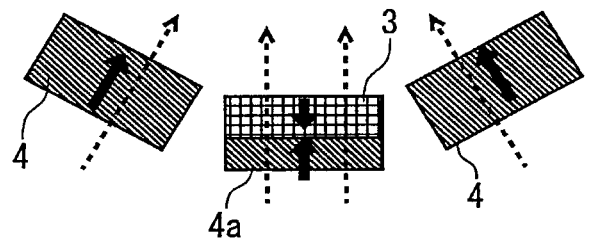
FIG. 42 is a cross section showing a state of having reduced the magnetic force of the variable magnetic force magnet that was subject to polarity inversion by the magnetic field generated by the current.

FIG. 42 shows a state where the magnetic force of the variable magnetic force magnet 3 that was subject to polarity inversion based on the magnetic field generated by the positive d-axis current has decreased. The magnetic field generated by the fixed magnetic force magnet 4a is also added to the magnetic field generated by the positive d-axis current which irreversibly decreases the magnetic force of the variable magnetic force magnet 3. Thus, even in cases where a large magnetization current is normally required, increase of the magnetization current can be inhibited based on the operation of the fixed magnetic force magnet 4a.

Figure 43:
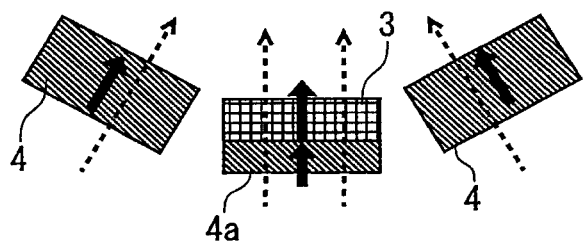
FIG. 43 is a cross section showing the maximum state of the interlinkage magnetic flux of the magnet as a result of the variable magnetic force magnet being magnetized in the reverse direction by the opposing magnetic field generated by the current.

FIG. 43 shows a state where the variable magnetic force magnet 3 is magnetized in the reverse direction (polarity is re-inverted) by the positive d-axis current, and the interlinkage magnetic flux generated by the overall magnets is maximum. Since the magnetization directions of the two types of permanent magnets 3, 4a are the same, the magnetic fluxes of both permanent magnets are added and a maximum flux content is thereby obtained.

(1-4) Effect

According to Embodiment 15 according to the fourth invention configured as described above, the following effects are yielded.

(1) By disposing the short circuited coil 7a to surround the fixed magnetic force magnet 4 and the q-axis periphery, the q-axis part leakage magnetic flux upon magnetizing the variable magnetic force magnet 3 with the d-axis current can be considerably reduced.

(2) By configuring the variable magnetic force magnet 3 and the fixed magnetic force magnet 4a in series, within the variable magnetic force magnet 3, the magnetic field of the fixed magnetic force magnet 4a that was configured in series with the variable magnetic force magnet 3 is of a direction that is opposite to the magnetic field of the fixed magnetic force magnets 4, 4 disposed in parallel to the variable magnetic force magnet 3, and the magnetic fields work to set off each other. Consequently, since the magnetic field generated by the adjacent fixed magnetic force magnets 4, 4 that attempt to obstruct the change of the magnetic force can be reduced upon magnetizing the variable magnetic force magnet 3 from an irreversibly demagnetized state and returning it to its original polarity, the magnetization current (d-axis current) that is required upon changing the magnetic force of the variable magnetic force magnet 3 can be reduced.

(3) Since the thickness of the variable magnetic force magnet 3 will be thin, the magnetization distribution within the variable magnetic force magnet 3 can be made even and the increase of the magnetization current can be inhibited, the efficiency of the motor can be improved.

Embodiment 16

(2-1) Configuration

In Embodiment 16 according to the fourth invention, the shape and arrangement of the short circuited coil 7a are changed in the permanent magnet electric motor of Embodiment 15. In other words, the short circuited coil 7a is formed in a tabular shape and disposed to surround the fixed magnetic force magnet 4 and the q-axis periphery, but on the side of the fixed magnetic force magnet 4, it is disposed to come in contact with the lateral side of the variable magnetic force magnet 3.

(2-2) Operation of Embodiment 16

The operation during magnetization in the permanent magnet electric motor of this embodiment having the foregoing configuration is now explained.

When reducing the total interlinkage magnetic flux of the permanent magnets, a d-axis component current is caused to flow to the armature winding of the stator and the magnetic field A is caused to work on the magnetic pole part 6 of the rotor. Here, an induced current flows to the short circuited coils 7a, 7b so as to negate the magnetic field A2 that works on the fixed magnetic force magnets 4, 4 and the magnetic field (leakage magnetic field) A3 that works on the fixed magnetic force magnets 4, 4 and the q-axis peripheral side. Consequently, since the magnetic field generated by the d-axis current and the magnetic field generated by the short-circuit current will negate each other in the fixed magnetic force magnets 4, 4 and the fixed magnetic force magnet 4 and q-axis peripheral side to which the magnetic field A2 and the magnetic field (leakage magnetic field) A3 work thereon, there will hardly be any increase or decrease of the magnetic field.

Meanwhile, even when the magnetic field A1 generated by the d-axis current works on the variable magnetic force magnet 3 at the portion where the variable magnetic force magnet 3 and the fixed magnetic force magnet 4a of the central part of the magnetic pole central part are disposed in series, a magnetic field that negates the magnetic field of the magnetic field A1 is not be generated in the short circuited coils 7a, 7b. Moreover, the magnetic field generated by the short-circuit current that was generated as a result of the magnetic field A2 and the magnetic field A3 working on the short circuited coils 7a, 7b will also work on the variable magnetic force magnet 3, and become the same direction as the magnetic field generated by the d-axis current and the magnetic field A1 that works on the variable magnetic force magnet 3.

Figure 44:
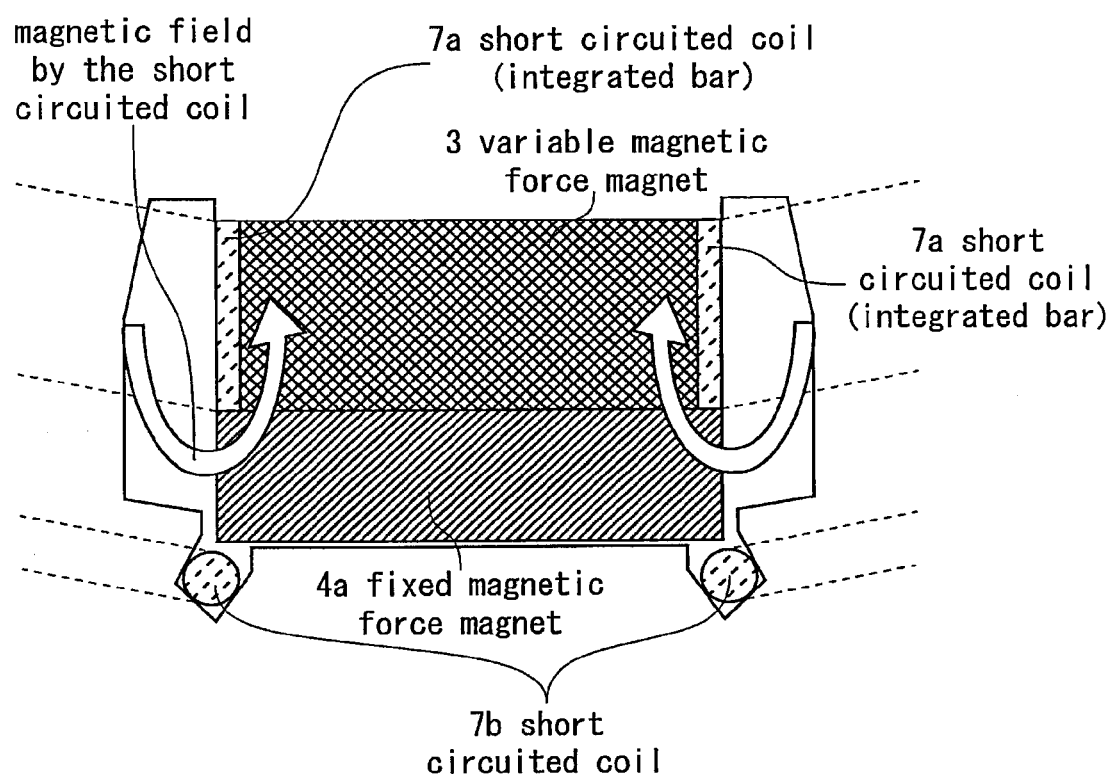
FIG. 44 is a cross section showing a state during magnetization in Embodiment 16 according to the invention.

In this embodiment, the tabular short circuited coil 7a is disposed on the entire lateral side of the variable magnetic force magnet 3. A short-circuit current generated as a result of the magnetic field A2 and the magnetic field A3 working on the short circuited coil 7a is flowing in the short circuited coil 7a. The magnetic field generated by the short-circuit current works on the variable magnetic force magnet 3 as shown in FIG. 44.

The magnetic field generated by the short-circuit current is added with a large magnetic field generated by the short circuited coil 7a in the vicinity of the short circuited coil 7a, but the influence is limited at a position that is away from the short circuited coil 7a. Nevertheless, in this embodiment, a tabular coil is disposed to come in contact with the lateral side of the variable magnetic force magnet as the short circuited coil 7a. Consequently, since the portion separated from the short circuited coil 7a will be limited in the variable magnetic force magnet, an uneven magnetization distribution will not occur easily in the variable magnetic force magnet. The same applies to the case of reducing the total interlinkage magnetic flux of the permanent magnet.

(2-3) Effect of Embodiment 16

As the effect of this kind of Embodiment 16, in comparison to the effect of foregoing Embodiment 15, since an uneven magnetization distribution will not occur easily in the variable magnetic force magnet, it is possible to reduce the magnetization current for uniformly magnetizing the overall variable magnetic force magnet. Moreover, since the short circuited coil is of a tabular shape, the variable magnetic force magnet and the fixed magnetic force of the lower layer can be integrated by using, for example, an adhesive or the like, it can be inserted into the rotor core and assembled integrally with the permanent magnets, and the assembly operation is thereby facilitated.

Embodiment 17

(3-1) Configuration

In Embodiment 17 according to the fourth invention, two types of variable magnetic force magnets with a different coercivity are disposed in series as the variable magnetic force magnet 3 in which the variable magnetic force magnet 3 and the fixed magnetic force magnet 4a are disposed in series at the center of the magnetic pole part 6 in Embodiment 16. Specifically, in substitute for the variable magnetic force magnet 3 of Embodiment 16, used is a composite magnet configured by disposing a variable magnetic force magnet 3a with strong coercive force at the upper layer part, disposing a variable magnetic force magnet 3b with coercive force that is weaker than the variable magnetic force magnet 3a at the middle layer part, and disposing a fixed magnetic force magnet 4a at the lower layer part.

(3-2) Operation of Embodiment 17

The operation during magnetization in the permanent magnet electric motor of this embodiment having the foregoing configuration is now explained.

Figure 45:
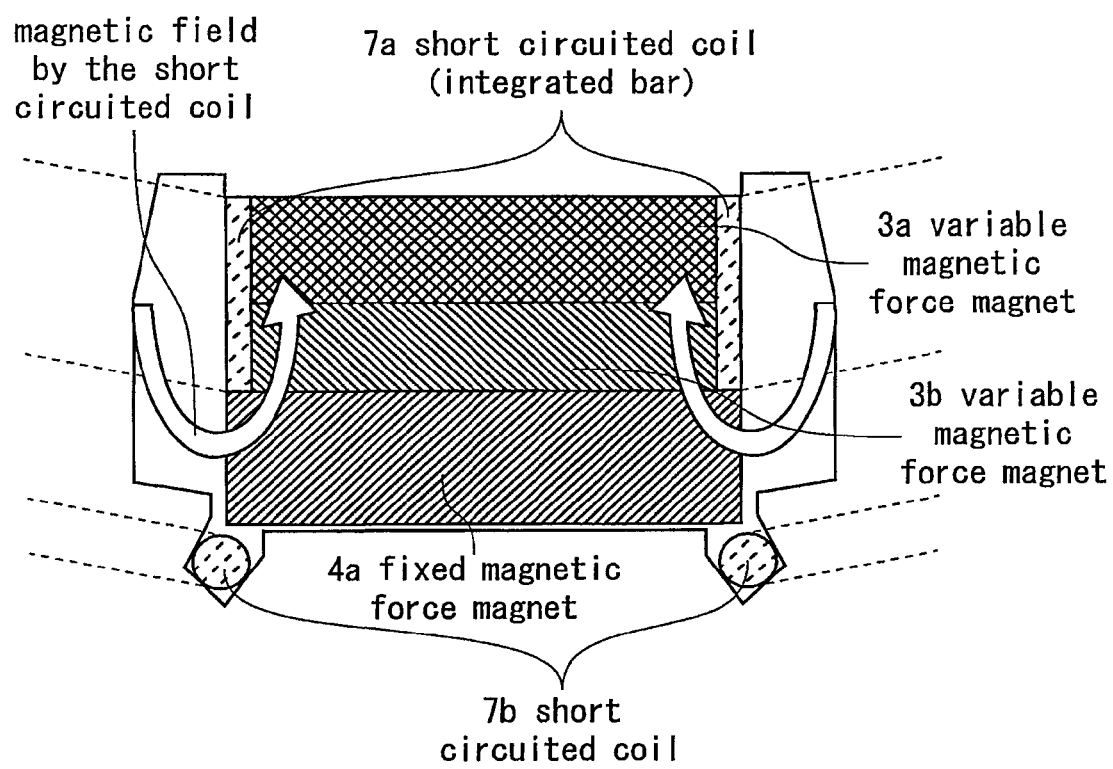
FIG. 45 is a cross section showing a state during magnetization in Embodiment 17 according to the invention.

When reducing the total interlinkage magnetic flux of the permanent magnets, a short-circuit current flows to the short circuited coil 7a as a result of the magnetic field generated by the d-axis current working on the short circuited coil 7a. The magnetic field generated by the short-circuit current works on the variable magnetic force magnets 3a, 3b as shown in FIG. 45.

Moreover, the magnetic field A1 generated by the d-axis current also works on the variable magnetic force magnets 3a, 3b in the composite magnet. When the magnetic field A1 works on the composite magnet, the strength of the magnetic field that works on the variable magnetic force magnet 3b of the central part becomes weaker in comparison to the strength of the magnetic field that works on the variable magnetic force magnet 3a of the upper layer part and the fixed magnetic force magnet 4a of the lower layer part.

Nevertheless, since the coercivity of the variable magnetic force magnet 3b of the central part is weaker in comparison to the variable magnetic force magnet 3a of the upper layer part, even when the strength of the magnetic field of the magnetic field A1 is weak, the variable magnetic force magnet 3b can be magnetized reliably.

(3-3) Effect of Embodiment 17

As the effect of this kind of Embodiment 17, in comparison to the effect of foregoing Embodiment 16, since a variable magnetic force magnet 3b with weak coercive force is disposed at the central part of the composite magnet, even in cases where it is difficult for the magnetic field A1 to work on the central part of the composite magnet, magnetization can be performed reliably. Consequently, since an uneven magnetization distribution will not occur easily in the variable magnetic force magnet 3b, it is possible to reduce the magnetization current for uniformly magnetizing the overall variable magnetic force magnets 3a, 3b.

Embodiment 18

(4-1) Configuration

In Embodiment 18 according to the fourth invention, the shape of the short circuited coil 7a is changed in the permanent magnet electric motor of Embodiment 16. In other words, as the short circuited coil 7a, a plurality of short circuited coils are disposed in substitute for the tabular short circuited coil. The plurality of short circuited coils are disposed to surround the fixed magnetic force magnet 4 and the q-axis periphery, but on the side of the fixed magnetic force magnet 4, they are disposed to come in contact with the lateral side of the variable magnetic force magnet 3.

(4-2) Operation of Embodiment 18

The operation during magnetization in the permanent magnet electric motor of this embodiment having the foregoing configuration is now explained.

Figure 46:
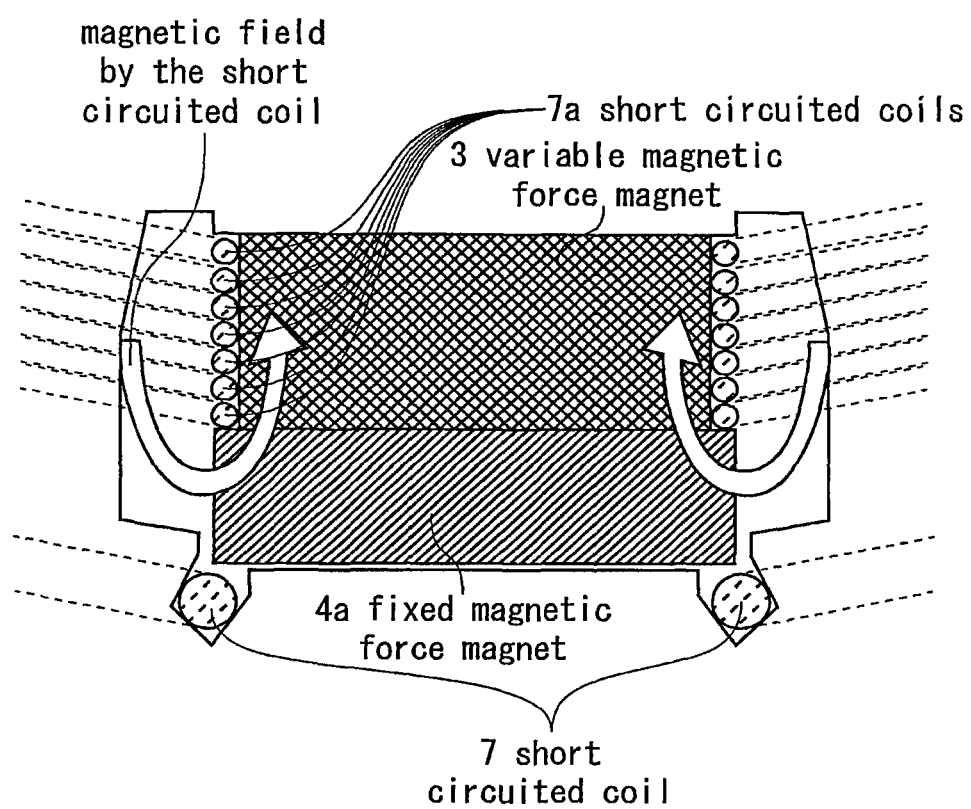
FIG. 46 is a cross section showing a state during magnetization in Embodiment 18 according to the invention.

During the magnetization of the total interlinkage magnetic flux of the permanent magnets, a short-circuit current flows to the short circuited coil 7a as a result of the magnetic field generated by the d-axis current working on the short circuited coil 7a. The magnetic field generated by the short-circuit current works on the variable magnetic force magnet 3 and the fixed magnetic force magnet 4a as shown in FIG. 46 by being synthesized with the magnetic field generated by the short-circuit current flowing to the respective short circuited coils.

(4-3) Effect of Embodiment 18

As the effect of this kind of Embodiment 18, in comparison to the effect of foregoing Embodiment 15, since an uneven magnetization distribution will not occur easily in the variable magnetic force magnet 3, it is possible to reduce the magnetization current for uniformly magnetizing the overall variable magnetic force magnets 3.

Embodiment 19

(5-1) Configuration

In Embodiment 19 according to the fourth invention, two types of variable magnetic force magnets 3a, 3b with a different coercivity are disposed in series in substitute for the variable magnetic force magnet 3 in which the variable magnetic force magnet 3 and the fixed magnetic force magnet 4a are disposed in series at the center of the magnetic pole part 6 in Embodiment 18. Specifically, in substitute for the variable magnetic force magnet 3 of Embodiment 18, used is a composite magnet configured by disposing a variable magnetic force magnet 3a with strong coercive force at the upper layer part, disposing a variable magnetic force magnet 3b with coercive force that is weaker than the variable magnetic force magnet 3a at the middle layer part, and disposing a fixed magnetic force magnet 4a at the lower layer part.

(5-2) Operation of Embodiment 19

The operation during magnetization in the permanent magnet electric motor of Embodiment 19 having the foregoing configuration is now explained.

Figure 47:
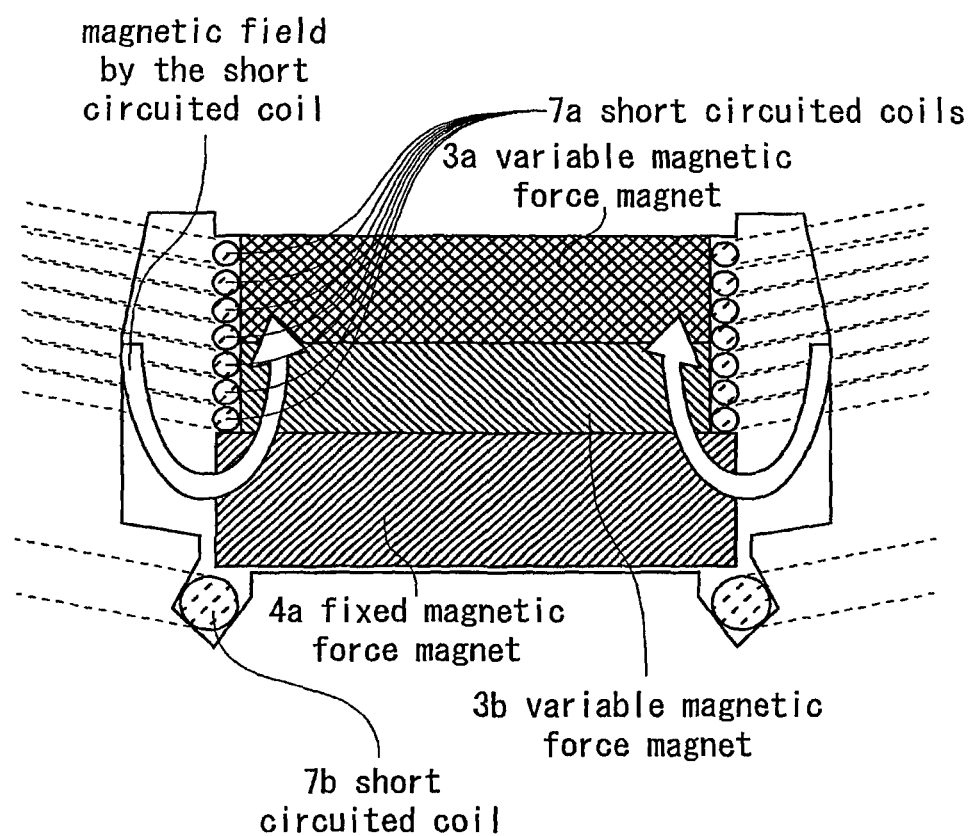
FIG. 47 is a cross section showing a state during magnetization in Embodiment 19 according to the invention.

During the magnetization of the total interlinkage magnetic flux of the permanent magnets, a short-circuit current flows to the short circuited coil 7a as a result of the magnetic field generated by the d-axis current working on the short circuited coil 7a. The magnetic field generated by the short-circuit current works on the variable magnetic force magnets 3a, 3b and the fixed magnetic force magnet 4a as shown in FIG. 47 by being synthesized with the magnetic field generated by the short-circuit current flowing to the respective short circuited coils.

Moreover, the magnetic field A1 generated by the d-axis current also works on the variable magnetic force magnets 3a, 3b in the composite magnet. When the magnetic field A1 works on the composite magnet, the strength of the magnetic field that works on the variable magnetic force magnet 3b of the central part becomes weaker in comparison to the strength of the magnetic field that works on the variable magnetic force magnet 3a of the upper layer part and the fixed magnetic force magnet 4a of the lower layer part.

Nevertheless, since the coercivity of the variable magnetic force magnet 3b of the central part is weaker in comparison to the variable magnetic force magnet 3a of the upper layer part, even when the strength of the magnetic field of the magnetic field A1 is weak, the variable magnetic force magnet 3b can be magnetized reliably.

(5-3) Effect of Embodiment 19

As the effect of this kind of Embodiment 19, in comparison to the effect of foregoing Embodiment 18, since a variable magnetic force magnet 3b with weak coercive force is disposed at the central part of the composite magnet, even in cases where it is difficult for the magnetic field A1 to work on the central part of the composite magnet, magnetization can be performed reliably. Consequently, since an uneven magnetization distribution will not occur easily in the variable magnetic force magnet 3b, it is possible to reduce the magnetization current for uniformly magnetizing the overall variable magnetic force magnets 3a, 3b.

Embodiment 20

(6-1) Configuration

In Embodiment 20 according to the fourth invention, the shape of the short circuited coil 7a is changed in the permanent magnet electric motor of Embodiment 16. In other words, as the short circuited coil 7a, one short circuited coil is disposed in substitute for the tabular short circuited coil 7a. The plurality of short circuited coils are disposed to surround the fixed magnetic force magnet 4 and the q-axis periphery, but on the side of the fixed magnetic force magnet 4, they are disposed to come in contact with the center of the lateral side of the variable magnetic force magnet 3.

(6-2) Operation of Embodiment 20

The operation during magnetization in the permanent magnet electric motor of this embodiment having the foregoing configuration is now explained.

Figure 48:
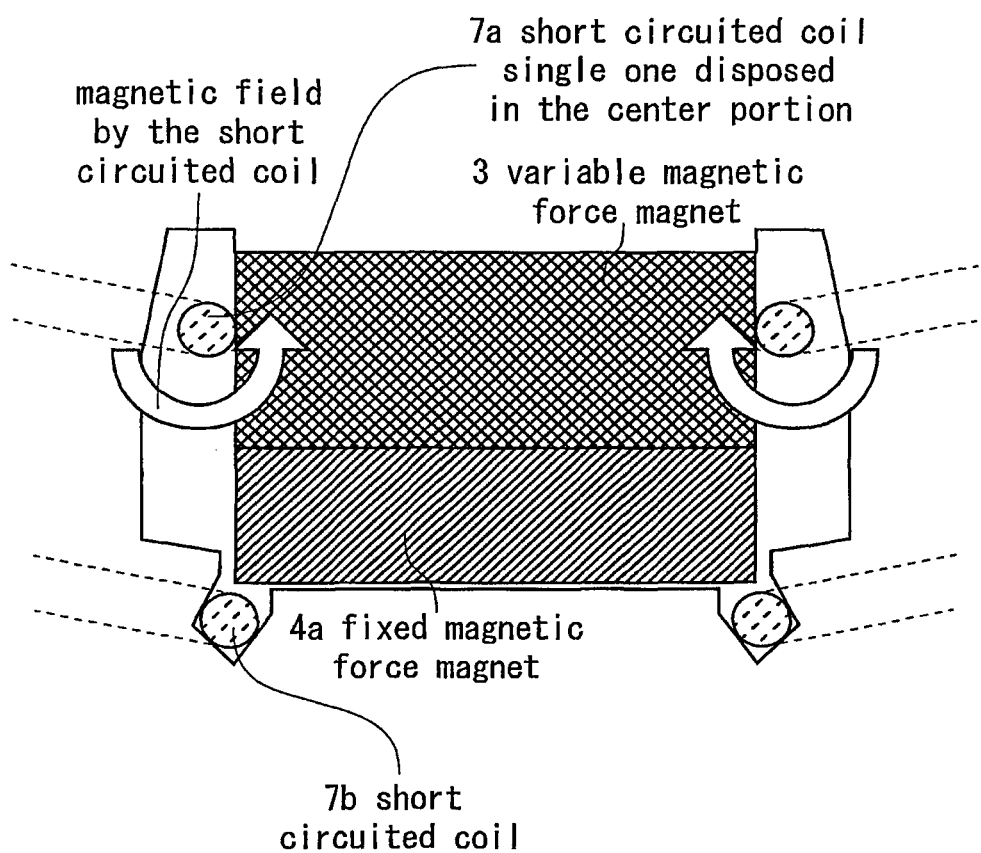
FIG. 48 is a cross section showing a state during magnetization in Embodiment 20 according to the invention.

During the magnetization of the total interlinkage magnetic flux of the permanent magnets, a short-circuit current flows to the short circuited coil 7a as a result of the magnetic field generated by the d-axis current working on the short circuited coil 7a. The magnetic field generated by the short-circuit current works on the variable magnetic force magnet 3 and the fixed magnetic force magnet 4a as shown in FIG. 48 since the short circuited coil 7a is disposed at the center of the lateral side of the variable magnetic force magnet 3.

(6-3) Effect of Embodiment 20

As the effect of this kind of Embodiment 20, in comparison to the effect of foregoing Embodiment 15, since the short circuited coil 7a is disposed at the center of the lateral side of the variable magnetic force magnet 3, an uneven magnetization distribution will not occur easily in the variable magnetic force magnet 3, and it is possible to reduce the magnetization current for uniformly magnetizing the overall variable magnetic force magnets 3.

Embodiment 21

(7-1) Configuration

In Embodiment 21 according to the fourth invention, in substitute for the variable magnetic force magnet 3 in which the variable magnetic force magnet 3 and the fixed magnetic force magnet 4a are disposed in series at the center of the magnetic pole part 6 in Embodiment 20, used is a composite magnet configured by disposing a variable magnetic force magnet 3a with strong coercive force at the upper layer part, disposing a variable magnetic force magnet 3b with coercive force that is weaker than the variable magnetic force magnet 3a at the middle layer part, and disposing a fixed magnetic force magnet 4a at the lower layer part.

(7-2) Operation of Embodiment 21

Figure 49:
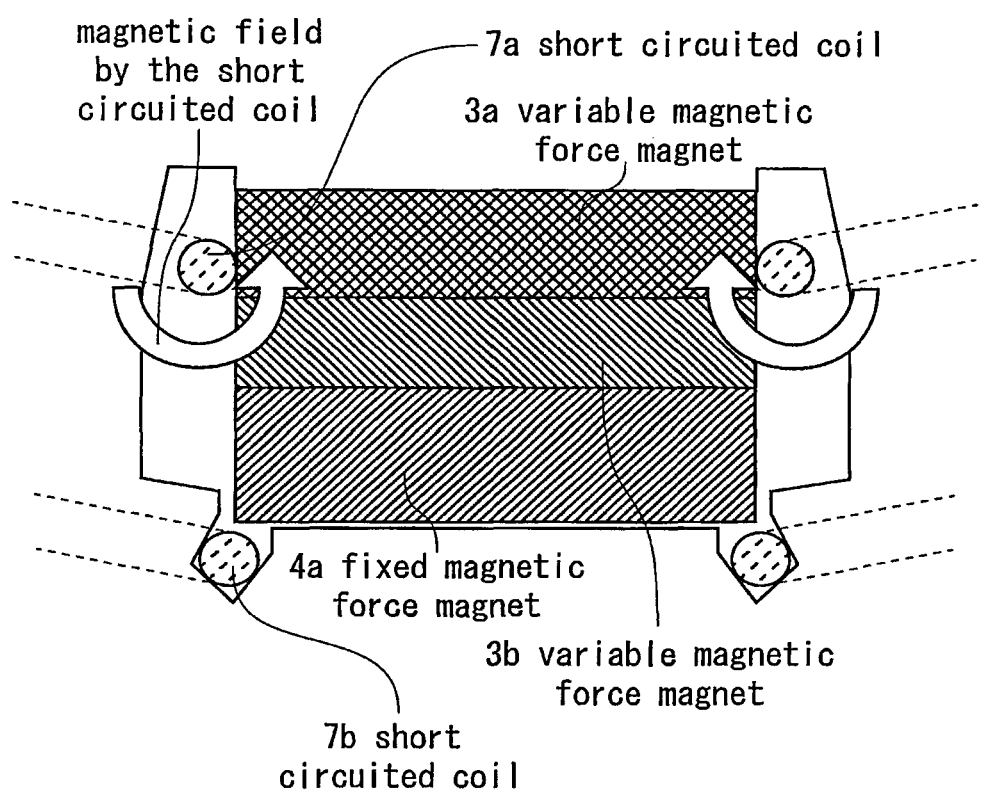
FIG. 49 is a cross section showing a state during magnetization in Embodiment 21 according to the invention.

During the magnetization of the total interlinkage magnetic flux of the permanent magnets having the foregoing configuration, a short-circuit current flows to the short circuited coil 7a as a result of the magnetic field generated by the d-axis current working on the short circuited coil 7a. The magnetic field generated by the short-circuit current works on the variable magnetic force magnets 3a, 3b and the fixed magnetic force magnet 4a as shown in FIG. 49 by being synthesized with the magnetic field generated by the short-circuit current flowing to the respective short circuited coils.

Moreover, the magnetic field A1 generated by the d-axis current also works on the variable magnetic force magnets 3a, 3b in the composite magnet. When the magnetic field A1 works on the composite magnet, the strength of the magnetic field that works on the variable magnetic force magnet 3b of the central part becomes weaker in comparison to the strength of the magnetic field that works on the variable magnetic force magnet 3a of the upper layer part and the fixed magnetic force magnet 4a of the lower layer part. Nevertheless, since the coercivity of the variable magnetic force magnet 3b of the central part is weaker in comparison to the variable magnetic force magnet 3a of the upper layer part, even when the strength of the magnetic field of the magnetic field A1 is weak, the variable magnetic force magnet 3b can be magnetized reliably.

(7-3) Effect of Embodiment 21

As the effect of this kind of Embodiment 21, in comparison to the effect of foregoing Embodiment 20, since a variable magnetic force magnet 3b with weak coercive force is disposed at the central part of the composite magnet, even in cases where it is difficult for the magnetic field A1 to work on the central part of the composite magnet, magnetization can be performed reliably. Consequently, since an uneven magnetization distribution will not occur easily in the variable magnetic force magnet 3b, it is possible to reduce the magnetization current for uniformly magnetizing the overall variable magnetic force magnets 3a, 3b.

Embodiment 22

(8-1) Configuration

In Embodiment 22 according to the fourth invention, the shape of the short circuited coil 7a is changed in the permanent magnet electric motor of Embodiment 16. In other words, as the short circuited coil 7a, one short circuited coil is disposed in substitute for the tabular short circuited coil. The plurality of short circuited coils are disposed to surround the fixed magnetic force magnet 4 and the q-axis periphery, but on the side of the fixed magnetic force magnet 4, a notch is provided to the center part on the lateral side of the variable magnetic force magnet 3, and they are disposed to be fitted into such portion.

(8-2) Operation of Embodiment 22

Figure 50:
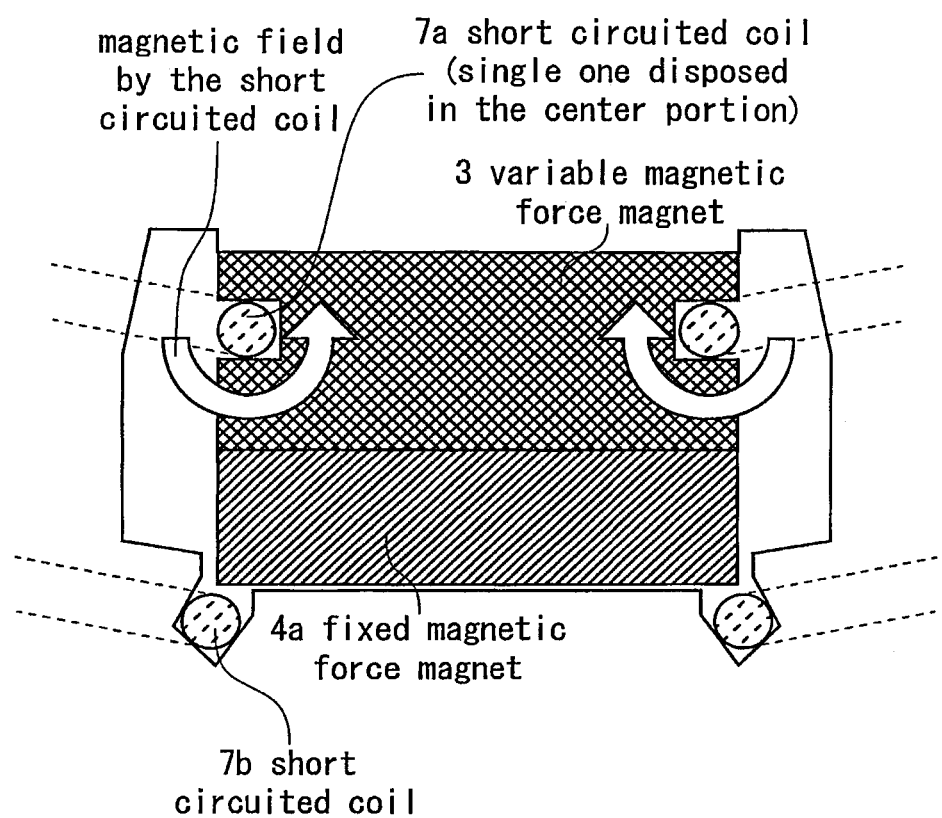
FIG. 50 is a cross section showing a state during magnetization in Embodiment 22 according to the invention.

During the magnetization of the total interlinkage magnetic flux of the permanent magnets having the foregoing configuration, a short-circuit current flows to the short circuited coil 7a as a result of the magnetic field generated by the d-axis current working on the short circuited coil 7a. The magnetic field generated by the short-circuit current works on the variable magnetic force magnet 3 and the fixed magnetic force magnet 4a as shown in FIG. 50 since the short circuited coil 7a is disposed in the notch portion provided to the central part on the lateral side of the variable magnetic force magnet 3.

(8-3) Effect of Embodiment 22

As the effect of this kind of Embodiment 22, in comparison to the effect of foregoing Embodiment 15, since a notch portion is provided to the central part on the lateral side of the variable magnetic force magnet 3, an uneven magnetization distribution will not occur easily in the variable magnetic force magnet 3, and it is possible to reduce the magnetization current for uniformly magnetizing the overall variable magnetic force magnet 3. In addition, since it is possible to maintain the force in the radial direction by the rotational centrifugal force of the short circuited coil, high-speed rotation and high output can be realized, and the reliability will also improve. Moreover, the variable magnetic force magnet and the fixed magnetic force can be integrated by using, for example, an adhesive or the like, and it can be inserted into the rotor core and assembled integrally with the permanent magnets, and the assembly operation is thereby facilitated.

Embodiment 23

(9-1) Configuration

In Embodiment 23 according to the fourth invention, in substitute for the variable magnetic force magnet 3 in which the variable magnetic force magnet 3 and the fixed magnetic force magnet 4a are disposed in series at the center of the magnetic pole part 6 in Embodiment 20, used is a composite magnet configured by disposing a variable magnetic force magnet 3a with strong coercive force at the upper layer part, disposing a variable magnetic force magnet 3b with coercive force that is weaker than the variable magnetic force magnet 3a at the middle layer part, and disposing a fixed magnetic force magnet 4a at the lower layer part.

(9-2) Operation of Embodiment 23

Figure 51:
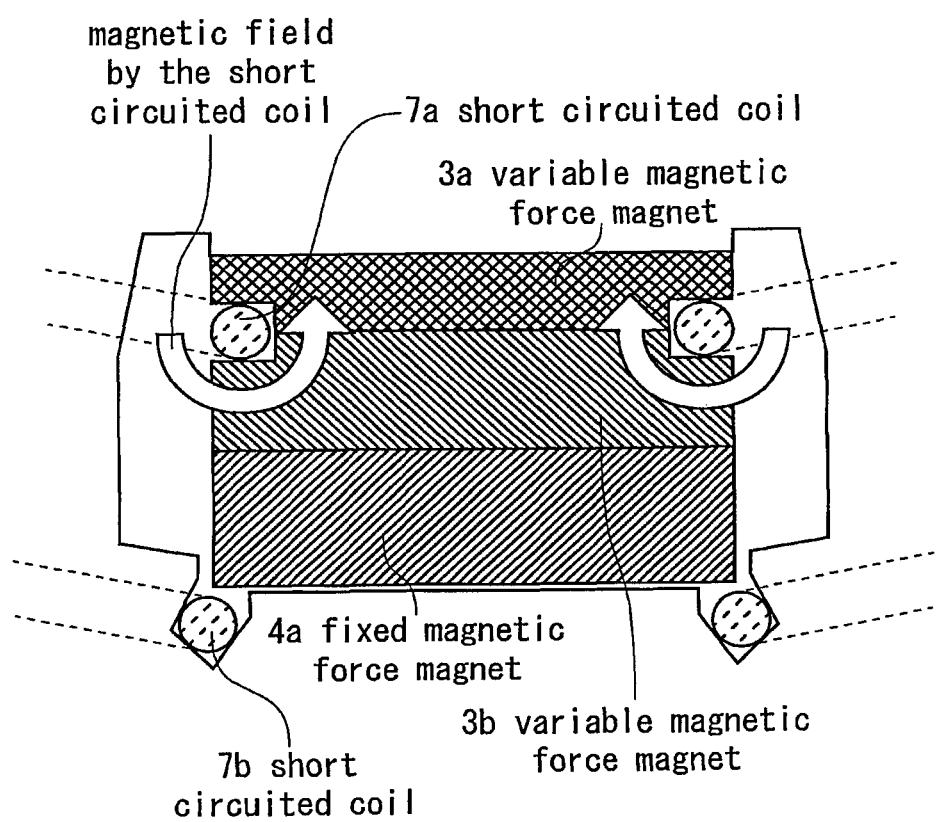
FIG. 51 is a cross section showing a state during magnetization in Embodiment 23 according to the invention.

During the magnetization of the total interlinkage magnetic flux of the permanent magnets having the foregoing configuration, a short-circuit current flows to the short circuited coil 7a as a result of the magnetic field generated by the d-axis current working on the short circuited coil 7a. The magnetic field generated by the short-circuit current works on the variable magnetic force magnets 3a, 3b and the fixed magnetic force magnet 4a as shown in FIG. 51 by being synthesized with the magnetic field generated by the short-circuit current flowing to the respective short circuited coils.

Moreover, the magnetic field A1 generated by the d-axis current also works on the variable magnetic force magnets 3a, 3b in the composite magnet. When the magnetic field A1 works on the composite magnet, the strength of the magnetic field that works on the variable magnetic force magnet 3b of the central part becomes weaker in comparison to the strength of the magnetic field that works on the variable magnetic force magnet 3a of the upper layer part and the fixed magnetic force magnet 4a of the lower layer part. Nevertheless, since the coercivity of the variable magnetic force magnet 3b of the central part is weaker in comparison to the variable magnetic force magnet 3a of the upper layer part, even when the strength of the magnetic field of the magnetic field A1 is weak, the variable magnetic force magnet 3b can be magnetized reliably.

(9-3) Effect of Embodiment 23

As the effect of this kind of Embodiment 23, since a variable magnetic force magnet 3b with weak coercive force is disposed at the central part of the composite magnet, even in cases where it is difficult for the magnetic field A1 to work on the central part of the composite magnet, magnetization can be performed reliably. Consequently, since an uneven magnetization distribution will not occur easily in the variable magnetic force magnet 3b, it is possible to reduce the magnetization current for uniformly magnetizing the overall variable magnetic force magnets 3a, 3b. In addition, since it is possible to maintain the force in the radial direction by the rotational centrifugal force of the short circuited coil, high-speed rotation and high output can be realized, and the reliability will also improve. Moreover, the variable magnetic force magnet and the fixed magnetic force can be integrated by using, for example, an adhesive or the like, and it can be inserted into the rotor core and assembled integrally with the permanent magnets, and the assembly operation is thereby facilitated.

Embodiment 24

(10-1) Configuration

In Embodiment 24 according to the fourth invention, the shape and position of the short circuited coil 7a are changed in the permanent magnet electric motor of Embodiment 16, and the variable magnetic force magnet 3 in which the variable magnetic force magnet 3 and the fixed magnetic force magnet 4a are disposed in series at the center of the magnetic pole part 6 is changed to two types of variable magnetic force magnets 3a, 3b with a different coercivity.

In other words, in substitute for the variable magnetic force magnet 3 in which the variable magnetic force magnet 3 and the fixed magnetic force magnet 4a are disposed in series at the center of the magnetic pole part 6, a variable magnetic force magnet 3a with strong coercive force is disposed at the upper layer part, a variable magnetic force magnet 3b with coercive force that is weaker than the variable magnetic force magnet 3a is disposed at the middle layer part, and a fixed magnetic force magnet 4a is disposed at the lower layer part. Among the above, space for disposing the short circuited coil 7a is provided by causing the width of the variable magnetic force magnet 3a with strong coercive force disposed at the upper layer part to be narrower than the variable magnetic force magnet 3b and the fixed magnetic force magnet 4a.

Moreover, as the short circuited coil 7a, in substitute for the tabular short circuited coil, one linear short circuited coil is used. This short circuited coil is disposed to surround the fixed magnetic force magnet 4 and the q-axis periphery. Meanwhile, on the side of the fixed magnetic force magnet 4, the short circuited coil 7a is disposed in the space, which was created by narrowing the width of the variable magnetic force magnet 3a, of the magnet obtained by disposing in series the fixed magnetic force magnet 4a and the variable magnetic force magnets 3a, 3b at the center of the magnetic pole part 6.

(10-2) Operation of Embodiment 24

Figure 52:
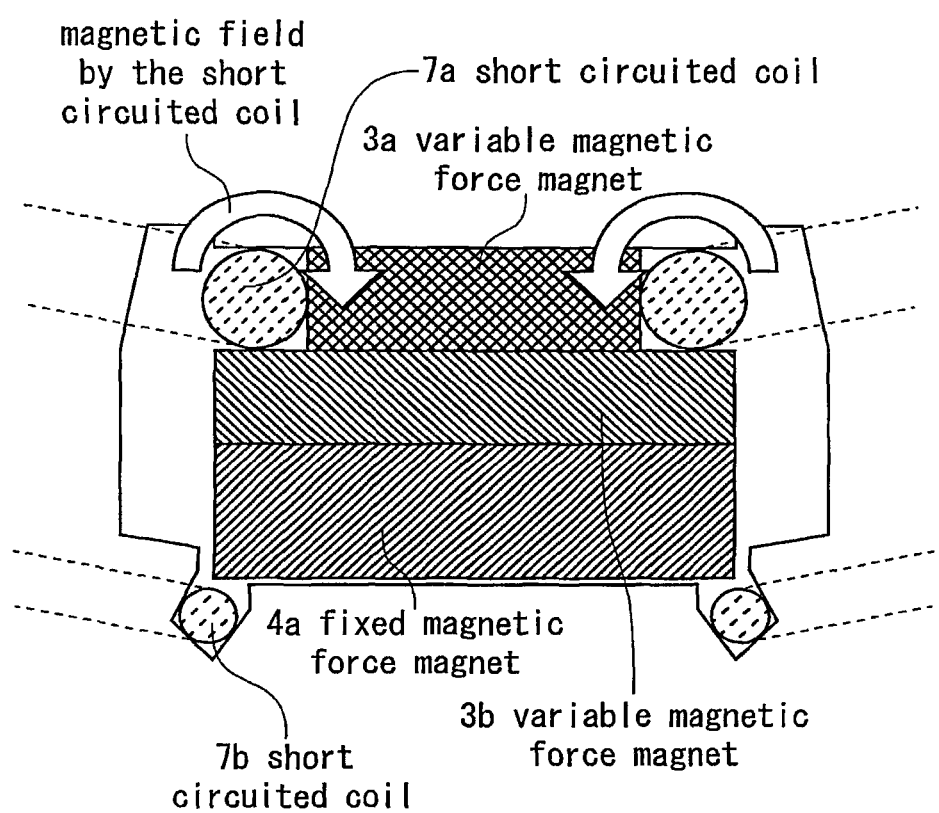
FIG. 52 is a cross section showing a state during magnetization in Embodiment 24 according to the invention.

During the magnetization of the total interlinkage magnetic flux of the permanent magnets, a short-circuit current flows to the short circuited coil 7a as a result of the magnetic field generated by the d-axis current working on the short circuited coil 7a. The magnetic field generated by the short-circuit current works on the variable magnetic force magnet 3 and the fixed magnetic force magnet 4a as shown in FIG. 52 since the short circuited coil 7a is disposed in the space created by narrowing the width of the variable magnetic force magnet 3a.

Moreover, the magnetic field A1 generated by the d-axis current also works on the variable magnetic force magnets 3a, 3b in the composite magnet. When the magnetic field A1 works on the composite magnet, the strength of the magnetic field that works on the variable magnetic force magnet 3b of the central part becomes weaker in comparison to the strength of the magnetic field that works on the variable magnetic force magnet 3a of the upper layer part and the fixed magnetic force magnet 4a of the lower layer part. Nevertheless, since the coercivity of the variable magnetic force magnet 3b of the central part is weaker in comparison to the variable magnetic force magnet 3a of the upper layer part, even when the strength of the magnetic field of the magnetic field A1 is weak, the variable magnetic force magnet 3b can be magnetized reliably.

(10-3) Effect of Embodiment 24

As the effect of this kind of Embodiment 24, in comparison to the effect of foregoing Embodiment 15, since the short circuited coil 7a is disposed in the space created by narrowing the width of the variable magnetic force magnet 3a, the magnetic field generated by the short circuited coil can be more easily worked on the variable magnetic force magnets 3a, 3b.

Moreover, the composite magnet can be magnetized more reliably based on the magnetic field A1 generated by the d-axis current. Accordingly, since an uneven magnetization distribution will not occur easily, it is possible to reduce the magnetization current for uniformly magnetizing the overall variable magnetic force magnets 3a, 3b. In addition, since it is possible to maintain the force in the radial direction by the rotational centrifugal force of the short circuited coil, high-speed rotation and high output can be realized, and the reliability will also improve.

Embodiment 25

(11-1) Configuration

In Embodiment 25 according to the fourth invention, the position of disposing the short circuited coil 7a of the permanent magnet electric motor of Embodiment 24 is changed.

In other words, in Embodiment 24, space for disposing the short circuited coil 7a was provided by causing the width of the variable magnetic force magnet 3a with strong coercive force disposed at the upper layer part to be narrower than the variable magnetic force magnet 3b and the fixed magnetic force magnet 4a. Meanwhile, in this embodiment, space is provided for disposing the short circuited coil 7a by causing the width of the variable magnetic force magnet 3 of the middle layer part to be narrower than the variable magnetic force magnet 3b and the fixed magnetic force magnet 4a.

(11-2) Operation of Embodiment 25

Figure 53:
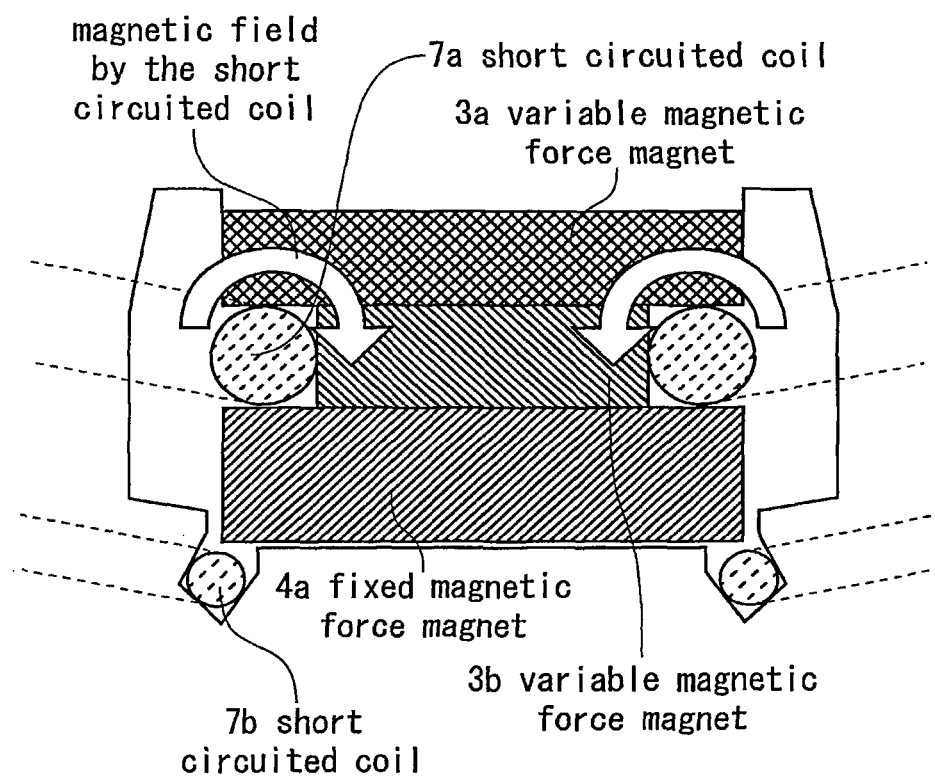
FIG. 53 is a cross section showing a state during magnetization in Embodiment 25 according to the invention.

During the magnetization of the total interlinkage magnetic flux of the permanent magnets of this embodiment having the foregoing configuration, a short-circuit current flows to the short circuited coil 7a as a result of the magnetic field generated by the d-axis current working on the short circuited coil 7a. The magnetic field generated by the short-circuit current works on the variable magnetic force magnets 3a, 3b and the fixed magnetic force magnet 4a as shown in FIG. 53 since the short circuited coil 7a is disposed in the space created by narrowing the width of the variable magnetic force magnet 3b.

Moreover, the magnetic field A1 generated by the d-axis current also works on the variable magnetic force magnets 3a, 3b in the composite magnet. When the magnetic field A1 works on the composite magnet, the strength of the magnetic field that works on the variable magnetic force magnet 3b of the central part becomes weaker in comparison to the strength of the magnetic field that works on the variable magnetic force magnet 3a of the upper layer part and the fixed magnetic force magnet 4a of the lower layer part. Nevertheless, since the coercivity of the variable magnetic force magnet 3b of the central part is weaker in comparison to the variable magnetic force magnet 3a of the upper layer part, even when the strength of the magnetic field of the magnetic field A1 is weak, the variable magnetic force magnet 3b can be magnetized reliably.

(11-3) Effect of Embodiment 25

As the effect of this kind of Embodiment 25, in comparison to the effect of foregoing Embodiment 15, since the short circuited coil 7a is disposed in the space created by narrowing the width of the magnetic force magnet 3a, the magnetic field generated by the short circuited coil can be more easily worked on the variable magnetic force magnets 3a, 3b. Moreover, the composite magnet can be magnetized more reliably based on the magnetic field A1 generated by the d-axis current. Accordingly, since an uneven magnetization distribution will not occur easily, it is possible to reduce the magnetization current for uniformly magnetizing the overall variable magnetic force magnet. In addition, since it is possible to maintain the force in the radial direction by the rotational centrifugal force of the short circuited coil, high-speed rotation and high output can be realized, and the reliability will also improve. Moreover, since the short circuit coil can be disposed between the upper layer variable magnet and the fixed magnetic force magnet, and the variable magnetic force magnet and the fixed magnetic force can be integrated by using, for example, an adhesive or the like, and it can be inserted into the rotor core and assembled integrally with the permanent magnets, and the assembly operation is thereby facilitated.

The invention claimed is:

1. A method for manufacturing a permanent magnet electric motor comprising:
    disposing a plurality of magnetic poles inside a rotor core to form a rotor and skewing each position of the magnetic poles in the rotor core in a circumferential direction, the rotor core being divided into two or more core parts in an axial direction thereof, the plurality of magnetic poles being formed by two or more types of permanent magnets selected such that a product of coercivity and thickness in a magnetization direction of each magnet is different from each other;
    forming a pair of conductive material injection holes in each core part such that hole positions thereof are displaced with respect to each other by a length corresponding to a skewed angle;
    providing a space plate having a void part which is in communication with the conductive material injection holes of the respective core parts in a center thereof;
    filling a melted conductive material into the conductive material injection holes, the void part and a short circuit connection part;
    further solidifying the filled conductive material so as to form conductive short circuit coils generating a short-circuit current that flows in the core parts upon magnetizing the permanent magnets based on a magnetic flux generated during magnetization; and
    locating a stator formed by an armature core and an armature winding outside the rotor with an air gap therebetween, the armature winding generating a magnetic field which magnetizes at least one permanent magnet forming the magnetic poles of the rotor.

\* \* \* \* \*